United States Patent
Tombs et al.

(10) Patent No.: US 8,117,921 B2
(45) Date of Patent: Feb. 21, 2012

(54) MULTI-PHASE CORIOLIS FLOWMETER

(76) Inventors: Michael S. Tombs, Oxford (GB); Manus P. Henry, Oxford (GB); Mihaela D. Duta, Oxford (GB); Robbie Lansangan, Houston, TX (US); Robert E. Dutton, Louisville, CO (US); Wade M. Mattar, Wrentham, MA (US)

( * ) Notice: Subject to any disclaimer, the term of this patent is extended or adjusted under 35 U.S.C. 154(b) by 0 days.

(21) Appl. No.: 12/721,200

(22) Filed: Mar. 10, 2010

(65) Prior Publication Data
US 2011/0016988 A1 Jan. 27, 2011

Related U.S. Application Data

(63) Continuation of application No. 11/681,992, filed on Mar. 5, 2007, now Pat. No. 7,698,954, which is a continuation of application No. 11/069,931, filed on Mar. 2, 2005, now Pat. No. 7,188,534, and a continuation-in-part of application No. 10/773,459, filed on Feb. 9, 2004, now Pat. No. 7,059,199.

(60) Provisional application No. 60/549,161, filed on Mar. 3, 2004, provisional application No. 60/445,795, filed on Feb. 10, 2003, provisional application No. 60/452,934, filed on Mar. 10, 2003.

(51) Int. Cl.
*G01F 1/84* (2006.01)
(52) U.S. Cl. ................................. 73/861.356
(58) Field of Classification Search ............ 73/861.355, 73/861.356, 861.357
See application file for complete search history.

(56) References Cited

U.S. PATENT DOCUMENTS

| | | |
|---|---|---|
| 3,956,682 A | 5/1976 | Van Dyck |
| RE29,383 E | 9/1977 | Gallatin et al. |
| 4,358,822 A | 11/1982 | Sanchez |
| RE31,450 E | 11/1983 | Smith |
| 4,419,898 A | 12/1983 | Zanker et al. |
| 4,422,338 A | 12/1983 | Smith |
| 4,491,025 A | 1/1985 | Smith et al. |
| 4,688,418 A | 8/1987 | Cheung et al. |
| 4,727,746 A | 3/1988 | Mikasa et al. |
| 4,757,390 A | 7/1988 | Mehrgardt et al. |
| 4,773,257 A | 9/1988 | Aslesen et al. |
| 4,782,711 A | 11/1988 | Pratt |
| 4,801,897 A | 1/1989 | Flecken |

(Continued)

FOREIGN PATENT DOCUMENTS
CN 2277514 4/1998
(Continued)

OTHER PUBLICATIONS
Chinese Office Action issued in Chinese Patent Application No. 2004800085644, 8 pages.
(Continued)

*Primary Examiner* — Jewel V Thompson
(74) *Attorney, Agent, or Firm* — Edward S. Jarmolowicz

(57) ABSTRACT

A flowmeter is disclosed. The flowmeter includes a vibratable flowtube, and a driver connected to the flowtube that is operable to impart motion to the flowtube. A sensor is connected to the flowtube and is operable to sense the motion of the flowtube and generate a sensor signal. A controller is connected to receive the sensor signal. The controller is operable to determine an individual flow rate of each phase within a multi-phase flow through the flowtube.

20 Claims, 68 Drawing Sheets

U.S. PATENT DOCUMENTS

| | | | |
|---|---|---|---|
| 4,817,448 A | 4/1989 | Hargarten et al. | |
| 4,823,614 A | 4/1989 | Dahlin | |
| 4,852,395 A | 8/1989 | Kolpak | |
| 4,852,409 A * | 8/1989 | Herzl | 73/861.356 |
| 4,852,410 A | 8/1989 | Corwon et al. | |
| 4,856,344 A | 8/1989 | Hunt | |
| 4,876,879 A | 10/1989 | Ruesch | |
| 4,879,911 A | 11/1989 | Zolock | |
| 4,891,991 A | 1/1990 | Mattar et al. | |
| 4,895,030 A | 1/1990 | Bergamini et al. | |
| 4,911,006 A | 3/1990 | Hargarten et al. | |
| 4,911,020 A | 3/1990 | Thompson | |
| 4,934,195 A | 6/1990 | Hussain | |
| 4,934,196 A | 6/1990 | Romano | |
| 4,996,871 A | 3/1991 | Romano | |
| 5,027,662 A | 7/1991 | Titlow et al. | |
| 5,029,482 A | 7/1991 | Liu et al. | |
| 5,050,439 A | 9/1991 | Thompson | |
| 5,052,231 A | 10/1991 | Christ et al. | |
| 5,054,313 A | 10/1991 | Fitzgerald et al. | |
| 5,054,326 A | 10/1991 | Mattar | |
| 5,218,869 A | 6/1993 | Pummer | |
| 5,224,372 A | 7/1993 | Kolpak | |
| 5,224,387 A | 7/1993 | Lindenbaum et al. | |
| 5,228,327 A | 7/1993 | Bruck | |
| 5,259,250 A | 11/1993 | Kolpak | |
| 5,271,281 A | 12/1993 | Mattar et al. | |
| 5,295,084 A | 3/1994 | Arunachalam et al. | |
| 5,301,557 A | 4/1994 | Cage et al. | |
| 5,343,764 A | 9/1994 | Mattar et al. | |
| 5,347,874 A | 9/1994 | Kalotay et al. | |
| 5,400,653 A | 3/1995 | Kalotay | |
| 5,429,002 A | 7/1995 | Coleman | |
| 5,469,748 A | 11/1995 | Kalotay | |
| 5,497,665 A | 3/1996 | Cage et al. | |
| 5,497,666 A | 3/1996 | Patten et al. | |
| 5,535,632 A | 7/1996 | Kolpak | |
| 5,555,190 A | 9/1996 | Derby et al. | |
| 5,570,300 A | 10/1996 | Henry et al. | |
| 5,578,764 A | 11/1996 | Yokoi et al. | |
| 5,594,180 A | 1/1997 | Carpenter et al. | |
| 5,648,616 A | 7/1997 | Keel | |
| 5,654,502 A | 8/1997 | Dutton | |
| 5,687,100 A | 11/1997 | Buttler et al. | |
| 5,732,193 A | 3/1998 | Aberson | |
| 5,734,112 A | 3/1998 | Bose et al. | |
| 5,774,378 A | 6/1998 | Yang | |
| 5,804,741 A | 9/1998 | Freeman | |
| 5,804,742 A | 9/1998 | Rademacher-Dubbick | |
| 5,877,954 A | 3/1999 | Klimasauskas et al. | |
| 5,926,096 A | 7/1999 | Mattar et al. | |
| 5,969,264 A | 10/1999 | Rivkin | |
| 6,073,495 A | 6/2000 | Stadler | |
| 6,092,429 A | 7/2000 | Cunningham et al. | |
| 6,151,958 A | 11/2000 | Letton | |
| 6,185,470 B1 | 2/2001 | Pado et al. | |
| 6,209,388 B1 | 4/2001 | Letton | |
| 6,227,034 B1 | 5/2001 | Trochesset | |
| 6,301,973 B1 | 10/2001 | Smith | |
| 6,309,342 B1 | 10/2001 | Blazey et al. | |
| 6,311,136 B1 | 10/2001 | Henry et al. | |
| 6,318,156 B1 | 11/2001 | Dutton et al. | |
| 6,318,186 B1 | 11/2001 | Smith et al. | |
| 6,327,914 B1 | 12/2001 | Dutton | |
| 6,335,959 B1 | 1/2002 | Lynch | |
| 6,374,860 B2 | 4/2002 | Xu | |
| 6,386,018 B1 | 5/2002 | Letton | |
| 6,505,131 B1 | 1/2003 | Henrot | |
| 6,505,519 B2 | 1/2003 | Henry et al. | |
| 6,507,791 B2 | 1/2003 | Henry et al. | |
| 6,533,065 B2 | 3/2003 | Zanker | |
| 6,550,345 B1 | 4/2003 | Letton | |
| 6,551,251 B2 | 4/2003 | Zuckerwar et al. | |
| 6,564,619 B2 | 5/2003 | Dutton et al. | |
| 6,601,606 B2 | 8/2003 | Xu | |
| 6,674,690 B2 | 1/2004 | Malik | |
| 6,758,102 B2 | 7/2004 | Henry et al. | |
| 6,761,078 B2 | 7/2004 | Allen | |
| 6,766,107 B2 | 7/2004 | Allen | |
| 6,766,147 B2 | 7/2004 | O'Hare et al. | |
| 6,769,293 B2 | 8/2004 | Zanker | |
| 6,776,025 B2 | 8/2004 | Lechner-Fish | |
| 6,816,808 B2 | 11/2004 | Freund, Jr. | |
| 7,032,432 B2 | 4/2006 | Gysling et al. | |
| 7,059,199 B2 | 6/2006 | Mattar et al. | |
| 7,096,719 B2 | 8/2006 | Gysling | |
| 7,134,320 B2 | 11/2006 | Gysling et al. | |
| 7,139,667 B2 | 11/2006 | Rothman et al. | |
| 7,152,460 B2 | 12/2006 | Gysling et al. | |
| 7,165,464 B2 | 1/2007 | Gysling et al. | |
| 7,188,534 B2 * | 3/2007 | Tombs et al. | 73/861.356 |
| 7,207,229 B2 | 4/2007 | Mattar et al. | |
| 7,299,705 B2 | 11/2007 | Gysling | |
| 7,328,624 B2 | 2/2008 | Gysling et al. | |
| 7,337,075 B2 | 2/2008 | Gysling et al. | |
| 7,343,818 B2 | 3/2008 | Gysling et al. | |
| 7,360,453 B2 | 4/2008 | Rieder et al. | |
| 7,363,800 B2 | 4/2008 | Gysling | |
| 7,367,240 B2 | 5/2008 | Gysling et al. | |
| 7,380,438 B2 | 6/2008 | Gysling et al. | |
| 7,380,439 B2 | 6/2008 | Gysling et al. | |
| 7,389,687 B2 | 6/2008 | Gysling et al. | |
| 7,412,903 B2 | 8/2008 | Rieder et al. | |
| 7,698,954 B2 | 4/2010 | Tombs et al. | |
| 2002/0033043 A1 | 3/2002 | Dutton et al. | |
| 2002/0038186 A1 | 3/2002 | Henry et al. | |
| 2002/0133307 A1 | 9/2002 | Maginnis | |
| 2008/0034892 A1 | 2/2008 | Tombs et al. | |
| 2008/0046203 A1 | 2/2008 | Mattar et al. | |

FOREIGN PATENT DOCUMENTS

| | | |
|---|---|---|
| EP | 0 696 726 A | 2/1996 |
| EP | 0 698 783 | 2/1996 |
| EP | 0 702 212 | 3/1996 |
| EP | 0 827 096 | 3/1998 |
| GB | 1528232 | 10/1978 |
| WO | WO 93/08452 | 4/1993 |
| WO | WO 93/21505 | 10/1993 |
| WO | WO 00/10059 | 2/2000 |
| WO | WO 02/08703 | 1/2002 |

OTHER PUBLICATIONS

DeCarlo, Joseph; "True Mass-Flow Measurement"; Fundamentals of Flow Measurement, Unit 11-2; pp. 208-220; 1984.

English translation of Chinese Office Action issued in Chinese Patent Application No. 2004800085644, 7 pages.

Grumski, J.T., et al., "Performance of a Coriolis-type Mass Flow Meter in the Measurement of Two-phase (air-liquid) Mixtures", ASME Fluid Engineering Division Publication FED, vol. 17, pp. 75-84, 1984.

International Preliminary Examination Report (IPER) issued in International Application No. PCT/US2005/006623 dated Sep. 14, 2006.

International Search Report and Written Opinion issued in International Application No. PCT/US2005/006623 mailed Aug. 17, 2005.

J. Hemp et al.; "On the Theory and Performance of Coriolis Mass Flowmeters"; Proceedings of the International Conference on Mass Flow Measurement Direct and Indirect; IBC Technical Services; 40 pages; London, Feb. 1989.

Liu, R.P., et al., "A Neural Network to Correct Mass Flow Errors Caused by Two Phase Flow in a Digital Coriolis Mass Flow Meter". Engineering Science Department, Oxford University.

Luntta, E., et al., "Neural Network Approach to Ultrasonic Flow Measurements", Flow Measurement and Instrumentation, vol. 10, pp. 35-43, 1999.

Notice of Allowance issued in U.S. Appl. No. 11/681,992 mailed Nov. 20, 2009, 11 pages.

Notice of Allowance issued in U.S. Appl. No. 11/686,166 mailed Jun. 29, 2009, 8 pages.

Office Action issued in Russian Application No. 2005128042 dated Nov. 13, 2008.

Office Action issued in U.S. Appl. No. 11/069,931, mailed Jun. 23, 2006, 9 pages.

Office Action issued in U.S. Appl. No. 11/681,922 mailed Mar. 23, 2009, 11 pages.
Office Action issued in U.S. Appl. No. 11/686,166 mailed Aug. 8, 2008, 12 pages.
Reimann, J., "Developments in Two-Phase Mass Flow Rate Instrumentation", pp. 339-402.
Search Report and Written Opinion for PCT Application Serial No. PCT/US04/03646.
Skea, A.F., "Effects of Gas Leaks in Oil Flow on Single-Phase Flowmeters", Flow Measurement and Instrumentation, vol. 10, pp. 146-150 (1999).
Spitzer, David A., "Mass Flowmeters," Industries Flow Measurement, Chapter 12, pp. 197-210, 1990.
U.S. Appl. No. 60/428,312, filed Nov. 22, 2002.
U.S. Appl. No. 60/487,832, filed Jul. 15, 2003.
U.S. Appl. No. 60/491,860, filed Aug. 1, 2003.
U.S. Appl. No. 60/503,334, filed Sep. 16, 2003.
U.S. Appl. No. 60/504,785, filed Sep. 22, 2003.
U.S. Appl. No. 60/510,302, filed Oct. 10, 2003.
U.S. Appl. No. 60/510,765, filed Oct. 9, 2003.
U.S. Appl. No. 60/511,399, filed Oct. 15, 2003.
U.S. Appl. No. 60/512,794, filed Oct. 20, 2003.
U.S. Appl. No. 60/524,964, filed Nov. 25, 2003.
U.S. Appl. No. 60/539,640, filed Jan. 28, 2004.
U.S. Appl. No. 60/570,321, filed May 12, 2004.
U.S. Appl. No. 60/571,903, filed May 17, 2004.
U.S. Appl. No. 60/571,904, filed May 17, 2004.
U.S. Appl. No. 60/576,951, filed Jun. 4, 2004.
U.S. Appl. No. 60/579,448, filed Jun. 14, 2004.
U.S. Appl. No. 60/584,215, filed Feb. 27, 2004.
U.S. Appl. No. 60/610,450, filed Sep. 16, 2004.
U.S. Appl. No. 60/625,498, filed Nov. 5, 2004.
U.S. Appl. No. 60/631,793, filed Nov. 30, 2004.
U.S. Appl. No. 60/654,355, filed Feb. 18, 2005.
U.S. Appl. No. 60/685,532, filed May 27, 2005.
U.S. Appl. No. 60/736,684, filed Nov. 14, 2005.
Wood, et al., "A Phase-Locked Loop for Driving Vibrating Tube Densimeters," Rev. Sci. Instrum., vol. 60, No. 3, Mar. 1989, pp. 493-494.
Office Action for U.S. Appl. No. 12/788,994, mailed Feb. 3, 2011, 7 pages.

* cited by examiner

MULTI-PHASE CORIOLIS FLOWMETER

CROSS-REFERENCE TO RELATED APPLICATIONS

Under 35 U.S.C. §120, this application claims priority to, and is a continuation of U.S. application Ser. No. 11/681,992, filed Mar. 5, 2007, and titled MULTIPHASE CORIOLIS FLOWMETER, which is a continuation of U.S. application Ser. No. 11/069,931, filed Mar. 2, 2005, now U.S. Pat. No. 7,188,534, issued Mar. 13, 2007, which claims priority to U.S. application Ser. No. 60/549,161, filed on Mar. 3, 2004, and titled MULTIPHASE CORIOLIS FLOWMETER. U.S. application Ser. No. 11/069,931 is also a continuation-in-part of U.S. application Ser. No. 10/773,459, filed Feb. 9, 2004, and titled MULTI-PHASE CORIOLIS FLOWMETER, now U.S. Pat. No. 7,059,199, issued Jun. 13, 2006, which itself claims priority under 35 U.S.C. §119(e) to both of (i) U.S. application Ser. No. 60/445,795, filed on Feb. 10, 2003, and titled MULTIPHASE CORIOLIS FLOWMETER, abandoned, and (ii) U.S. application Ser. No. 60/452,934, filed on Mar. 10, 2003, and titled MULTIPHASE CORIOLIS FLOWMETER. All of the above-listed applications are hereby incorporated by reference.

TECHNICAL FIELD

This description relates to flowmeters.

BACKGROUND

Flowmeters provide information about materials being transferred through a conduit, or flowtube. For example, mass flowmeters provide an indication of the mass of material being transferred through a conduit. Similarly, density flowmeters, or densitometers, provide an indication of the density of material flowing through a conduit. Mass flowmeters also may provide an indication of the density of the material.

For example, Coriolis-type mass flowmeters are based on the Coriolis effect, in which material flowing through a conduit is affected by a Coriolis force and therefore experiences an acceleration. Many Coriolis-type mass flowmeters induce a Coriolis force by sinusoidally oscillating a conduit about a pivot axis orthogonal to the length of the conduit. In such mass flowmeters, the Coriolis reaction force experienced by the traveling fluid mass is transferred to the conduit itself and is manifested as a deflection or offset of the conduit in the direction of the Coriolis force vector in the plane of rotation.

SUMMARY

According to one general aspect, a system includes a controller that is operable to receive a sensor signal from a first sensor connected to a vibratable flowtube containing a three-phase fluid flow that includes a first liquid, a second liquid, and a gas, the controller being further operable to analyze the sensor signal to determine an apparent flow parameter of the fluid flow, a second sensor that is operable to determine an apparent flow condition of the fluid flow, and a corrections module that is operable to input the apparent flow parameter and the apparent flow condition and determine a corrected flow parameter therefrom.

Implementations may include one or more of the following features. For example, the corrections module may be further operable to input the apparent flow parameter and the apparent flow condition and determine a corrected flow condition therefrom. The apparent flow parameter may include an apparent bulk density of the fluid flow, or an apparent bulk mass flow rate of the fluid flow.

The second sensor may include a liquid fraction probe that is operable to determine a liquid fraction measurement identifying a volume fraction of the first liquid with respect to the second liquid, or a void fraction determination system that is operable to determine a void fraction of the gas within the fluid flow.

A component flow rate determination system may be included that is operable to determine a flow rate of the first liquid within the fluid flow. The component flow rate determination system may be implemented at the controller, the corrections module, the second sensor, or a host computer in communications with the controller, the corrections module, or the second sensor.

A component flow rate determination system may be included that is operable to determine a flow rate of the gas within the fluid flow. Implementation of the corrections module may be associated with a processor of the controller, or with a processor of the second sensor. A host computer may be in communication with the controller or the second sensor and operable to implement the corrections module.

In the system, the second sensor may be operable to output a first apparent flow condition value to the controller for use in determination of a first corrected flow parameter value, and the controller may be operable to output the first corrected flow parameter value to the second sensor for determination of a first corrected flow condition value, and the second sensor may be operable to output a second corrected flow condition value to the controller for use in determination of the corrected flow parameter value.

The correction module may include a neural network that is operable to input the apparent flow parameter and the apparent flow condition and output the corrected flow parameter and a corrected flow condition. The neural network may include a first correction model that is particular to a type of the second sensor and flow condition and that is operable to output a corrected flow condition, and a second correction model that is particular to a type of the apparent flow parameter and that is operable to output the corrected flow parameter, wherein the first correction model may be operable to correct the apparent flow condition based on the apparent flow condition and the corrected flow parameter, and the second correction model may be operable to correct the apparent flow parameter based on the apparent flow parameter and the corrected flow condition.

The controller may be operable to correct the apparent flow parameter based on a theoretical relationship between the apparent flow parameter and the corrected flow parameter. The controller may be operable to correct the apparent flow parameter based on an empirical relationship between the apparent flow parameter and the corrected flow parameter.

The system may include a conduit connecting the second sensor and the vibratable flowtube, such that the fluid flow flows through the second sensor, the pipe, and the vibratable flowtube. The first liquid, the second liquid, and the gas may be co-mingled with one another within the fluid flow during determination of the flow condition by the second sensor.

According to another general aspect, an apparent bulk density of a multi-phase flow through a flowtube is determined, the multi-phase flow including a first liquid, a second liquid, and a gas. An apparent bulk mass flow rate of the multi-phase flow is determined, and a first mass flow rate of the first liquid is determined, based on the apparent bulk density and the apparent bulk mass flow rate.

Implementations may include one or more of the following features. For example, an apparent flow condition of the multi-phase flow other than the apparent bulk density and the apparent bulk mass flow rate may be determined, wherein determining the first mass flow rate of the first liquid comprises determining the first mass flow rate based on the apparent flow condition. In determining the first mass flow rate of the first liquid, a corrected flow condition may be determined, based on the apparent flow condition. In determining the corrected flow condition, a corrected bulk density and a corrected bulk mass flow rate may be determined.

Determining the apparent flow condition may include determining an apparent liquid fraction measurement of a volume fraction of the first liquid within the multi-phase flow, and/or determining an apparent gas void fraction of the gas within the multi-phase flow.

Determining the first mass flow rate of the first liquid may include determining a corrected bulk density, based on the apparent bulk density, and determining a corrected bulk mass flow rate, based on the apparent mass flow rate. Determining the corrected bulk density and determining the bulk mass flow rate may include determining a corrected flow condition, based on the apparent flow condition.

According to another general aspect, a flowmeter includes a vibratable flowtube containing a three-phase flow including a first liquid, a second liquid, and a gas, a driver connected to the flowtube and operable to impart motion to the flowtube, a sensor connected to the flowtube and operable to sense the motion of the flowtube and generate a sensor signal, and a controller connected to receive the sensor signal and determine a first flow rate of a first phase within a three-phase flow through the flowtube, based on the sensor signal.

According to another general aspect, a method of improving an output of a flowmeter includes determining an apparent bulk density of a multi-phase flow through a flowtube, the multi-phase flow including a first liquid, a second liquid, and a gas, determining an apparent bulk mass flow rate of the multi-phase flow, determining an apparent flow condition of the multi-phase flow, and correcting the apparent bulk density or the apparent mass flow rate, based on the apparent bulk density, the apparent mass flow rate, and the apparent flow condition.

According to another general aspect, a method of improving an output of a liquid fraction probe includes determining an apparent bulk density of a multi-phase flow through a flowtube, the multi-phase flow including a first liquid, a second liquid, and a gas, determining an apparent bulk mass flow rate of the multi-phase flow, determining an apparent liquid fraction the first liquid within the multi-phase flow, and correcting the apparent liquid fraction to obtain a corrected liquid fraction, based on the apparent bulk density, the apparent mass flow rate, and the apparent liquid fraction.

Implementations may include one or more of the following features. For example, a gas void fraction of the gas within the multi-phase flow may be determined based on the apparent bulk density, the apparent mass flow rate, and the corrected liquid fraction.

According to another general aspect, a method of obtaining a gas void fraction measurement includes determining an apparent bulk density of a multi-phase flow through a flowtube, the multi-phase flow including a first liquid, a second liquid, and a gas, determining an apparent bulk mass flow rate of the multi-phase flow, determining an apparent gas void fraction of the gas within the multi-phase flow, and correcting the apparent gas void fraction to obtain a corrected gas void fraction, based on the apparent bulk density, the apparent mass flow rate, and the apparent gas void fraction.

Implementations may include one or more of the following features. For example, a liquid fraction of the first liquid within the multi-phase flow may be determined based on the apparent bulk density, the apparent mass flow rate, and the corrected gas void fraction According to another general aspect, a system includes a conduit having a fluid flow therethrough, the fluid flow including at least a first liquid component, a second liquid component, and a gas component, a vibratable flowtube in series with the conduit and having the fluid flow therethrough, a first sensor operable to determine a first apparent property of the fluid flow through the conduit, a second sensor connected to the flowtube and operable to sense information about a motion of the flowtube, a driver connected to the flowtube and operable to impart energy to the flowtube, a control and measurement system operable to measure a second apparent property and a third apparent property of the fluid flow, and a corrections system operable to determine a corrected first property, a corrected second property, and a corrected third property, based on the first apparent property, the second apparent property, and the third apparent property.

According to another general aspect, a system includes a controller that is operable to determine a first apparent property of a fluid flow in which a first liquid, a second liquid, and a gas are co-mingled, a meter that is operable to measure a second apparent property of the fluid flow, and a corrections module that is operable to input the first apparent property and output a first corrected property, wherein the meter is operable to input the first corrected property and the second apparent property and output a second corrected property.

The details of one or more implementations are set forth in the accompanying drawings and the description below. Other features will be apparent from the description and drawings, and from the claims.

DESCRIPTION OF DRAWINGS

FIGS. 38A-B, 39, 40A-C, 41A-C, 42, 43, 44, 45, 46, 47, 48, 49, 50A-B, 51A-C, 52, 53A-C, 54A-C, 55A-C, 56, 57, 58, 59, 60, 61, 62, 63, 64A-B, 65A-C, 66A-C, 67A-C and 68 are graphs illustrating test and/or modeling results of various implementations described above with respect to FIGS. 1-37, or related implementations.

DETAILED DESCRIPTION

Types of flowmeters include digital flowmeters. For example, U.S. Pat. No. 6,311,136, which is hereby incorporated by reference, discloses the use of a digital flowmeter and related technology including signal processing and measurement techniques. Such digital flowmeters may be very precise in their measurements, with little or negligible noise, and may be capable of enabling a wide range of positive and negative gains at the driver circuitry for driving the conduit. Such digital flowmeters are thus advantageous in a variety of settings. For example, commonly-assigned U.S. Pat. No. 6,505,519, which is incorporated by reference, discloses the use of a wide gain range, and/or the use of negative gain, to prevent stalling and to more accurately exercise control of the flowtube, even during difficult conditions such as two-phase flow (e.g., a flow containing a mixture of liquid and gas).

Although digital flowmeters are specifically discussed below with respect to, for example, FIGS. 1 and 2, it should be understood that analog flowmeters also exist. Although such analog flowmeters may be prone to typical shortcomings of analog circuitry, e.g., low precision and high noise measurements relative to digital flowmeters, they also may be compatible with the various techniques and implementations discussed herein. Thus, in the following discussion, the term "flowmeter" or "meter" is used to refer to any type of device and/or system in which a Coriolis flowmeter system uses various control systems and related elements to measure a mass flow, density, and/or other parameters of a material(s) moving through a flowtube or other conduit.

Figure 1A:
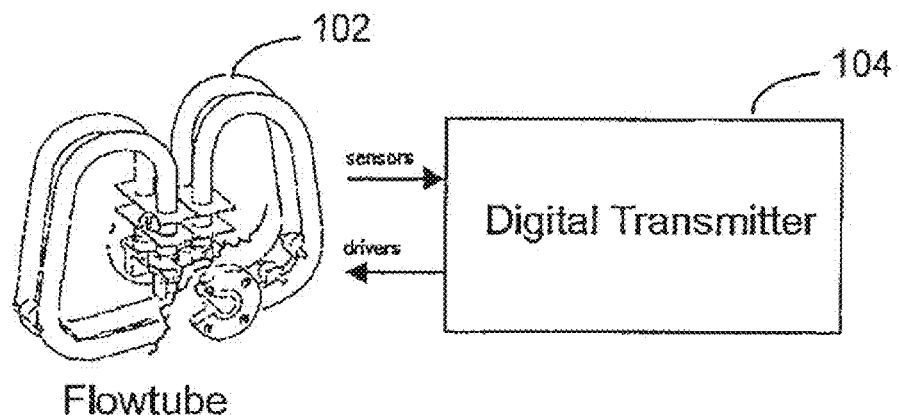
FIG. 1A is an illustration of a Coriolis flowmeter using a bent flowtube.

FIG. 1A is an illustration of a digital flowmeter using a bent flowtube 102. Specifically, the bent flowtube 102 may be used to measure one or more physical characteristics of, for example, a (traveling) fluid, as referred to above. In FIG. 1A, a digital transmitter 104 exchanges sensor and drive signals with the bent flowtube 102, so as to both sense an oscillation of the bent flowtube 102, and to drive the oscillation of the bent flowtube 102 accordingly. By quickly and accurately determining the sensor and drive signals, the digital transmitter 104, as referred to above, provides for fast and accurate operation of the bent flowtube 102. Examples of the digital transmitter 104 being used with a bent flowtube are provided in, for example, commonly-assigned U.S. Pat. No. 6,311,136.

Figure 1B:
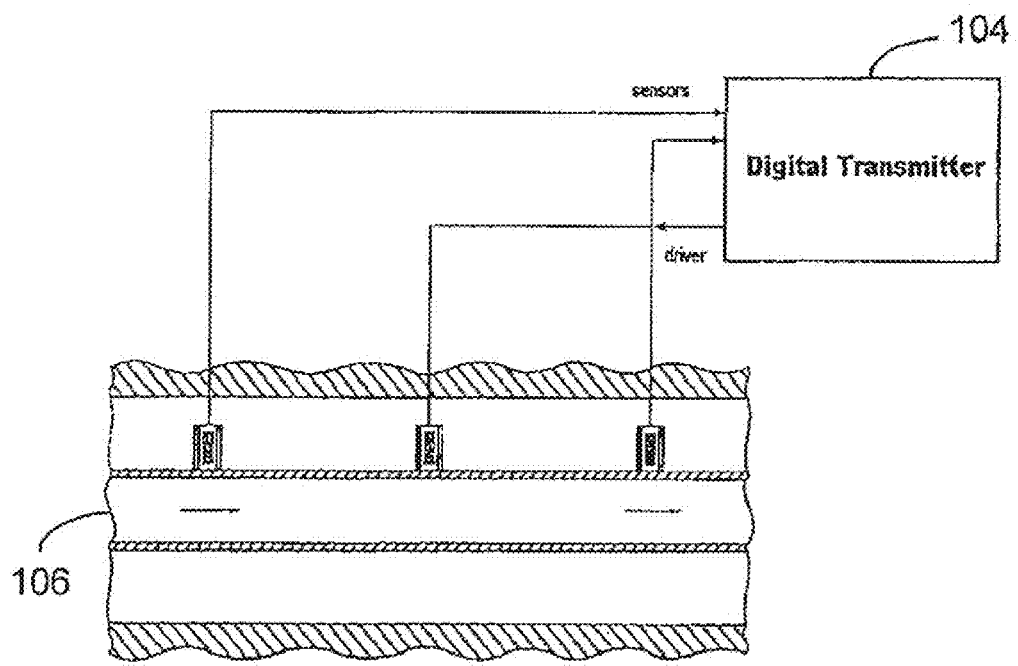
FIG. 1B is an illustration of a Coriolis flowmeter using a straight flowtube.

FIG. 1B is an illustration of a digital flowmeter using a straight flowtube 106. More specifically, in FIG. 1B, the straight flowtube 106 interacts with the digital transmitter 104. Such a straight flowtube operates similarly to the bent flowtube 102 on a conceptual level, and has various advantages/disadvantages relative to the bent flowtube 102. For example, the straight flowtube 106 may be easier to (completely) fill and empty than the bent flowtube 102, simply due to the geometry of its construction. In operation, the bent flowtube 102 may operate at a frequency of, for example, 50-110 Hz, while the straight flowtube 106 may operate at a frequency of, for example, 300-1,000 Hz. The bent flowtube 102 represents flowtubes having a variety of diameters, and may be operated in multiple orientations, such as, for example, in a vertical or horizontal orientation.

Figure 2:
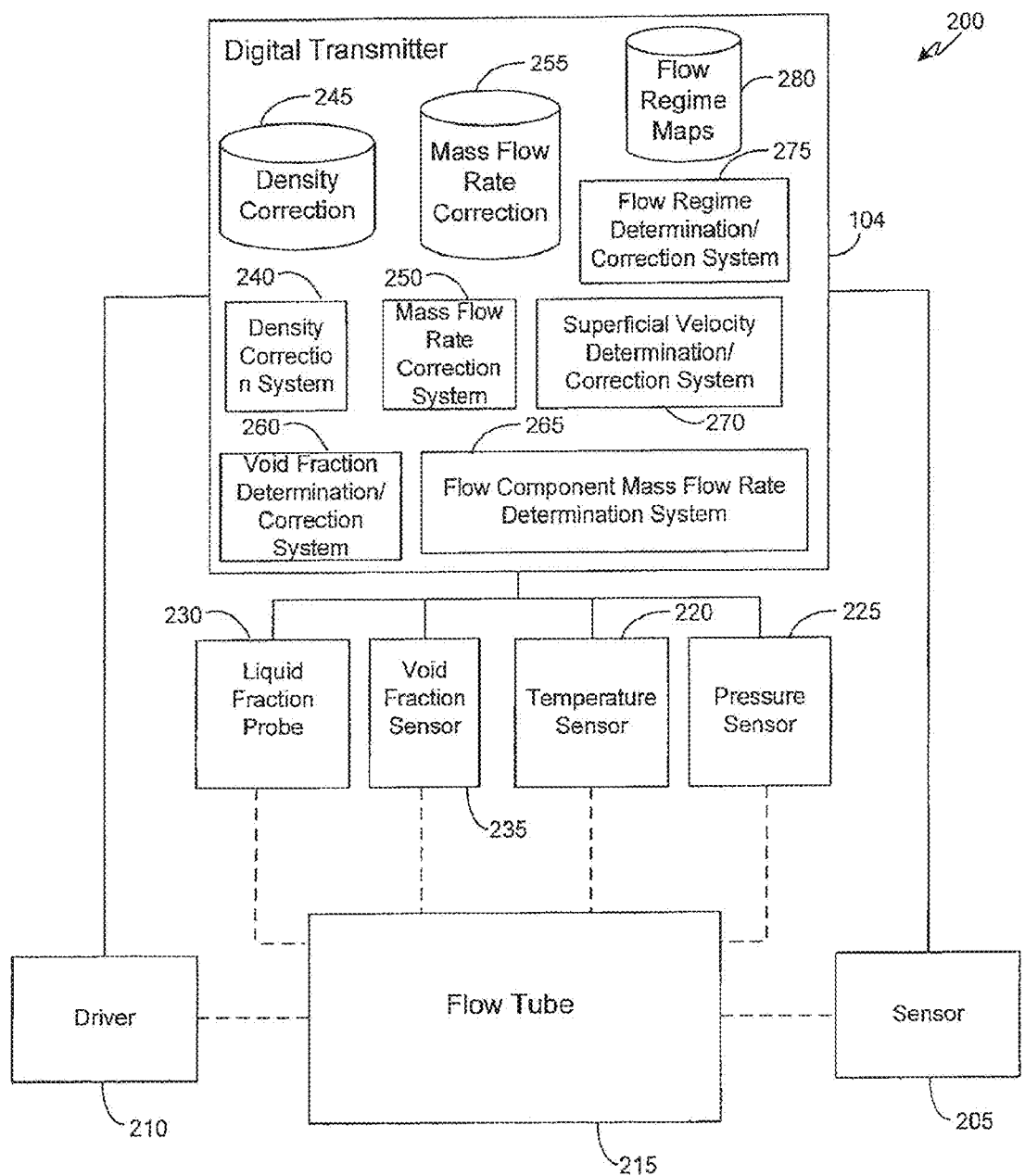
FIG. 2 is a block diagram of a Coriolis flowmeter.

Referring to FIG. 2, a digital mass flowmeter 200 includes the digital transmitter 104, one or more motion sensors 205, one or more drivers 210, a flowtube 215 (which also may be referred to as a conduit, and which may represent either the bent flowtube 102, the straight flowtube 106, or some other type of flowtube), and a temperature sensor 220. The digital transmitter 104 may be implemented using one or more of, for example, a processor, a Digital Signal Processor (DSP), a field-programmable gate array (FPGA), an ASIC, other programmable logic or gate arrays, or programmable logic with a processor core. It should be understood that, as described in U.S. Pat. No. 6,311,136, associated digital-to-analog converters may be included for operation of the drivers 210, while analog-to-digital converters may be used to convert sensor signals from the sensors 205 for use by the digital transmitter 104.

The digital transmitter 104 generates a measurement of, for example, density and/or mass flow of a material flowing through the flowtube 215, based at least on signals received from the motion sensors 205. The digital transmitter 104 also controls the drivers 210 to induce motion in the flowtube 215. This motion is sensed by the motion sensors 205.

Density measurements of the material flowing through the flowtube are related to, for example, the frequency of the motion of the flowtube 215 that is induced in the flowtube 215 by a driving force supplied by the drivers 210, and/or to the temperature of the flowtube 215.

Similarly, mass flow through the flowtube 215 is related to the phase and frequency of the motion of the flowtube 215, as well as to the temperature of the flowtube 215.

The temperature in the flowtube 215, which is measured using the temperature sensor 220, affects certain properties of the flowtube, such as its stiffness and dimensions. The digital transmitter 104 may compensate for these temperature effects. Also in FIG. 2, a pressure sensor 225 is in communication with the transmitter 104, and is connected to the flowtube 215 so as to be operable to sense a pressure of a material flowing through the flowtube 215.

It should be understood that both the pressure of the fluid entering the flowtube 215 and the pressure drop across relevant points on the flowtube may be indicators of certain flow conditions. Also, while external temperature sensors may be used to measure the fluid temperature, such sensors may be used in addition to an internal flowmeter sensor designed to measure a representative temperature for flowtube calibrations. Also, some flowtubes use multiple temperature sensors for the purpose of correcting measurements for an effect of differential temperature between the process fluid and the environment (e.g., a case temperature of a housing of the flowtube). As discussed in more detail below, one potential use for the inlet fluid temperature and pressure measurements is to calculate the actual densities of a liquid and gas in a two-phase flow, based on predefined formulae.

A liquid fraction probe 230 refers to a device for measuring a volume fraction of liquid, e.g., water, when a liquid in the flowtube 215 includes water and another fluid, such as oil. Of course, such a probe, or similar probes, may be used to measure the volume fraction of a fluid other than water, if such a measurement is preferred or if the liquid does not include water. In the below description, a measured liquid is generally assumed to be water for the purposes of example, so that the liquid fraction probe 230 is generally referred to as a water fraction probe 230, or a water-cut probe 230.

A void fraction sensor 235 measures a percentage of a material in the flowtube 215 that is in gaseous form. For example, water flowing through the flowtube 215 may contain air, perhaps in the form of bubbles. Such a condition, in which the material flowing through the flowtube 215 contains more than one material is generally referred to as "two-phase flow." In particular, the term "two-phase flow" may refer to a liquid and a gas; however, "two-phase flow" also may refer to other combinations of materials, such as two liquids (e.g., oil and water).

Various techniques, represented generally in FIG. 2 by the void fraction sensor 235, exist for measuring the gas void fraction in a two-phase flow of liquid and gas. For example, various sensors or probes exist that may be inserted into the flow to determine a gas void fraction. As another example, a venturi tube (i.e., a tube with a constricted throat that determines fluid pressures and velocities by measurement of differential pressures generated at the throat as a fluid traverses the tube), relying on the fact that gas generally moves with a higher velocity than liquid(s) through a restriction, may be used to determine a pressure gradient and thereby allow a determination of the gas void fraction. Measurements of gas void fractions also may be obtained using equipment that is wholly external to the flowtube. For example, sonar measurements may be taken to determine gas void fraction. As a specific example of such a sonar-based system, the SONARtrac™ gas void fraction monitoring system produced by CiDRA Corporation of Wallingford, Conn. may be used.

In this description, an amount of gas in a flowing fluid, measured by the void fraction sensor or otherwise determined, is referred to as void fraction or α, and is defined as α=volume of gas/total volume=volume of gas/(volume of liquid+volume of gas). Accordingly, a quantity referred to herein as the liquid fraction is defined as 1−α.

In many applications where mass flow measurements are required, the void fraction of the flow can be as high as 20, 30, 40% or more. However, even at very small void fractions of 0.5%, the fundamental theory behind the Coriolis flowmeter becomes less applicable.

Moreover, a presence of gas in the fluid flow also may affect both an actual and a measured value of a density of the fluid flow, generally causing the density measurement to be, and to read, lower than if the fluid flow contained only the liquid component. That is, it should be understood that a density $\rho_{liquid}$ of a liquid flowing by itself through a flowtube will be higher than an actual density $\rho_{true}$ of a two-phase flow containing the liquid and a gas, since a density of the gas (e.g., air) will generally be lower than a density of the liquid (e.g., water) in the two-phase flow. In other words, there is a density reduction when gas is added to a liquid flow that previously contained only the liquid.

Beyond this physical phenomenon, a Coriolis meter measuring a two-phase fluid flow containing gas may output a density reading $\rho_{apparent}$ that is an ostensible measurement of the bulk density of the two-phase flow (e.g., of the water and air combined). This raw measurement $\rho_{apparent}$ will generally be different (lower) than the actual bulk density $\rho_{true}$ of the two-phase flow. For example, the resonant frequency used by the flowmeter may be correct for a situation in which only the liquid component is present, but, due to relative motion of the gas in the fluid flow, which serves to mask an inertia of the flowtube (i.e., causes an amount of inertia to be less than would be expected for a liquid-only flow), the density measurement may read low. It should be understood that many conventional prior art flowmeters were unconcerned with this problem, since most such Coriolis meters fail to continue operating (e.g. stall or output inaccurate measurements) at even the slightest amounts of void fraction.

U.S. Pat. No. 6,505,519, which is incorporated by reference above, discloses that such a variation of $\rho_{apparent}$ (i.e., an indicated bulk density reading of a two-phase flow that is output by a Coriolis flowmeter) from $\rho_{true}$ (i.e., an actual bulk density of the two-phase flow) may be characterized by a variety of techniques. As a result, a measured $\rho_{apparent}$ may be corrected to obtain an actual bulk density $\rho_{corrected}$, which is, at least approximately, equal to $\rho_{true}$.

Somewhat similarly, an indicated bulk mass flow rate $MF_{apparent}$ (i.e., a mass flow rate of the entire two-phase flow) measured by a Coriolis flowmeter may be different by a predictable or characterizable amount from an actual bulk mass flow rate $MF_{true}$. It should be understood that correction techniques for corrected bulk mass flow rate $MF_{true}$ may be different than the techniques for correcting for density. For example, various techniques for correcting a measured $MF_{apparent}$ to obtain an actual $MF_{true}$ (or, at least, $MF_{corrected}$) are discussed in U.S. Pat. No. 6,505,519.

Examples of detailed techniques for correcting $\rho_{apparent}$ and $MF_{apparent}$ are discussed in more detail below. Generally speaking, though, with respect to FIG. 2, the digital transmitter is shown as including a density correction system 240, which has access to a density correction database 245, and a mass flow rate correction system 250, which has access to a mass flow correction database 255. As discussed in more detail below, the databases 245 and 255 may contain, for example, correction algorithms that have been derived theoretically or obtained empirically, and/or correction tables that provide corrected density or mass flow values for a given set of input parameters. The databases 245 and 255 also may store a variety of other types of information that may be useful in performing the density or mass flow corrections. For example, the density correction database may store a number of densities $\rho_{liquid}$ corresponding to particular liquids (e.g., water or oil).

Further in FIG. 2, a void fraction determination/correction system 260 is operable to determine a void fraction of a two-phase flow including a liquid and a gas. In one implementation, for example, the void fraction determination/correction system 260 may determine an actual void fraction $\alpha_{true}$ from the corrected density $\rho_{corrected}$. In another implementation, the void fraction determination/correction system 260 may input an apparent or indicated void fraction measurement obtained by the void fraction sensor 235, and may correct this measurement based on an error characterization similar to the density and mass flow techniques referred to above. In another implementation, the void fraction sensor 235 may be operable to directly measure an actual void fraction $\alpha_{true}$, in which case the void fraction determination/correction system 260 simply inputs this measurement.

Once the factors of $\rho_{corrected}$, $MF_{corrected}$, and $\alpha_{corrected}$ have been determined, and perhaps in conjunction with other known or discoverable quantities, a flow component mass flow rate determination system 265 operates to simultaneously determine a mass flow rate for the liquid phase component and a mass flow rate for the gas phase component. That is, the transmitter 104 is operable to determine individual flowrates $MF_{liquid}$ and $MF_{gas}$ of the flow components, as opposed to merely determining the bulk flowrate of the combined or total two-phase flow $MF_{true}$. Although, as just referred to, such measurements may be determined and/or output simultaneously, they also may be determined separately or independently of one another.

Once the component flow rates $MF_{liquid}$ and $MF_{gas}$ have been determined in the manner generally outlined above, these initial determinations may be improved upon by a process that relies on superficial velocities of the flow components, slip velocities between the components, and/or an identified flow regime of the flow. In this way, improved values for flow rates $MF_{liquid}$ and $MF_{gas}$ may be obtained, or may be obtained over time as those flow rates change.

Superficial velocities are referred to herein as those velocities that would exist if the same mass flow rate of a given phase was traveling as a single phase through the flowtube 215. A superficial velocity determination/correction system 270 is included in the transmitter 104 for, for example, determining an apparent or corrected superficial velocity of a gas or liquid in the two-phase flow.

Slip velocities refer to a condition in which gas and liquid phases in a two-phase flow have different average velocities. That is, an average velocity of a gas $AV_{gas}$ is different from an average velocity of a liquid $AV_{liquid}$. As such, a phase slip S may be defined as $S=AV_{gas}/AV_{liquid}$.

A flow regime is a term that refers to a characterization of the manner in which the two phases flow through the flowtube 215 with respect to one another and/or the flowtube 215, and may be expressed, at least partially, in terms of the superficial velocities just determined. For example, one flow regime is known as the "bubble regime," in which gas is entrained as bubbles within a liquid. As another example, the "slug regime" refers to a series of liquid "plugs" or "slugs" separated by relatively large gas pockets. For example, in vertical flow, the gas in a slug flow regime may occupy almost an entire cross-sectional area of the flowtube 215, so that the resulting flow alternates between high-liquid and high-gas composition. Other flow regimes are known to exist and to have certain defined characteristics, including, for example, the annular flow regime, the dispersed flow regime, and froth flow regime, and others.

The existence of a particular flow regime is known to be influenced by a variety of factors, including, for example, a gas void fraction in the fluid flow, an orientation of the flowtube 215 (e.g., vertical or horizontal), a diameter of the flowtube 215, the materials included within the two-phase flow, and the velocities (and relative velocities) of the materials within the two phase flow. Depending on these and other factors, a particular fluid flow may transition between several flow regimes over a given period of time.

Information about phase slip may be determined at least in part from flow regime knowledge. For example, in the bubble flow regime, assuming the bubbles are uniformly distributed, there may be little relative motion between the phases. Where the bubbles congregate and combine to form a less uniform distribution of the gas phase, some slippage may occur between the phases, with the gas tending to cut through the liquid phase.

In FIG. 2, a flow regime determination system 275 is included that has access to a database 280 of flow regime maps. In this way, information about an existing flow regime, including phase slip information, may be obtained, stored, and accessed for use in simultaneously determining liquid and gas mass flow rates within a two-phase flow.

In FIG. 2, it should be understood that the various components of the digital transmitter 104 are in communication with one another, although communication links are not explicitly illustrated, for the sake of clarity. Further, it should be understood that conventional components of the digital transmitter 104 are not illustrated in FIG. 2, but are assumed to exist within, or be accessible to, the digital transmitter 104. For example, the digital transmitter 104 will typically include (bulk) density and mass flow rate measurement systems, as well as drive circuitry for driving the driver 210.

Figure 3:
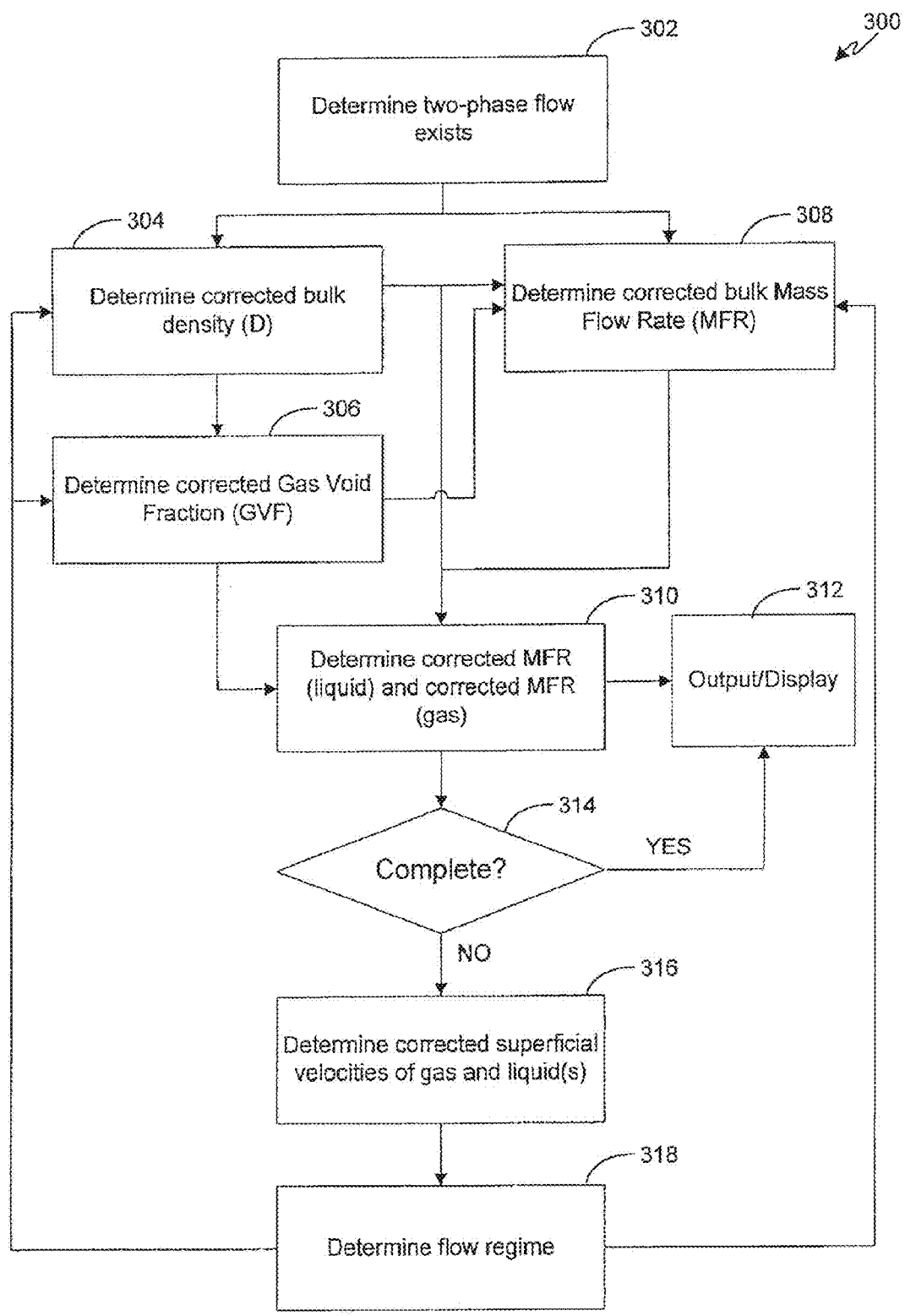
FIG. 3 is a flowchart illustrating an operation of the Coriolis flowmeter of FIG. 2.

FIG. 3 is a flowchart 300 illustrating an operation of the Coriolis flowmeter 200 of FIG. 2. Specifically, FIG. 3 illustrates techniques by which the flowmeter 200 of FIG. 2 is operable to simultaneously determine liquid and gas flow rates $MF_{liquid}$ and $MF_{gas}$ for a two-phase flow.

In FIG. 3, it is determined that a gas/liquid two-phase flow exists in the flowtube 215 (302). This can be done, for example, by an operator during configuration of the mass flowmeter/densitometer for gas/liquid flow. As another example, this determination may be made automatically by using a feature of the Coriolis meter to detect that a condition of two-phase gas-liquid flow exists. In the latter case, such techniques are described in greater detail in, for example, U.S. Pat. Nos. 6,311,136 and 6,505,519, incorporated by reference above.

Once the existence of two-phase flow is established, a corrected bulk density $\rho_{corrected}$ is established (304) by the density correction system 240, using the density correction database 245 of the transmitter 104. That is, an indicated density $\rho_{apparent}$ is corrected to obtain $\rho_{corrected}$. Techniques for performing this correction are discussed in more detail below.

Once $\rho_{corrected}$ is determined, a corrected gas void fraction $\alpha_{corrected}$ may be determined (306) by the void fraction determination/correction system 260. Also, a corrected bulk mass flow rate $MF_{corrected}$ is determined (308) by the mass flow rate correction system 250. As with density, techniques for obtaining the corrected void fraction $\alpha_{true}$ and mass flow rate $MF_{corrected}$ are discussed in more detail below.

In FIG. 3, it should be understood from the flowchart 300 that the determinations of $\rho_{corrected}$, $\alpha_{corrected}$, and $MF_{corrected}$ may occur in a number of sequences. For example, in one implementation, the corrected void fraction $\alpha_{corrected}$ is determined based on previously-calculated corrected density $\rho_{corrected}$, whereupon the corrected mass flow rate $MF_{corrected}$ is determined based on $\alpha_{corrected}$. In another implementation, $\alpha_{corrected}$ and $\rho_{corrected}$ may be calculated independently of one another, and/or $\rho_{corrected}$ and $MF_{corrected}$ may be calculated independently of one another.

Once corrected density $\rho_{corrected}$, corrected void fraction $\alpha_{corrected}$, and corrected mass flow rate $MR_{corrected}$ are known, then the mass flow rates of the gas and liquid components are determined (310) by the flow component mass flow rate determination system 265. Techniques for determining the liquid/gas component flow rates are discussed in more detail below with respect to FIG. 4.

Once determined, the liquid/gas component flow rates may be output or displayed (312) for use by an operator of the flowmeter. In this way, the operator is provided, perhaps simultaneously, with information about both the liquid mass flow rate $MF_{liquid}$ and the gas mass flow rate $MF_{gas}$ of a two-phase flow.

In some instances, this determination may be sufficient (314), in which case the outputting of the liquid/gas component flow rates completes the process flow. However, in other implementations, the determination of the individual component mass flow rates may be improved upon by factoring in information about, for example, the superficial velocities of the gas/liquid components, the flow regime(s) of the flow, and phase slip, if any, between the components.

In particular, superficial velocities of the gas and liquid, $SV_{gas}$ and $SV_{liquid}$ are determined as follows. Gas superficial velocity $SV_{gas}$ is defined as:

$$SV_{gas} = MF_{gas}/(\rho_{gas} * A_T) \quad \text{Eq. 1}$$

where the quantity $A_T$ represents a cross-section area of the flowtube 215, which may be taken at a point where a void fraction of the flow is measured. Similarly, a liquid superficial velocity $SV_{liquid}$ is defined as:

$$SV_{liquid} = MF_{liquid}/(\rho_{liquid} * A_T) \quad \text{Eq. 2}$$

As shown in Eqs. 1 and 2, determination of superficial velocities in this context relies on the earlier determination of $MF_{gas}$ and $MF_{liquid}$. It should be understood from the above description and from FIG. 3 that $MF_{gas}$ and $MF_{liquid}$ represent corrected or true mass flow rates, $MF_{gas}^{corrected}$ and $MF_{liquid}^{corrected}$ since these factors are calculated based on $\rho_{true}$, $\alpha_{true}$, and $MF_{true}$. As a result, the superficial velocities $SV_{gas}$ and $SV_{liquid}$ represent corrected values $SV_{gas}^{corrected}$ and $SV_{liquid}^{corrected}$. Further, the density values $\rho_{gas}$ and $\rho_{liquid}$ refer, as above, to known densities of the liquid and gas in question, which may be stored in the density correction database 245. As discussed in more detail below with respect to techniques for calculating corrected density $\rho_{corrected}$, the density values $\rho_{gas}$ and $\rho_{liquid}$ may be known as a function of existing temperature or pressure, as detected by temperature sensor 220 and pressure sensor 225.

Using the superficial velocities and other known or calculated factors, some of which may be stored in the flow regime maps database 280, a relevant flow regime and/or phase slip may be determined (318) by the flow regime determination/correction system 275. Once superficial velocities, flow regime, and phase slip are known, further corrections may be made to the corrected bulk density $\rho_{true}$, corrected bulk mass flow rate $MF_{corrected}$, and/or corrected void fraction $\alpha_{corrected}$. In this way, as illustrated in FIG. 3, component flow rates $MF_{gas}$ and $MF_{liquid}$ may be determined.

Flow regime(s) in two phase liquid/gas flow may be described by contours on a graph plotting the liquid superficial velocity versus the gas superficial velocity. As just described, an improvement to determinations of $\rho_{corrected}$, $\alpha_{corrected}$, and/or $MF_{corrected}$ may be obtained by first establishing an approximate value of the liquid and gas flow rates, and then applying a more detailed model for the flow regime identified. For example, at relatively low GVF and relatively high flow there exists a flow regime in which the aerated fluid behaves as a homogenous fluid with little or no errors in both density and mass flow. This can be detected as homogenous flow requiring no correction, simply using observation of the drive gain, which shows little or no increase in such a setting, despite a significant drop in observed density.

Figure 4:
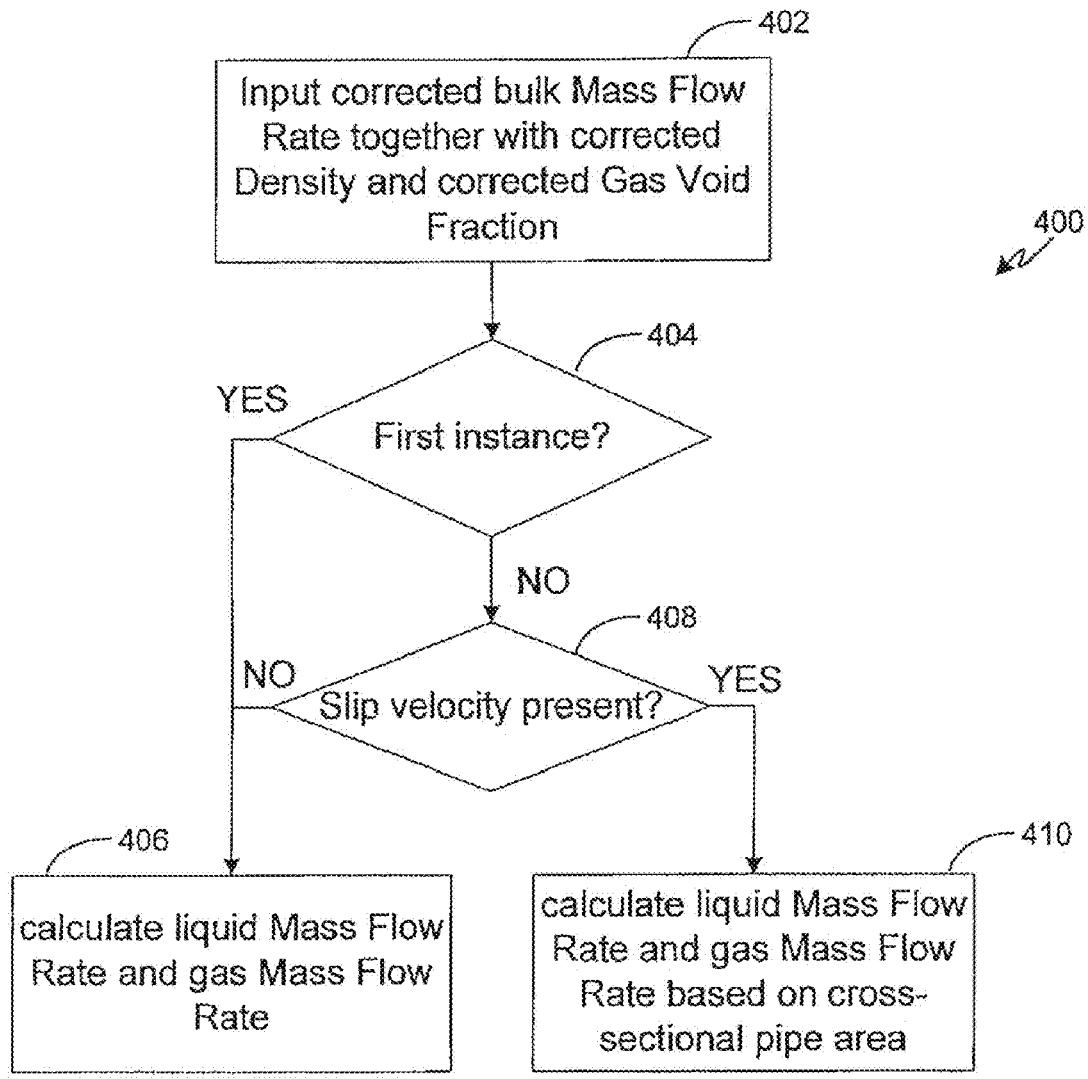
FIG. 4 is a flowchart illustrating techniques for determining liquid and gas flow rates for a two-phase flow.

FIG. 4 is a flowchart 400 illustrating techniques for determining liquid and gas flow rates $MF_{liquid}$ and $MF_{gas}$ for a two-phase flow. That is, the flowchart 400 generally represents one example of techniques for determining liquid and gas flow rates (310), as described above with respect to FIG. 3.

In FIG. 4, the determination of liquid and gas flow rates (310) begins with inputting the corrected density, void fraction, and mass flow rate factors $\rho_{corrected}$, $\alpha_{corrected}$, and $MF_{corrected}$ (402). In a first instance, (404), the liquid and gas flow rates are determined (406) using Eqs. 3 and 4:

$$MF_{gas} = \alpha_{corrected}(\rho_{gas}/\rho_{true})(MF_{corrected}) \quad \text{Eq. 3}$$

$$MF_{liquid} = (1-\alpha_{corrected})(\rho_{liquid}/\rho_{corrected})(MF_{corrected}) \quad \text{Eq. 4}$$

Eqs. 3 and 4 assume that there is no slip velocity (i.e., phase slip) between the liquid and gas phases (i.e., average velocity of the gas phase, $AV_{gas}$, and average velocity of the liquid phase, $AV_{liquid}$, are equal). This assumption is consistent with the fact that, in the first instance, superficial velocities and flow regimes (and therefore, phase slip) have not been determined.

In the second instance and thereafter (404), a determination is made, perhaps by the flow regime determination/correction system 275, as to whether phase slip exists (408). If not, then Eqs. 3 and 4 are used again (406) or the process ends.

If phase slip does exist (408), defined above as $S = AV_{gas}/AV_{liquid}$, the terms $MF_{gas}$ and $MF_{liquid}$ are calculated using the cross-sectional area of the flowtube 215, $A_T$, as also used in the calculation of superficial velocities in Eqs. 1 and 2 (410). Using the definition of slip S just given, $$MF_{gas} = \rho_{gas}(\alpha_{corrected}A_T)(AV_{gas}) = \rho_{gas}(\alpha_{corrected}A_T)(S)(AV_{liquid}) \quad \text{Eq. 5}$$

$$MF_{liquid} = \rho_{liquid}((1-\alpha_{corrected}A_T)(AV_{liquid}) \quad \text{Eq. 6}$$

Since $MF_{corrected} = MF_{gas} + MF_{liquid}$, Eqs. 5 and 6 may be solved for $AV_{liquid}$ to obtain Eq. 7:

$$AV_{liquid} = MF_{true}/(A_T(\rho_{gas}\alpha_{corrected} + \rho_{liquid}(1-\alpha_{corrected}))) \quad \text{Eq. 7}$$

As a result, the liquid and gas flow rates are determined (406) using Eqs. 8 and 9:

$$MF_{liquid} = [\rho_{liquid}(1-\alpha_{corrected})/(\rho_{gas}\alpha_{corrected} + \rho_{liquid}(1-\alpha_{corrected}))][MF_{corrected}] \quad \text{Eq. 8}$$

$$MF_{gas} = MF_{corrected} - MF_{liquid} \quad \text{Eq. 9}$$

As described above, gas entrained in liquid forms a two-phase flow. Measurements of such a two-phase flow with a Coriolis flowmeter result in indicated parameters $\rho_{apparent}$, $\alpha_{apparent}$, and $MF_{apparent}$ for density, void fraction, and mass flow rate, respectively, of the two-phase flow. Due to the nature of the two-phase flow in relation to an operation of the Coriolis flowmeter, these indicated values are incorrect by a predictable factor. As a result, the indicated parameters may be corrected to obtain actual parameters $\rho_{corrected}$, $\alpha_{corrected}$, and $MF_{corrected}$. In turn, the actual, corrected values may be used to simultaneously determine individual flow rates of the two (gas and liquid) components.

Figure 5A:
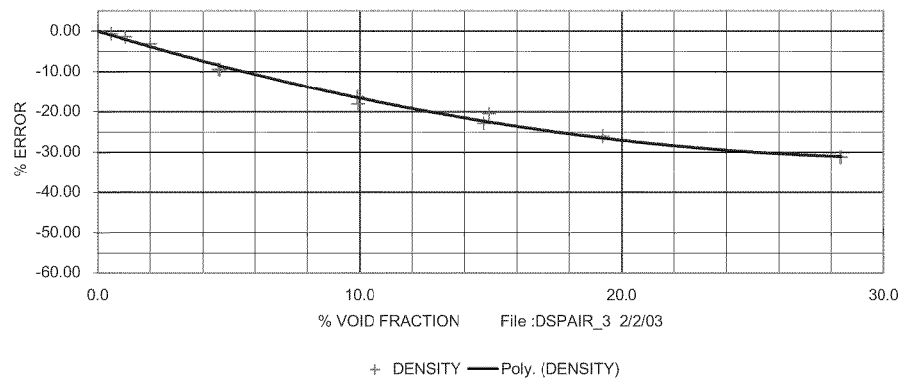
FIGS. 5A and 5B are graphs illustrating a percent error in a measurement of void fraction and liquid fraction, respectively.
Figure 5B:
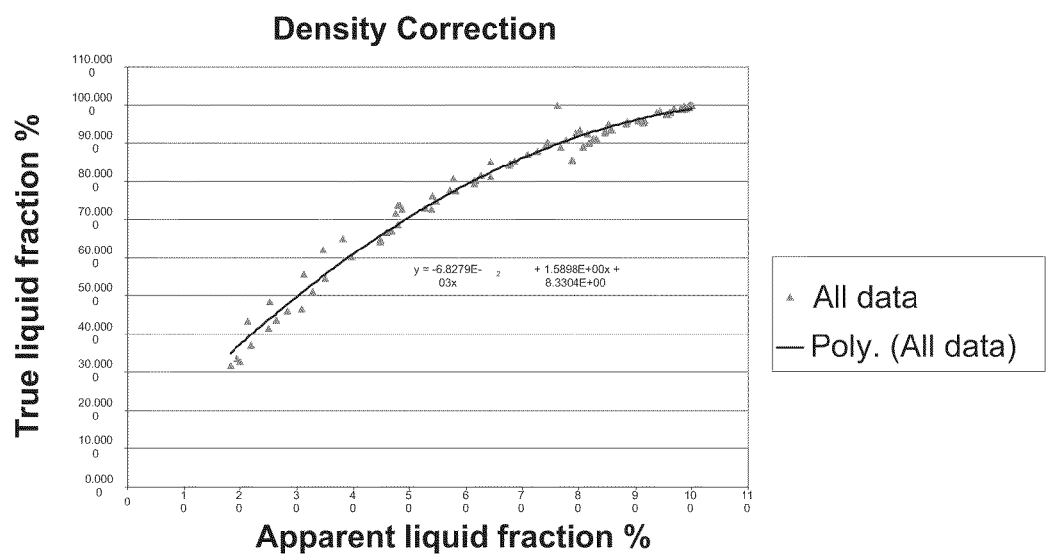

FIGS. 5A and 5B are graphs illustrating a percent error in a measurement of void fraction and liquid fraction, respectively. In FIG. 5A, the percent error is a density percent error that is dependent on various design and operational parameters, and generally refers to the deviation of the apparent (indicated) density from the true combined density that would be expected given the percentage (%) of gas in liquid.

In FIG. 5B, true liquid fraction versus indicated liquid fraction is illustrated. FIG. 5B shows the results, for the relevant flowmeter design, of several line sizes and flow rates. In more general terms, the functional relationship may be more complex and depend on both line size and flowrate. In FIG. 5B, a simple polynomial fit is shown that can be used to correct the apparent liquid fraction.

Figure 6:
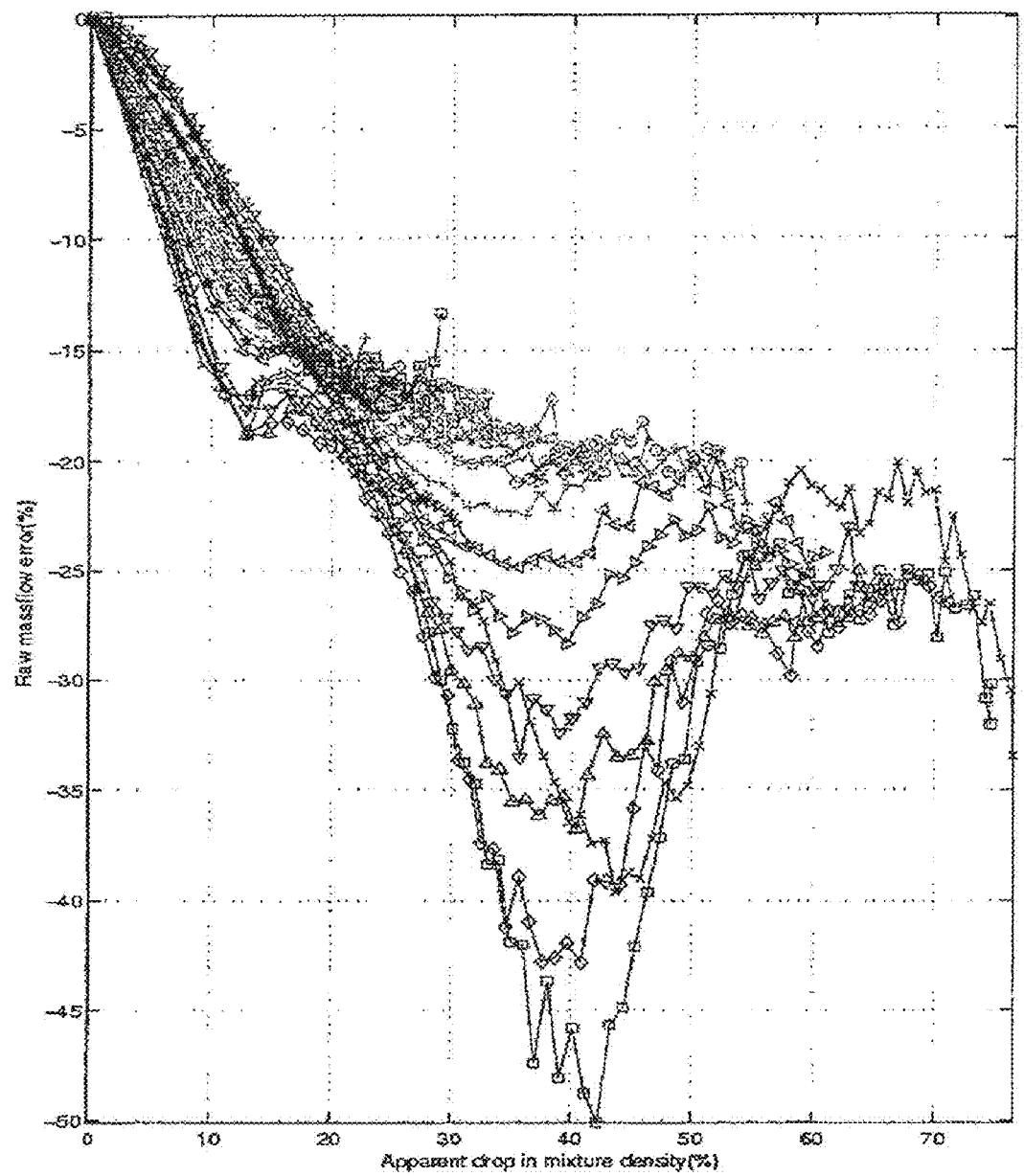
FIG. 6 is a graph illustrating a mass flow error as a function of a drop in density for a flowtube having a particular orientation and over a selected flow range.

Other graphing techniques may be used; for example, true void fraction may be plotted against indicated void fraction. For example, FIG. 6 is a graph illustrating a mass flow error as a function of a drop in density for a flowtube having a particular orientation and over a selected flow range.

Figure 7:
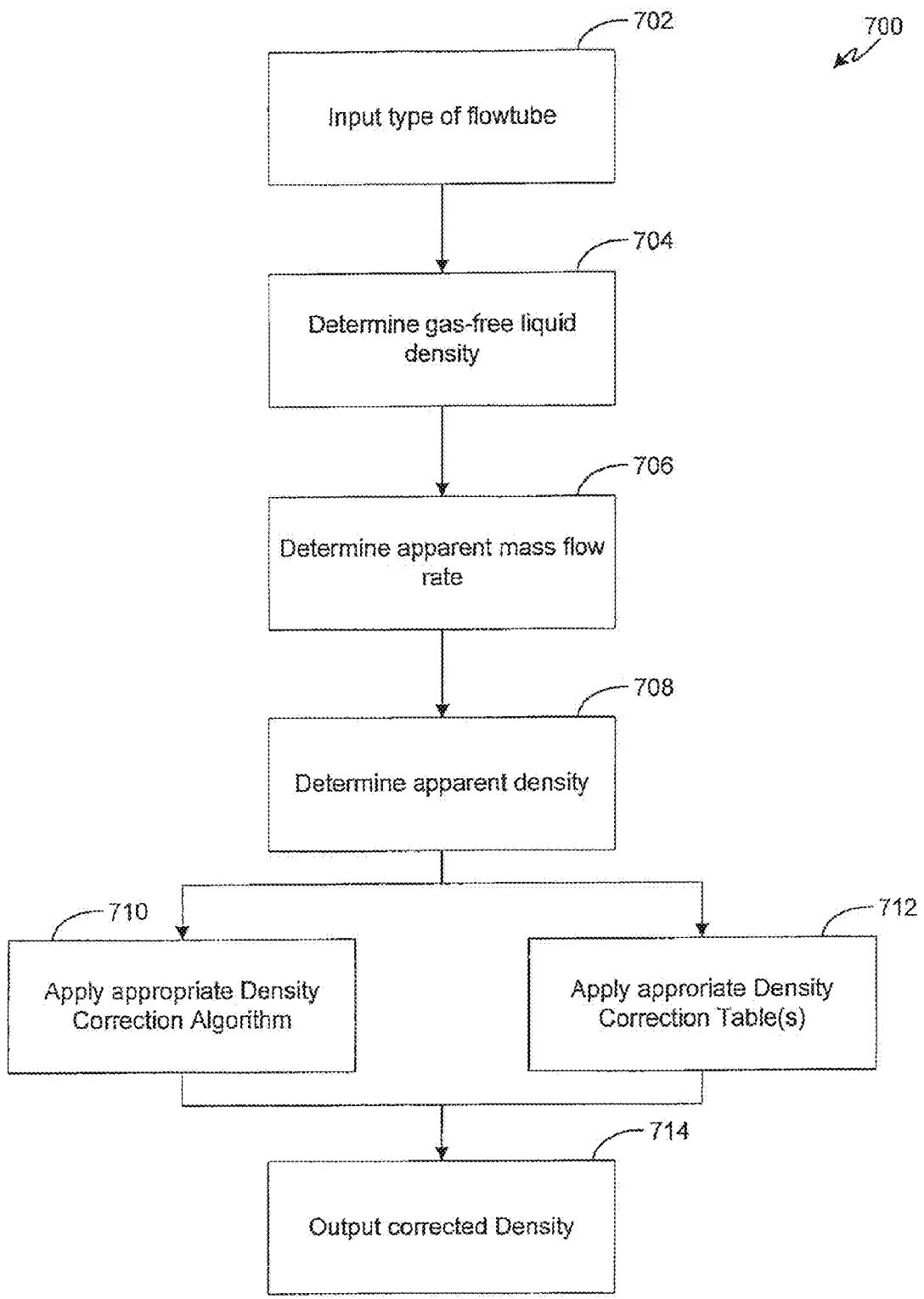
FIG. 7 is a flowchart illustrating techniques for correcting density measurements.

FIG. 7 is a flowchart 700 illustrating techniques for correcting density measurements (304 in FIG. 3). In FIG. 7, the process begins with an inputting of the type of flowtube 215 being used (702), which may include, for example, whether the flowtube 215 is bent or straight, as well as other relevant facts such as a size or orientation of the flowtube 215.

Next, a gas-free density of the liquid, $\rho_{liquid}$ is determined (704). This quantity may be useful in the following calculation(s), as well as in ensuring that other factors that may influence the density measurement $\rho_{apparent}$, such as temperature, are not misinterpreted as void fraction effects. In one implementation, the user may enter the liquid density $\rho_{liquid}$ directly, along with a temperature dependence of the density. In another implementation, known fluids (and their temperature dependencies) may be stored in the density correction database 245, in which case the user may enter a fluid by name. In yet another implementation, the flowmeter 200 may determine the liquid density during a time of single-phase, liquid flow, and store this value for future use.

An indicated mass flow rate $MF_{apparent}$ is read from the Coriolis meter (706), and then an indicated density $\rho_{apparent}$ is read from the Coriolis meter (708). Next, the density correction system 240 applies either a theoretical, algorithmic (710) or empirical, tabular correction (712) to determine the true density $\rho_{true}$ of the gas/liquid mixture. The quantity $\rho_{true}$ may then be output as the corrected density (714).

An algorithmic density correction (710) may be determined based on the knowledge that, if there were no effect of the two-phase flow from the normal operation of a Coriolis meter when used to measure density, the indicated density would drop by an amount derived from the equation describing void fraction, which is set forth above in terms of volume flow and repeated here in terms of density as Eq. 10:

$$\alpha_{(\%)} = [(\rho_{apparent} - \rho_{liquid})/(\rho_{gas} - \rho_{liquid})] \times 100 \quad \text{Eq. 10}$$

This can be used to define a quantity "density drop," or $\Delta\rho$, as shown in Eq. 11:

$$\Delta\rho = (\rho_{liquid} - \rho_{apparent})/\rho_{liquid} = \alpha_{(\%)} \times ((\rho_{liquid} - \rho_{gas})/\rho_{liquid})/100 \quad \text{Eq. 11}$$

Note that Eq. 11 shows the quantity $\Delta\rho$ as being positive; however, this quantity could be shown as a negative drop simply by multiplying the right-hand side of the equation by −1, resulting in Eq. 12:

$$\Delta\rho = (\rho_{apparent} - \rho_{liquid})/\rho_{liquid} = \alpha_{(\%)} \times ((\rho_{gas} - \rho_{liquid})/\rho_{liquid})/100 \quad \text{Eq. 12}$$

The quantity $\rho_{gas}$ may be small compared to $\rho_{liquid}$, in which case Eq. 12 may be simplified to Eq. 13:

$$\Delta\rho = (\rho_{liquid} - \rho_{apparent}) = \alpha_{(\%)}/100 \quad \text{Eq. 13}$$

As discussed extensively above, density measurements by a Coriolis meter, or any vibrating densitometer, generally are under-reported by the meter, and require correction. Accordingly, under two-phase flow Eqs. 12 or 13 may thus be used to define the following two quantities: a corrected or true density drop, $\Delta\rho_{true}$, and an indicated or apparent density drop, $\Delta\rho_{app}$. Using Eq. 13 as one example, this results in Eqs. 14 and 15:

$$\Delta\rho_{true} = (\rho_{liquid} - \rho_{true}) = \alpha_{(\%)}/100 \quad \text{Eq. 14}$$

$$\Delta\rho_{app} = (\rho_{liquid} - \rho_{apparent}) = \alpha_{(\%)}/100 \quad \text{Eq. 15}$$

There can be derived or empirically determined a relationship between $\Delta\rho_{true}$ and $\Delta\rho_{apparent}$ and apparent mass flow rate, $MF_{apparent}$, as well as other parameters, such as, for example, drive gain, sensor balance, temperature, phase regime, etc. This relationship can be expressed as shown as $\Delta\rho_{true} = f(MF_{apparent}, \rho_{apparent},$ drive gain, sensor balance, temperature, phase regime, and/or other factors).

As a result, the relationship may generally be derived, or at least proven, for each flowtube in each setting. For one model flowtube, known and referred to herein as the Foxboro/Invensys CFS10 model flowtube, it has been empirically determined that for some conditions the above functional relationship can be simplified to be only a function $\Delta\rho_{apparent}$ and of the form shown in Eq. 16:

$$\Delta\rho_{true} = \sum_{i=0}^{M} a_i (\Delta\rho_{apparent})^i \quad \text{Eq. 16}$$

To force the condition for both sides of Eq. 16 to be zero when there is no apparent density drop relationship results in Eq. 17:

$$\Delta\rho_{true} = \sum_{i=1}^{M} a_i (\Delta\rho_{apparent})^i \quad \text{Eq. 17}$$

M generally depends on the complexity of the empirical relationship, but in many cases can be as small as 2 (quadratic) or 3 (cubic).

Figure 9:
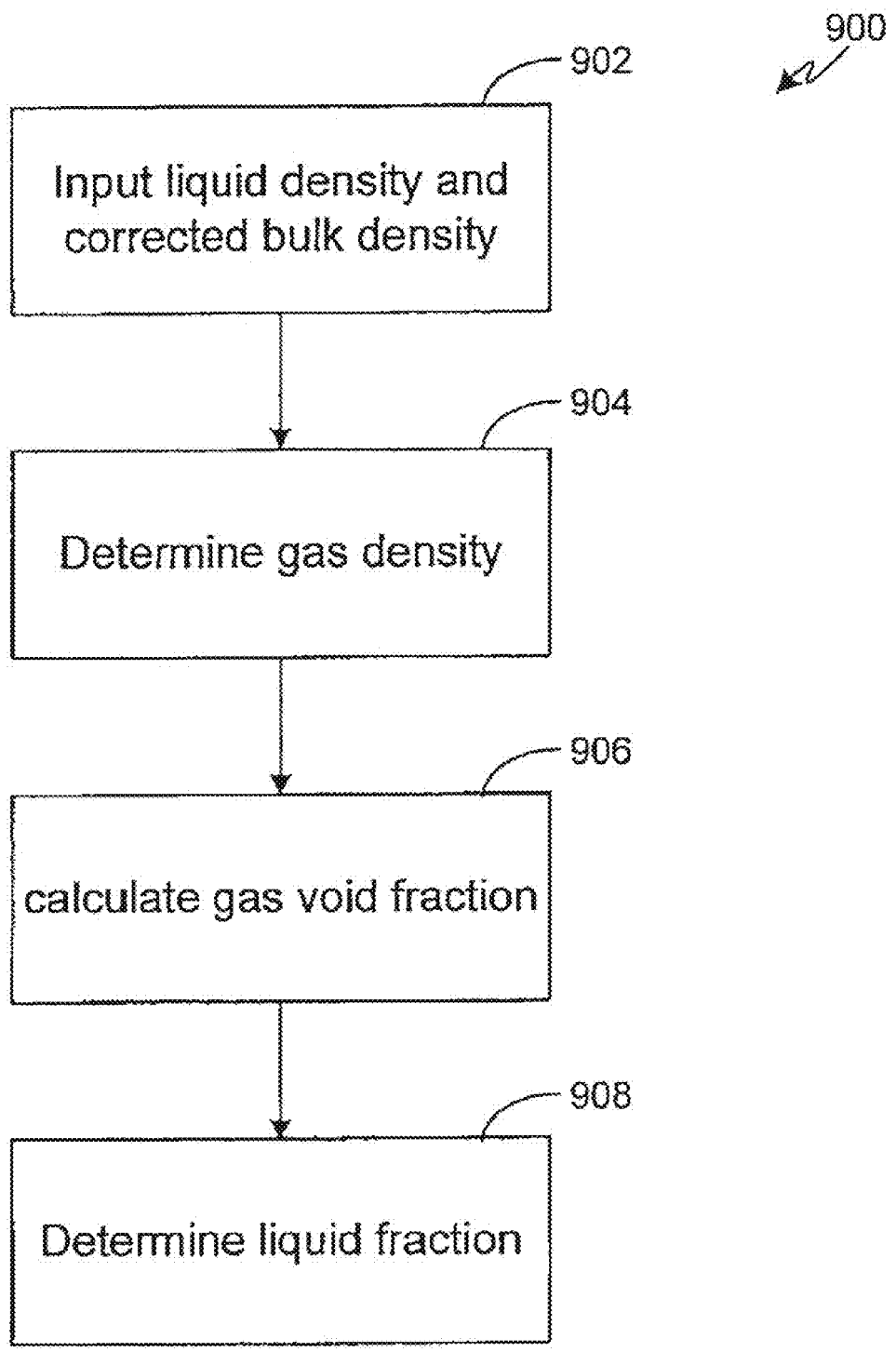
FIG. 9 is a flowchart illustrating techniques for determining void fraction measurements.

Once the true density drop is determined, then working back through the above equations it is straightforward to derive the true mixture density $\rho_{true}$, as well as the true liquid and gas (void) fractions (the latter being discussed in more detail with respect to FIG. 9).

Figure 8:
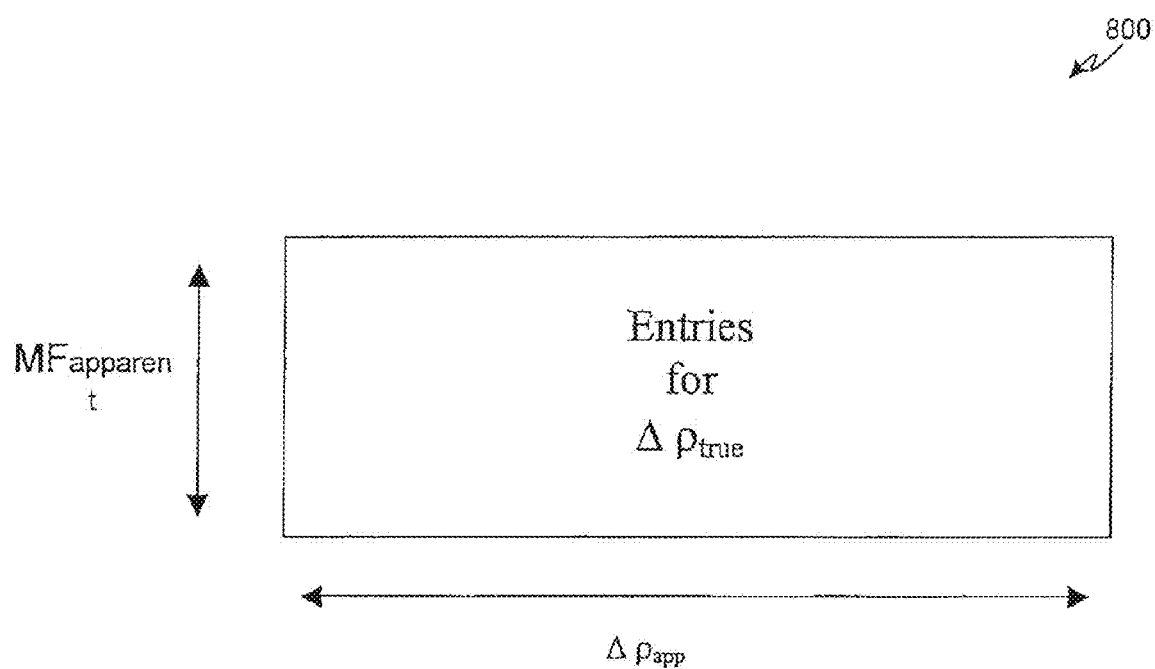
FIG. 8 is a table showing a relationship between an apparent density drop and an apparent mass flow rate of the two-phase flow.

A tabular correction for density (712) may be used when, for example, a functional relationship is too complex or inconvenient to implement. In such cases, knowledge of the quantities $\Delta\rho_{apparent}$ and $\Delta MF_{apparent}$ may be used to determine $\Delta\rho_{true}$ by employing a table having the form of a table 800 of FIG. 8.

The table 800 may be, for example, a tabular look-up table that can be, for example, stored in the database 245, or in another memory, for use across multiple applications of the table. Additionally, the table may be populated during an initialization procedure, for storage in the database 245 for an individual application of the table.

It should be understood that either or both of the algorithmic and tabular forms may be extended to include multiple dimensions, such as, for example, gain, temperature, balance, or flow regime. The algorithmic or tabular correction also may be extended to include other surface fitting techniques, such as, for example, neural net, radical basis functions, wavelet analyses, or principle component analysis.

As a result, it should be understood that such extensions may be implemented in the context of FIG. 3 during the approach described therein. For example, during a first instance, density may be determined as described above. Then, during a second instance, when a flow regime has been identified, the density may be further corrected using the flow regime information.

FIG. 9 is a flowchart 900 illustrating techniques for determining void fraction measurements (306 in FIG. 3). In FIG. 9, the process begins with an inputting by the void fraction determination system 240 of the previously-determined liquid and bulk (corrected) densities, $\rho_{liquid}$ and $\rho_{true}$ (902).

A density of the gas, $\rho_{gas}$ is then determined (904). As with the liquid density $\rho_{liquid}$, there are several techniques for determining $\rho_{gas}$. For example, $\rho_{gas}$ may simply be assumed to be a density of air, generally at a known pressure, or may be an actual known density of the particular gas in question. As another example, this known density $\rho_{gas}$ may be one of the above factors (i.e., known density of air or the specific gas) at an actual or calculated pressure, as detected by the pressure sensor 225, and/or at an actual or calculated temperature, as detected by the temperature sensor 220. The temperature and pressure may be monitored using external equipment, as shown in FIG. 2, including the temperature sensor 220 and/or the pressure sensor 225.

Further, the gas may be known to have specific characteristics with respect to factors including pressure, temperature, or compressibility. These characteristics may be entered along with an identification of the gas, and used in determining the current gas density $\rho_{gas}$. As with the liquid(s), multiple gasses may be stored in memory, perhaps along with the characteristics just described, so that a user may access density characteristics of a particular gas simply by selecting the gas by name from a list.

Once the factors $\rho_{liquid}$, $\rho_{gas}$, and $\rho_{true}$ are known, then it should be clear from Eq. 10 that void fraction $\alpha_{true}$ may be easily determined (906). Then, if needed, liquid fraction may be determined (908) simply by calculating $1-\alpha_{true}$.

Although the above discussion presents techniques for determining void fraction $\alpha_{true}$ based on density, it should be understood that void fraction may be determined by other techniques. For example, an indicated void fraction $\alpha_{apparent}$ may be directly determined by the Coriolis flowmeter, perhaps in conjunction with other void fraction determination systems (represented by the void fraction sensor 235 of FIG. 2), and then corrected based on empirical or derived equations to obtain $\alpha_{true}$. In other implementations, such external void fraction determining systems may be used to provide a direct measurement of $\alpha_{true}$.

Figure 10:
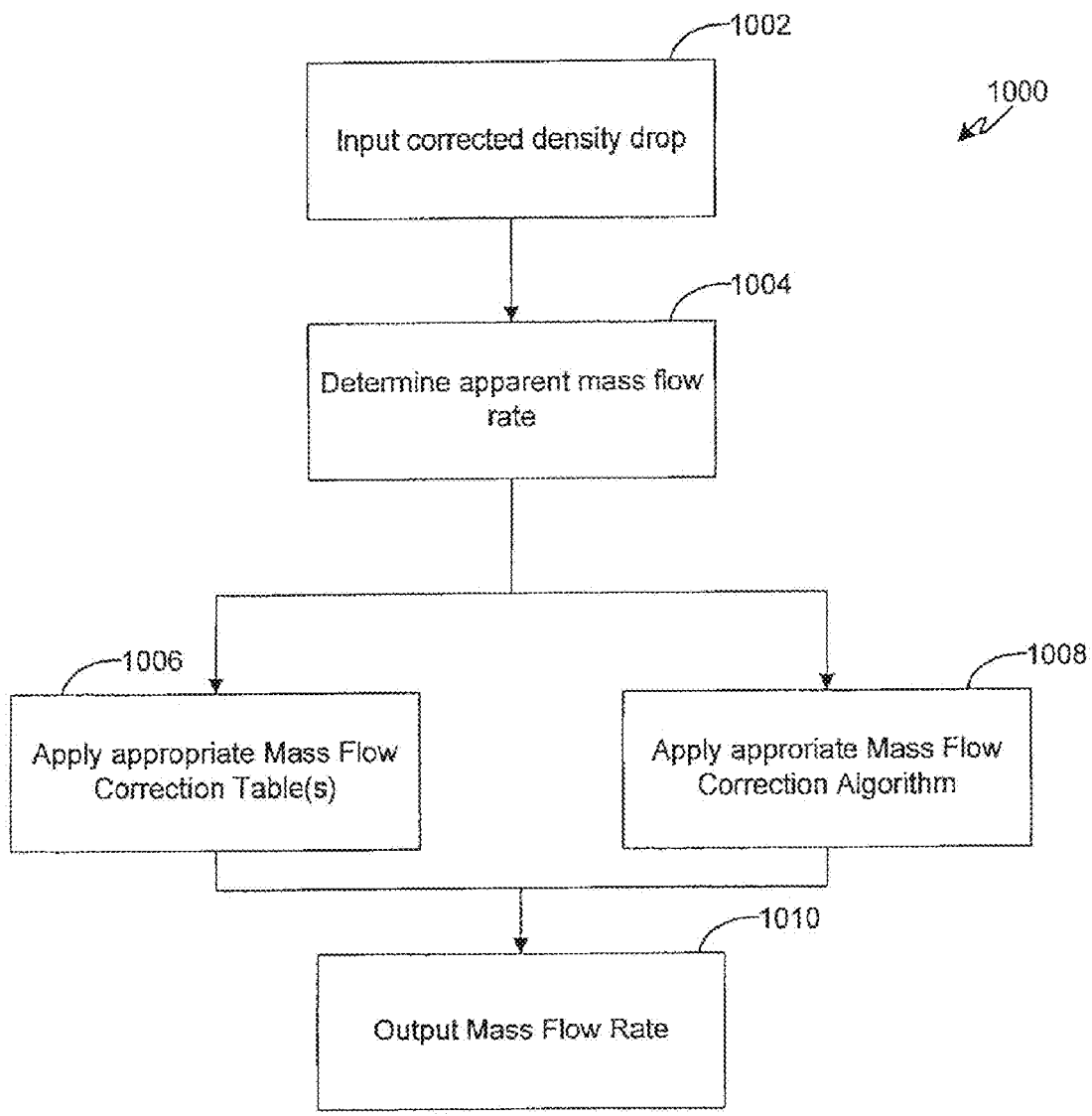
FIG. 10 is a flowchart illustrating techniques for determining corrected mass flow rate measurements.

FIG. 10 is a flowchart 1000 illustrating techniques for determining corrected mass flow rate measurements (308 in FIG. 3). In FIG. 10, the mass flow rate correction system 250 first inputs the previously-calculated corrected density drop $\Delta\rho_{true}$ (1002), and then inputs a measured, apparent mass flow rate $MF_{apparent}$ (1004).

The mass flow rate correction system 250 applies either a tabular (1006) or algorithmic correction (1008) to determine the true mass flow rate $MF_{true}$ of the gas/liquid mixture. The quantity $MF_{true}$ may then be output as the corrected mass flow rate (1010).

Figure 11:
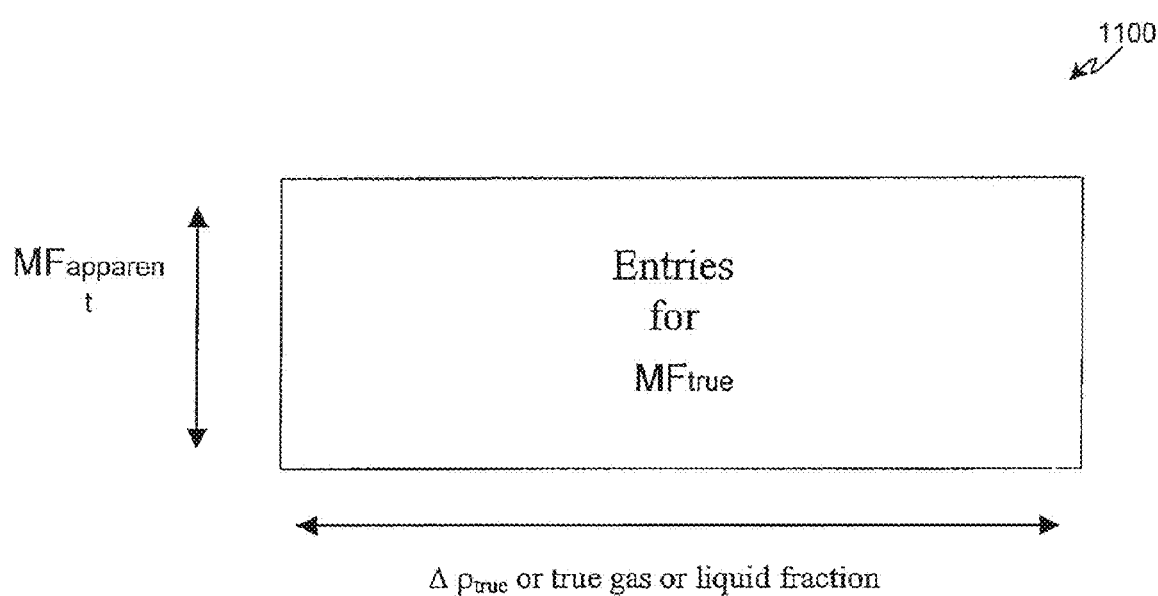
FIG. 11 is a table showing a relationship between an apparent mass flow rate and a corrected density drop of the two-phase flow.

In applying the tabular correction for mass flow rate (1006), knowledge of the quantities $\Delta\rho_{true}$ and $\Delta MF_{apparent}$ may be used to determine $MF_{true}$ by employing a table having the form of a table 1100 of FIG. 11.

The table 1100, as with the table 800 may be, for example, a tabular look-up table that can be, for example, stored in the database 245, or in another memory, for use across multiple applications of the table. Additionally, the table may be populated during an initialization procedure, for storage in the database 255 for an individual application of the table.

Normalized values $MF_{norm\_app}$ and $MF_{norm\_true}$ may be used in place of the actual ones shown above, in order to cover more than one size Coriolis flowtube. Also, the entries can be in terms of the correction, where the correction is defined by Eq. 18:

$$\Delta MF = MF_{true} - MF_{apparent} \qquad \text{Eq. 18}$$

The values in Eq. 18 should be understood to represent either actual or normalized values.

In an algorithmic approach, as with density, the correction for mass flow may be implemented by way of a theoretical or an empirical functional relationship that is generally understood to be of the form $\Delta MF = f(MF_{apparent},$ void fraction, drive gain, sensor balance, temperature, phase regime, and/or other factors).

For some cases the function can simplify to a polynomial, such as, for example, the polynomial shown in Eq. 19:

$$\Delta MF = \sum_{i=0}^{M} \sum_{j=0}^{N} a_i b_j (\Delta\rho_{true}^i)(MF_{norm\_app}^j) \qquad \text{Eq. 19}$$

For some set of conditions, the functional relationship can be a combination of a polynomial and exponential, as shown in Eq. 20:

$$\Delta MF = a_1 d e^{(a_2 d^2 + a_3 d + a_4 m^2 + a_5 m)} + a_6 d^2 + a_7 d + a_8 m^2 + a_9 m \qquad \text{Eq. 20}$$

In Eq. 20, $d = \Delta\rho_{true}$, and $m = f(MF_{apparent})$.

In one implementation, m in Eq. 20 may be replaced by apparent superficial liquid velocity $SV_{liquid}$ which is given as described above by Eq. 2 as $SV_{liquid} = MF_{liquid}/(\rho_{liquid} * A_T)$. In this case, $\rho_{liquid}$ and flowtube cross-section $A_T$ are known or entered parameters, and may be real-time corrected for temperature using, for example, the on-board temperature measurement device 220 of the digital controller/transmitter 104.

It should be understood that, as with the density corrections discussed above, either or both of the algorithmic and tabular forms may be extended to include multiple dimensions, such as, for example, gain, temperature, balance, or flow regime. The algorithmic or tabular correction also may be extended to include other surface fitting techniques, such as, for example, neural net, radical basis functions, wavelet analyses, or principle component analysis.

As a result, it should be understood that such extensions may be implemented in the context of FIG. 3 during the approach described therein. For example, during a first instance, mass flow rate may be determined as described above. Then, during a second instance, when a flow regime has been identified, the mass flow rate may be further corrected using the flow regime information.

All of the above functional relationships for mass flow rate may be restated using gas fraction ($\alpha$) or liquid fraction (100-$\alpha$) instead of density drop, as reflected in the table 1100 of FIG. 11. Also, although the above described methods are dependent on knowledge of the corrected density drop $\Delta\rho_{true}$, it should be understood that other techniques may be used to correct an indicated mass flow rate. For example, various techniques for correcting mass flow rate measurements of a two-phase flow are discussed in U.S. Pat. No. 6,505,519, incorporated by reference above.

Having described density, void fraction, and mass flow rate corrections above in general terms, for the purpose of, for example, simultaneously calculating individual flow component (phases) flow rates in a two-phase flow, the below discussion and corresponding figures provide specific examples of implementations of these techniques.

Figure 12:
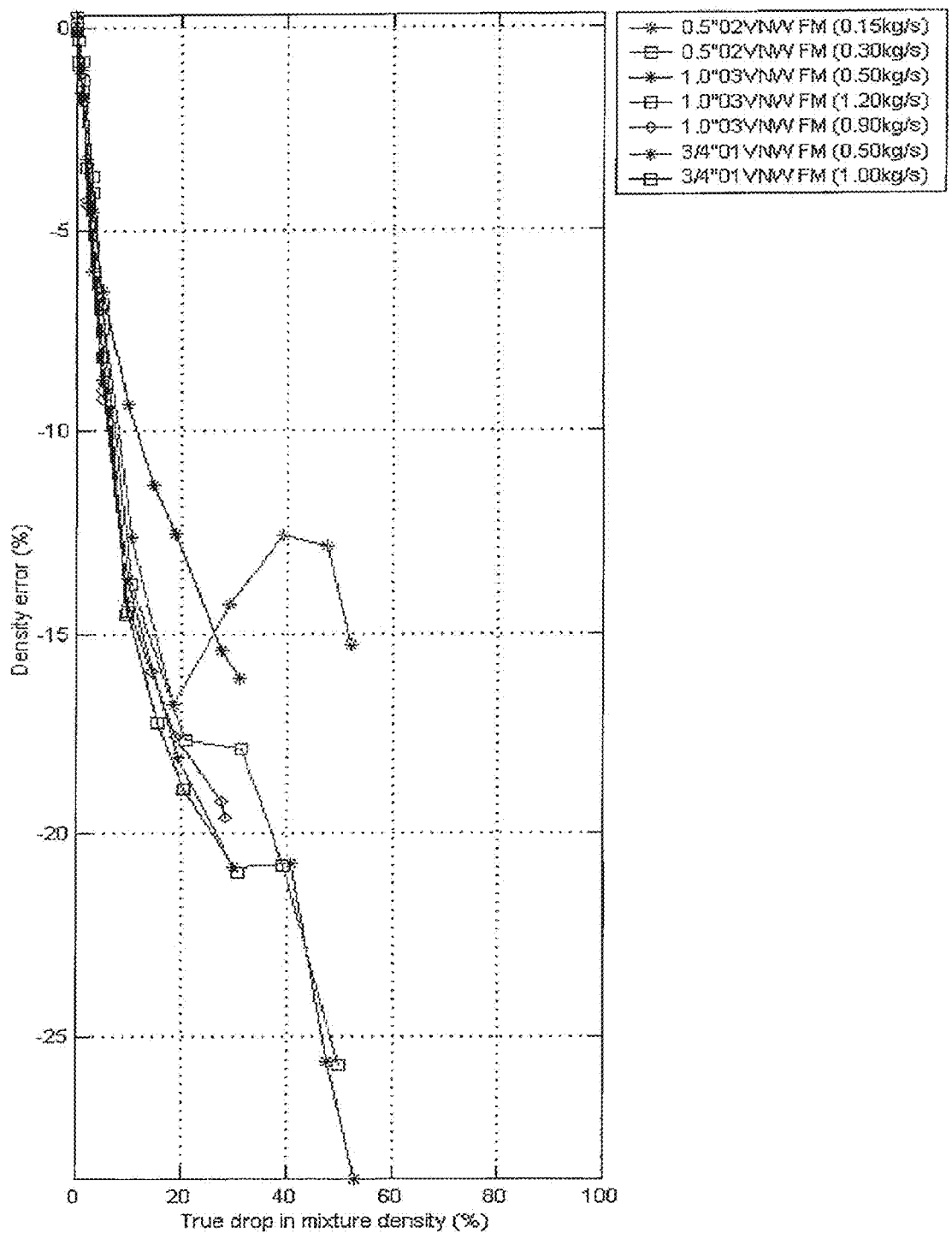
FIGS. 12, 13A-B, 14A-B are graphs illustrating examples of density corrections for a number of flowtubes.

FIGS. 12-14 are graphs illustrating examples of density corrections for a number of flowtubes. In particular, the examples are based on data obtained from three vertical water flowtubes, the flowtubes being: ½", ¾", and 1" in diameter.

More specifically, the ½" data was taken with a 0.15 kg/s flow rate and a 0.30 kg/s flow rate; the ¾" data was taken with a 0.50 kg/s flow rate and a 1.00 kg/s flow rate; and the 1" data was taken with a 0.50 kg/s flow rate, a 0.90 kg/s flow rate, and a 1.20 kg/s flow rate. FIG. 12 illustrates an error, $e_d$, of the apparent density of the fluid-gas mixture (two-phase flow) versus the true drop in density of the fluid-gas mixture, $\Delta\rho_{true}$:

$$\Delta\rho_{true} = 100 \cdot \frac{\rho_{liquid} - \rho_{true}}{\rho_{liquid}} \qquad \text{Eq. 21}$$

$$e_d = 100 \cdot \frac{\rho_{apparent} - \rho_{true}}{\rho_{true}} \qquad \text{Eq. 22}$$

where, as above, $\rho_{liquid}$ is the density of the gas-free liquid, $\rho_{true}$ is the true density of the liquid-gas mixture, and $\rho_{apparent}$ is the apparent or indicated density of the liquid-gas mixture.

In FIGS. 12-14, the correction is performed in terms of the apparent drop in mixture density, $\Delta\rho_{apparent}$, as shown in Eq. 23:

$$\Delta\rho_{apparent} = 100 \cdot \frac{\rho_{liquid} - \rho_{apparent}}{\rho_{liquid}} \qquad \text{Eq. 23}$$

In FIGS. 12-14, when fitting the data, both the apparent and true drop in density of the mixture were normalized to values between 0 and 1 by dividing them through by 100, where this normalization is designed to ensure numerical stability of the optimization algorithm. In other words, the normalized apparent and true drop in mixture density are the apparent and true drop in mixture density defined as a ratio, rather than as a percentage, of the liquid density $\rho_{liquid}$, as shown in Eq. 24:

$$\Delta\rho_{apparent}^{normalized} = \frac{\Delta\rho_{apparent}}{100} \qquad \text{Eq. 24}$$

The model formula, based on Eq. 17, provides Eq. 25:

$$\Delta\rho_{true}^{normalized} = a_1(\Delta\rho_{apparent}^{normalized})^3 + a_2(\Delta\rho_{apparent}^{normalized})^2 + a_3(\Delta\rho_{apparent}^{normalized}) \qquad \text{Eq. 25}$$

Figure 13A:
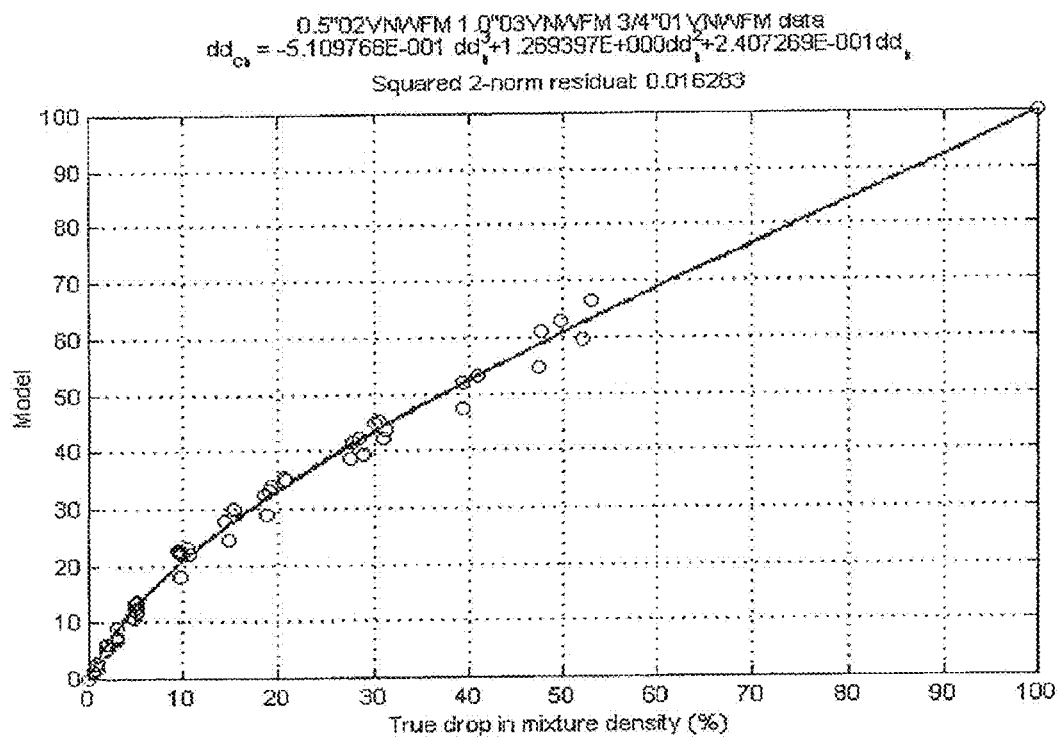
Figure 13B:
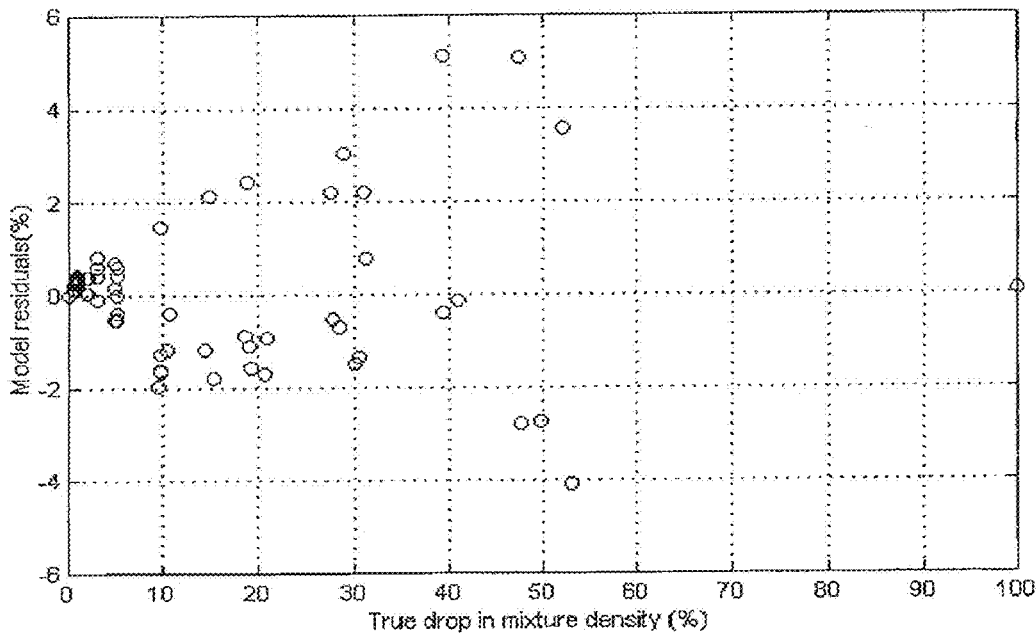
Figure 14A:
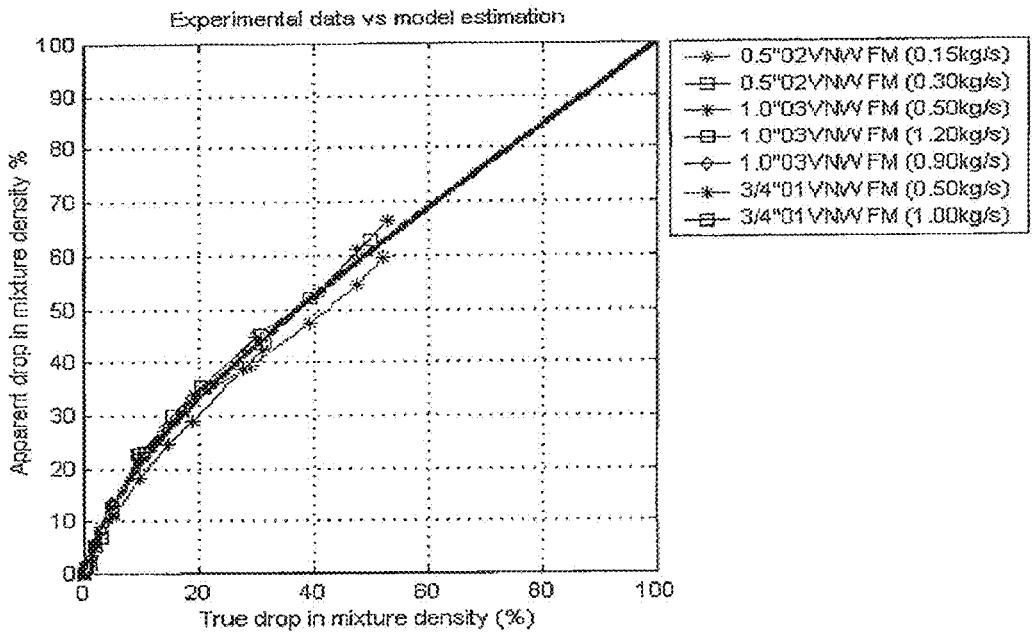
Figure 14B:
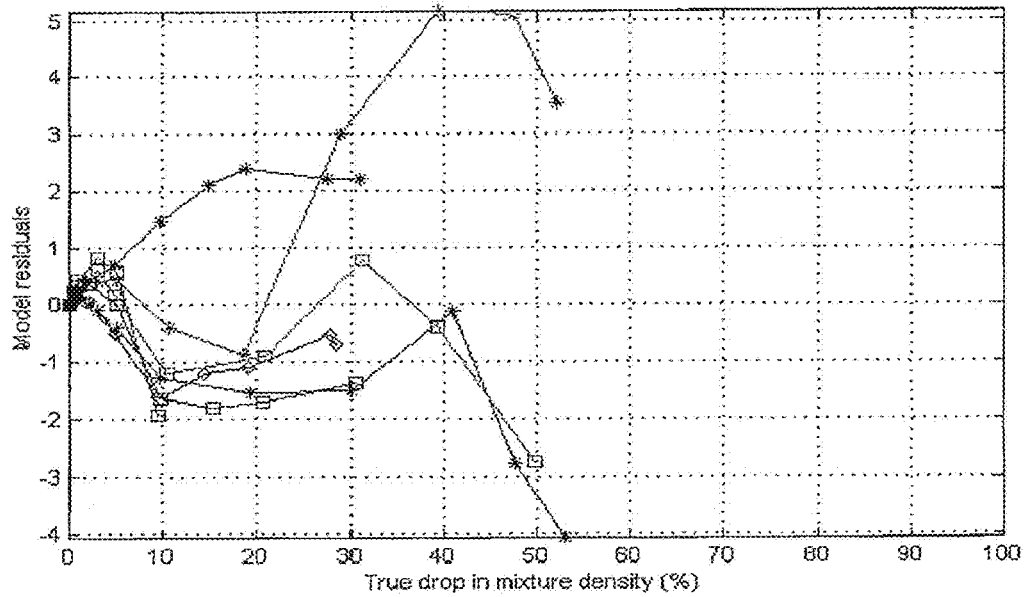

In this case, the coefficients are $a_1 = -0.51097664273685$, $a_2 = 1.26939674868129$, and $a_3 = 0.24072693119420$. FIGS. 13A and 13B illustrate the model with the experimental data and the residual errors, as shown. FIGS. 14A and 14B give the same information, but with each flow rate plotted separately.

To summarize, the drop in density correction is performed in the transmitter 104 by calculating the apparent density drop $\Delta\rho_{apparent}$, using the apparent density value $\rho_{apparent}$ and the liquid density $\rho_{liquid}$. The value of the apparent drop in density is normalized to obtain $$\Delta\rho_{apparent}^{normalized} = \frac{\Delta\rho_{apparent}}{100},$$

so that, as explained above, the drop in density is calculated as a ratio rather than a percentage. The density correction model(s) may then be applied to obtain the normalized corrected drop in mixture density $\Delta\rho_{true}^{normalized}$. Finally, this value is un-normalized to obtain the corrected drop in density $\Delta\rho_{true} = 100 \cdot \Delta\rho_{true}^{normalized}$. Of course, the final calculation is not necessary if the corrected drop in mixture density $\Delta\rho_{true}$ is defined as a ratio rather than percentage of the true value.

FIGS. 15-20 are graphs illustrating examples of mass flow rate corrections for a number of flowtubes. In particular, the examples are based on data obtained from three vertical water flowtubes, the flowtubes being: ½", ¾", and 1" in diameter. More specifically, the ½" data was taken with a 0.15 kg/s flow rate and a 0.30 kg/s flow rate; the ¾" data was taken with a 0.50 kg/s flow rate and a 1.00 kg/s flow rate; and the 1" data was taken with 18 flow rates between 0.30 kg/s and 3.0 kg/s flow rate, with a maximum drop in density of approximately 30%.

Figure 15A:
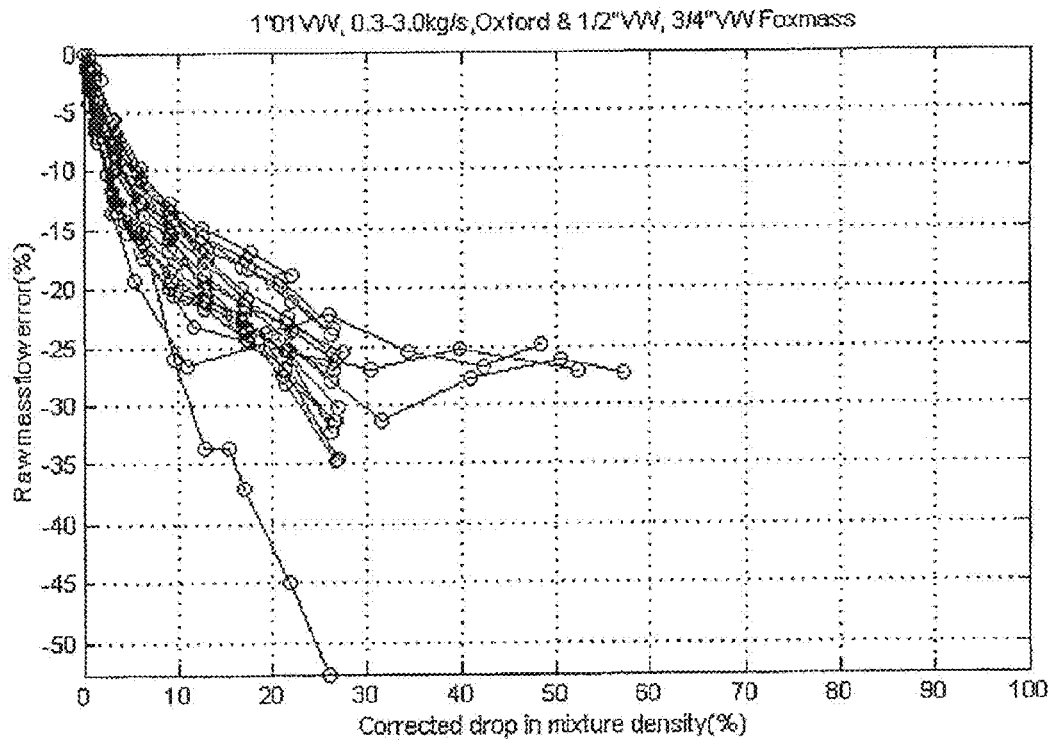
FIGS. 15A-B, 16, 17, 18A-D, 19A-D, 20A-B are graphs illustrating examples of mass flow rate corrections for a number of flowtubes.
Figure 15B:
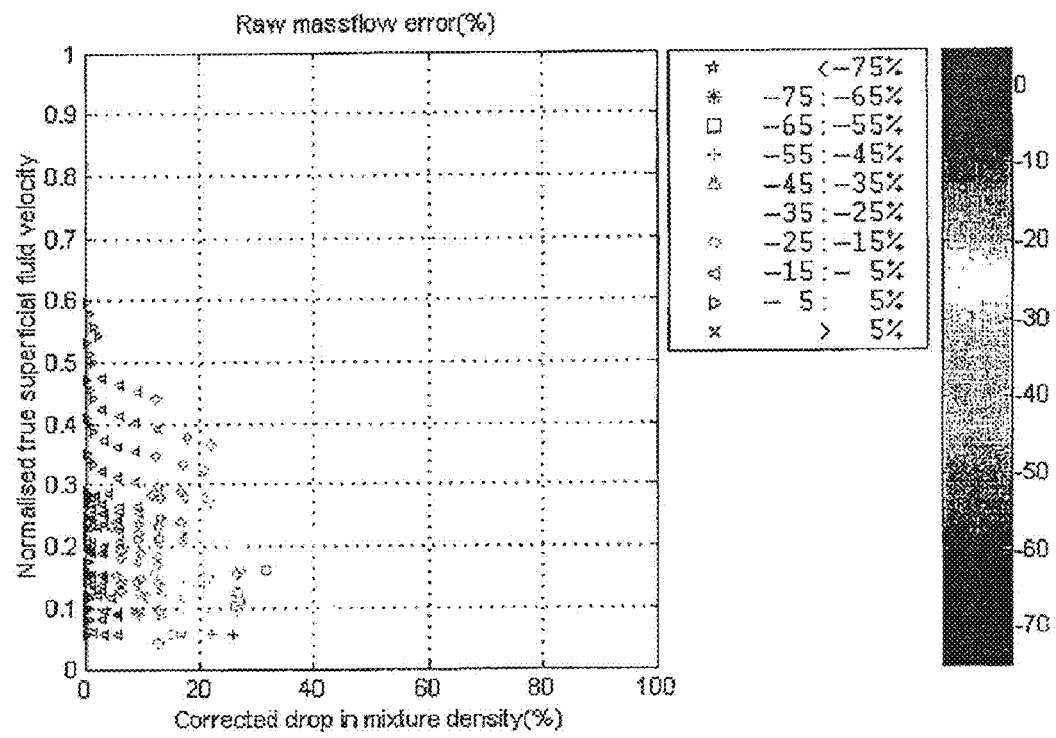

FIGS. 15A and 15B illustrate apparent mass flow errors for the data used to fit the model versus corrected drop in mixture density $\Delta\rho_{true}$ and normalized true superficial fluid velocity; i.e., the apparent mass flow error curves per flowline, together with a scatter plot of the apparent mass flow error versus corrected drop in density $\Delta\rho_{true}$ and normalized true superficial fluid velocity $v_{tn}$, as shown in Eq. 26:

$$v_{tn} = \frac{v_t}{v_{max}}, \qquad \text{Eq. 26}$$

$$v_t = \frac{m_t}{\rho_{liquid} \cdot A_T}$$

where $m_t$ is the true fluid mass flow, i.e. the value of the mass flow independently measured, $\rho_{liquid}$ is the liquid density, $A_T$ is the flowtube cross-section area, and $v_{max}$ is the maximum value for the superficial fluid velocity (here considered 12 m/s), so that $v_{tn}$ gives the ratio of the true superficial fluid velocity from the whole range of the flowtube 215. In these examples, both drop in mixture density and superficial fluid velocity are normalized between 0 and 1 prior to fitting the model, for the purpose of ensuring numerical stability for the model optimization algorithm.

Figure 16:
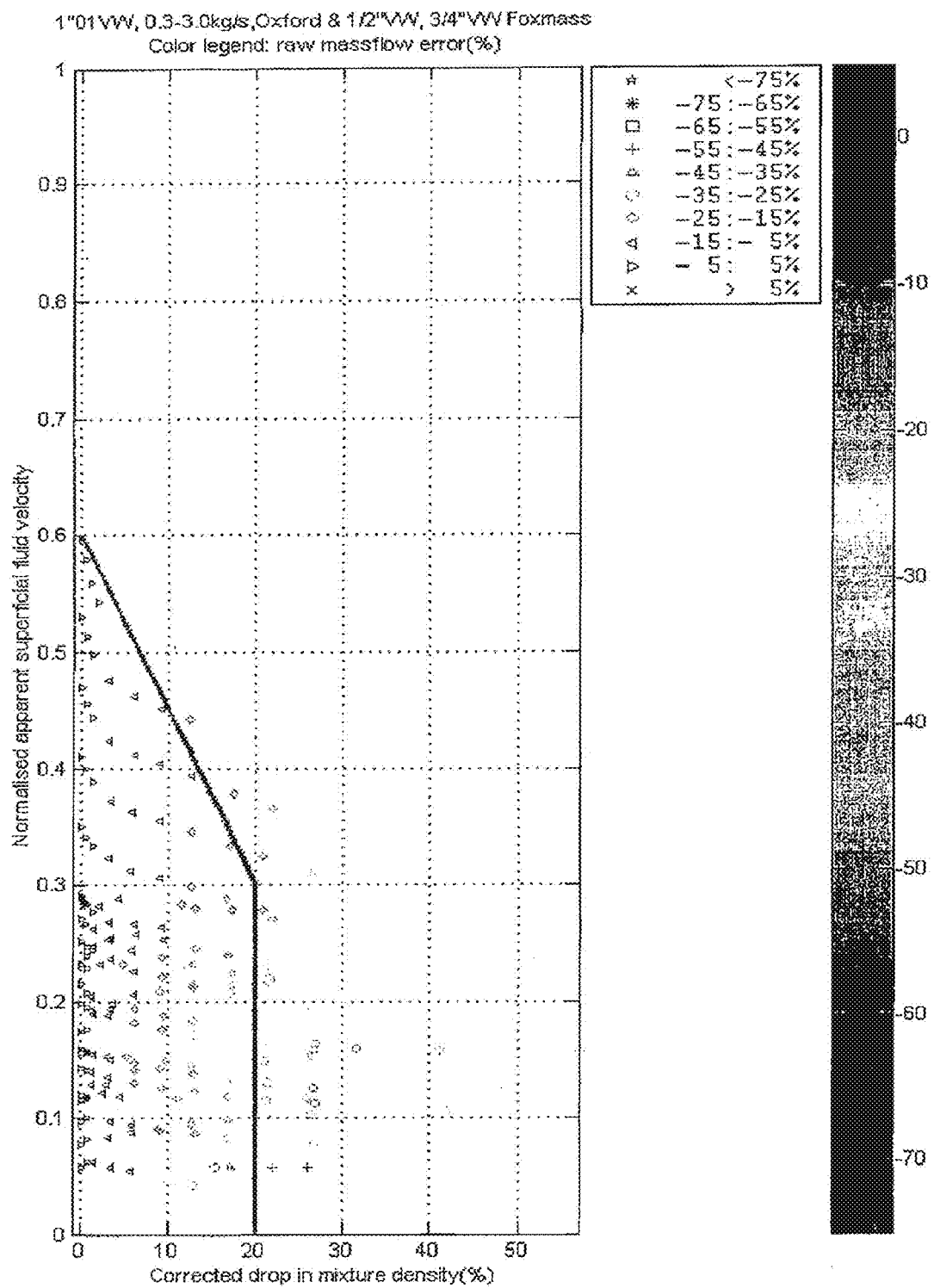

FIG. 16 illustrates apparent mass flow errors versus corrected drop in mixture density and normalized apparent superficial fluid velocity, with safety bounds for the correction mode. That is, FIG. 16 gives the scatter plot of the apparent mass flow errors versus corrected drop in density and, this time, normalized apparent superficial fluid velocity $$v_n = \frac{v}{v_{max}} = \frac{m}{v_{max} \cdot \rho \cdot A},$$

where m is the apparent fluid mass flow (i.e. as measured by the transmitter 104). Superimposed on the plot are the boundaries defining the safe region for the model, i.e., the region for which the model is expected to give an accuracy similar with the one for the fit data. Using this nomenclature, the apparent mass flow error e is given by $$e = 100 \cdot \frac{m - m_t}{m_t}.$$

The model formula for this situation is shown as Eq. 27:

$$e_n = a_1 dd_{cn} \cdot e^{a_2 dd_{cn}^2 + a_3 dd_{cn} + a_4 v_n^2 + a_5 v_n} + a_6 dd_{cn}^2 + a_7 dd_{cn} + a_8 v_n^2 + a_9 v_n \qquad 27$$

where $$e_n = \frac{e}{100} = \frac{m - m_t}{m_t} \qquad \text{Eq. 28}$$

where, in Eqs. 27 and 28, $dd_{cn}$ is the normalized corrected drop in mixture density, and $v_n$ is the normalized apparent superficial velocity of the liquid.

Figure 17:
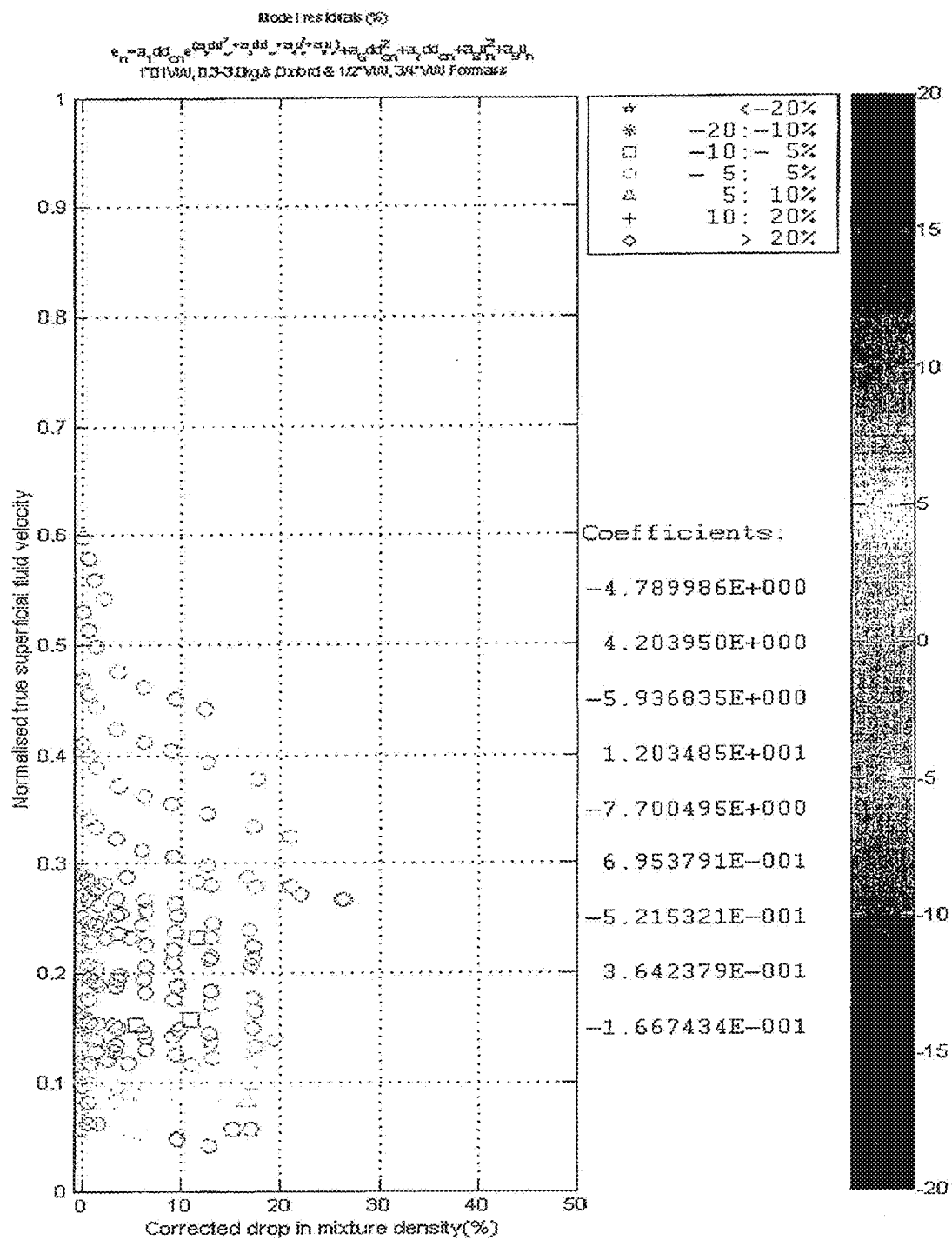
Figure 18A:
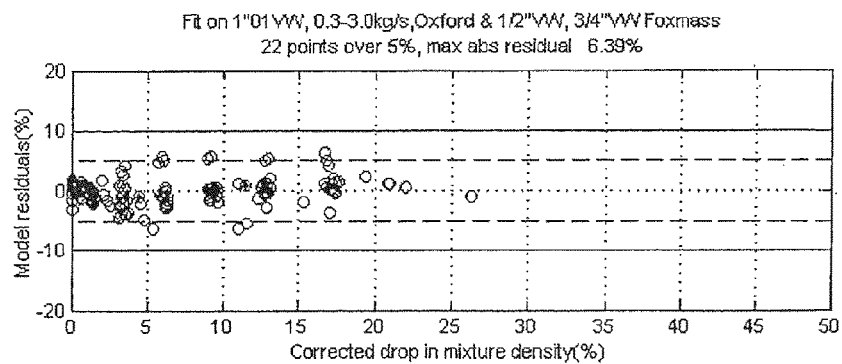
Figure 18B:
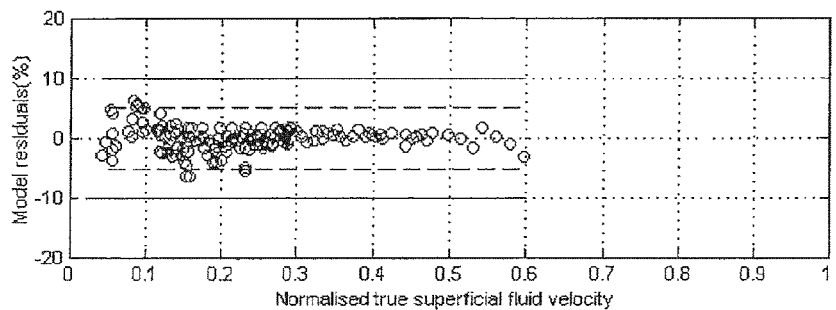
Figure 18C:
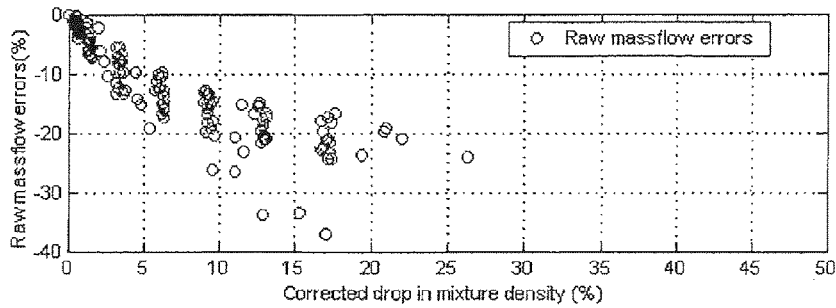
Figure 18D:
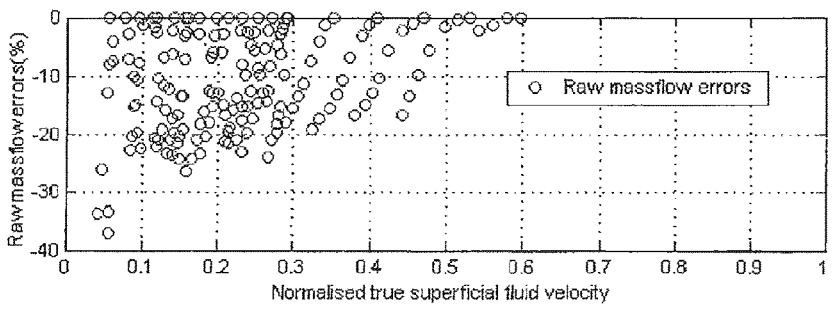
Figure 19A:
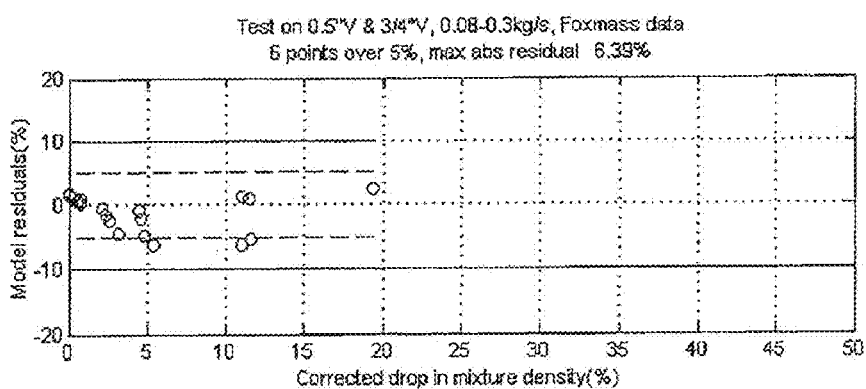
Figure 19B:
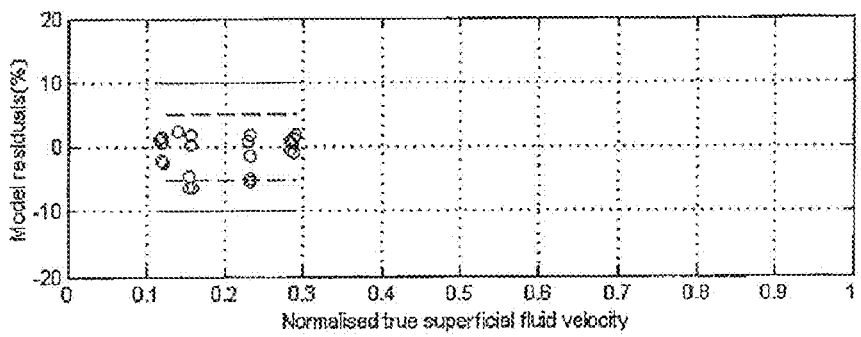
Figure 19C:
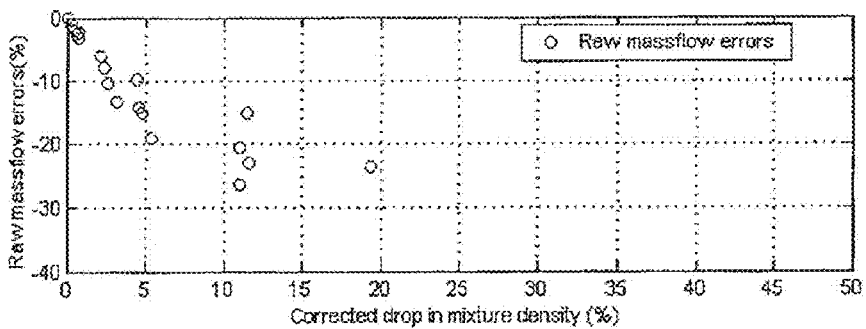
Figure 19D:
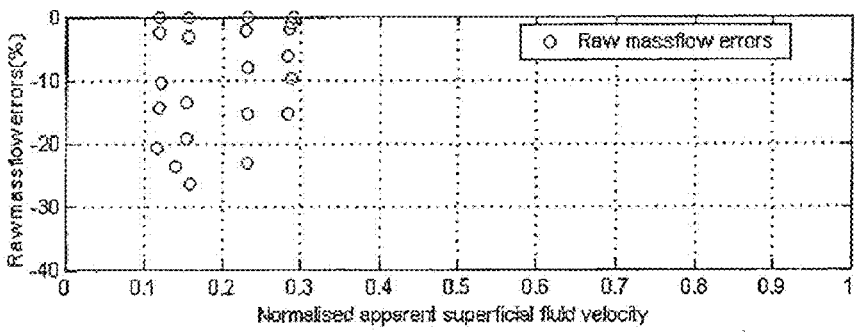
Figure 20A:
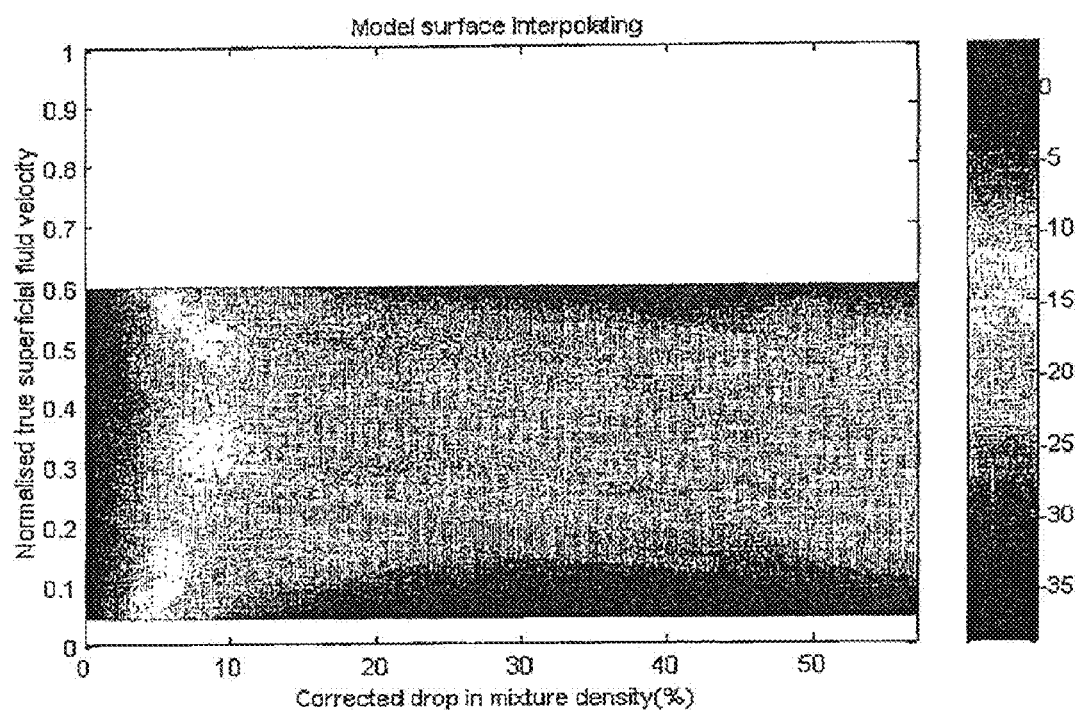
Figure 20B:
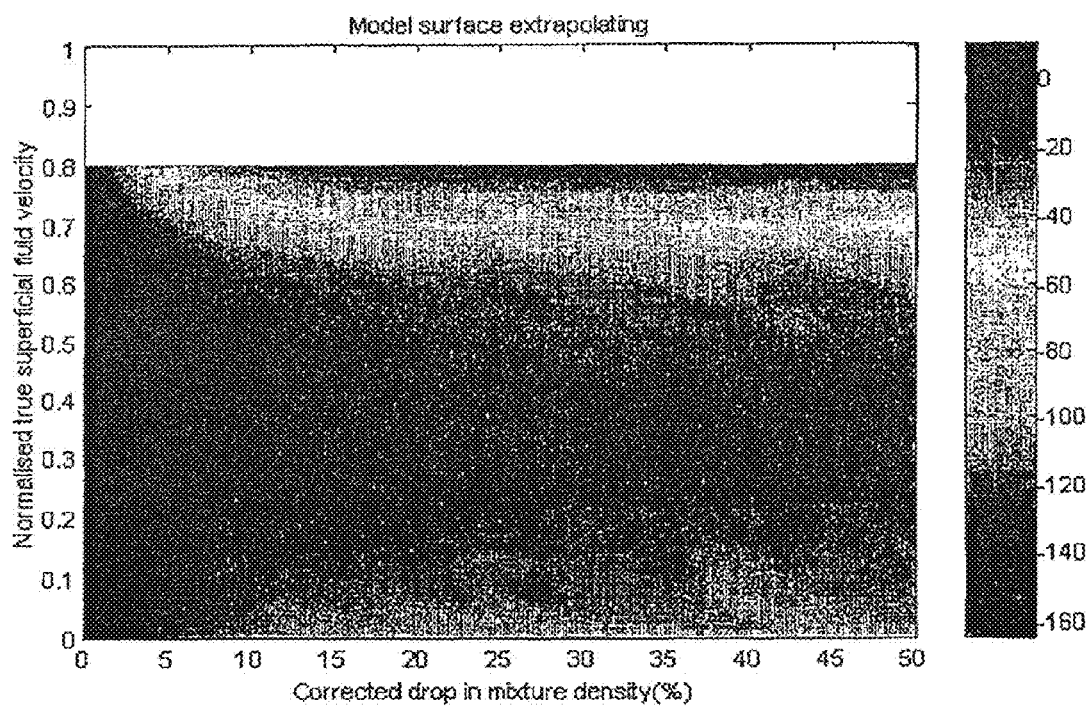

In this case, the coefficient are: $a_1 = -4.78998578570465$, $a_2 = 4.20395000016874$, $a_3 = -5.93683498873342$, $a_4 = 12.03484566235777$, $a_5 = -7.70049487145105$, $a_6 = 0.69537907794202$, $a_7 = -0.52153213037389$, $a_8 = 0.36423791515369$, and $a_9 = -0.16674339233364$ FIG. 17 illustrates a scatter plot for the model residuals, together with the model formula and coefficients; i.e., shows model residuals versus the corrected drop in mixture density and normalized true fluid velocity. FIGS. 18A-18D and FIGS. 19A-19D give the model residual errors for the whole data set used to fit the model and the actual data alone, respectively. Finally, FIGS. 20A and 20B illustrate the model surface both interpolating and extrapolating outside the safe fit area. From FIGS. 16, 20A, and 20B, the apparent mass flow (superficial liquid velocity) and drop in density bounds for the model should be understood.

To summarize, mass flow correction in the transmitter 104 is undertaken in this example by calculating an apparent drop in density, correcting it using the method(s) described above, and normalizing the resulting value by dividing it by 100 (or use the obtained normalized corrected drop in density from the density model). Then, a normalized superficial fluid velocity $v_n$ is calculated, and the model is applied to obtain an estimation of the normalized mass flow error $e_n$, where this value gives the error of the apparent mass flow as a ratio of the true mass flow. The obtained value may be un-normalized by multiplying it by 100, to thereby obtain the mass flow error as a percentage of the true mass flow. Finally, the apparent mass flow may be corrected with the un-normalized mass flow error $$m_c = \frac{m}{e_n + 1}.$$

As will be appreciated, the above description has a wide range of applications to improve the measurement and correction accuracy of a Coriolis meter during two phase flow conditions. In particular, the techniques described above are particularly useful in measurement applications where the mass flow of the liquid phase and the mass flow of the gas phase must be measured and/or corrected to a high level of accuracy. One exemplary application is the measurement of the mass flow of the liquid phase and the measurement of the gas phase in oil and gas production environments.

The above discussion is provided in the context of the digital flowmeter of FIG. 2. However, it should be understood that any vibrating or oscillating densitometer or flowmeter, analog or digital, that is capable of measuring multi-phase flow that includes a gas phase of a certain percentage may be used. That is, some flowmeters are only capable of measuring process fluids that include a gas phase when that gas phase is limited to a small percentage of the overall process fluid, such as, for example, less than 5%. Other flowmeters, such as the digital flowmeter(s) referenced above, are capable of operation even when the gas void fraction reaches 40% or more.

Many of the above-given equations and calculations are described in terms of density, mass flow rate, and/or void fraction. However, it should be understood that the same or similar results may be reached using variations of these parameters. For example, instead of mass flow, a volumetric flow may be used. Additionally, instead of void fraction, liquid fraction may be used.

The above discussion provides examples of measuring component mass flow rates in a two-phase flow. Flowmeters also may be used to measure further mixed flows. For example, a "three-phase" flow or "mixed two-phase flow" refers to a situation in which two types of liquid are mixed with a gas. For example, a flowing mixture of oil and water may contain air (or another gas), thus forming a "three-phase flow," where the terminology refers to the three components of the flow, and does not generally imply that a solid material is included in the flow.

Figure 21:
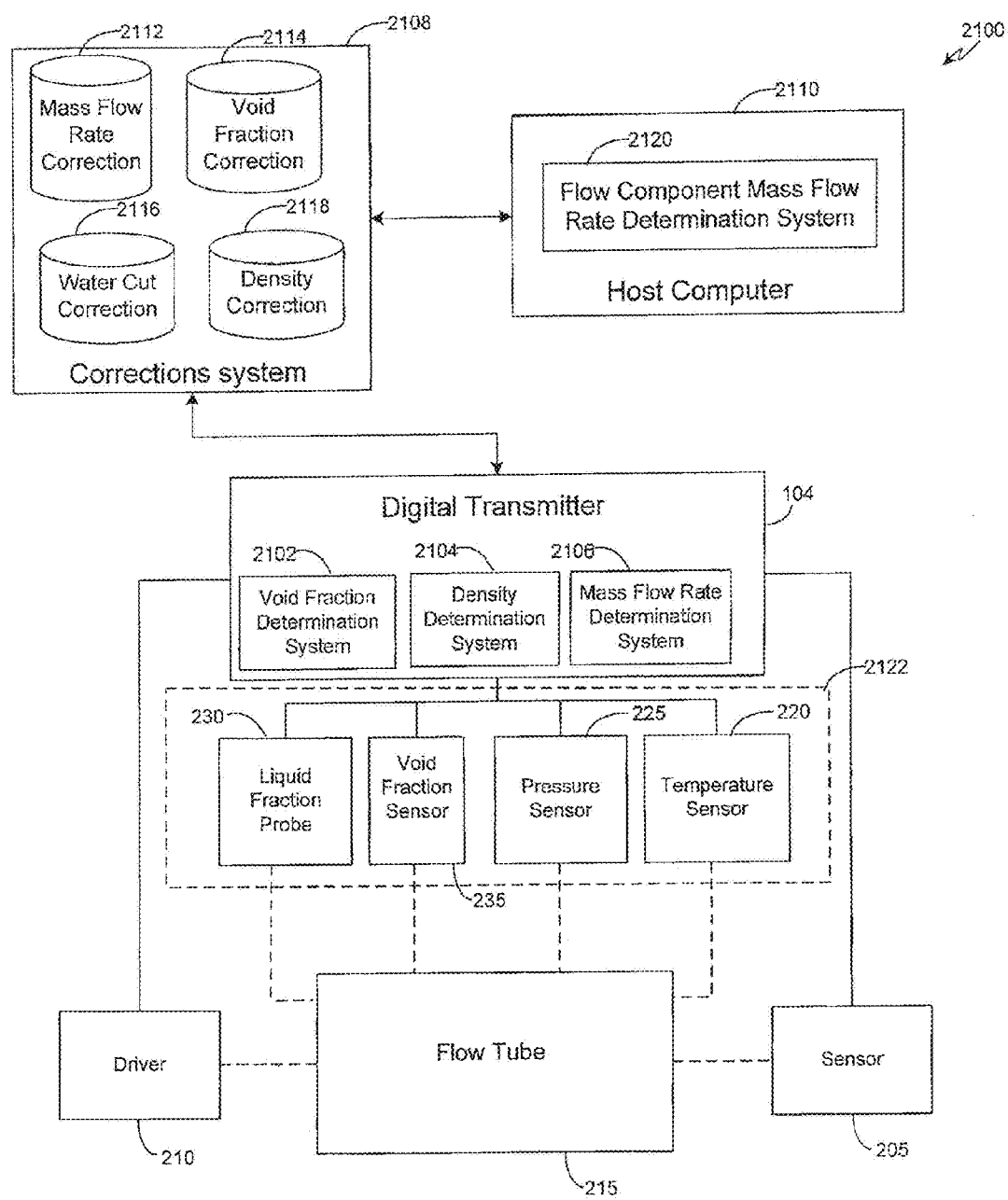
FIG. 21 is a block diagram of a flowmeter system.

FIG. 21 is a block diagram of a flowmeter system 2100. The flowmeter system 2100 may be used, for example, to determine individual component flow rates within a three-phase flow. For example, the system 2100 may be used to determine an amount of oil within an oil, water, and gas flow that travels through a pipe at an oil extraction facility, during a given period of time.

The flowmeter system 2100 also may be used to obtain highly-accurate measurements from the digital transmitter 104, such as, for example, density measurements or mass flow rate measurements. The system 2100 also may be used, for example, to obtain an improved measurement from an external sensor, such as, for example, the liquid fraction probe 230, or the void fraction sensor 235, relative to what measurements might be obtained using the external sensor(s) alone.

In FIG. 21, the digital transmitter 104 includes a void fraction determination system 2102, a density determination system 2104, and a mass flow rate determination system 2106 (in addition to a number of components that are not shown for clarity's sake, e.g., a drive signal generator, or a multi-phase detection system, or any of the components illustrated or discussed with respect to FIG. 2). That is, as should be understood from the above description, the systems 2102, 2104, and 2106 may be used to measure corresponding parameters of a fluid flow within the flow 215. Further, as also explained above, to the extent that the fluid flow contains gas and/or mixed liquids, the measurements output by the systems 2102, 2104, and 2106 generally represent raw or apparent values for the corresponding parameters, which ultimately may be corrected with a corrections system 2108.

For example, an apparent mass flow rate of a three-phase fluid flow within the flowtube 215 may be output to the corrections system 2108 for correction using a mass flow rate correction module 2112, while an apparent density of the three-phase fluid flow within the flowtube 215 may be output to the corrections system 2108 for correction using a density correction module 2118. Somewhat similarly, a measurement or determination of an apparent void fraction within the fluid flow may be corrected using a density correction module 2114, while a measurement or determination of an apparent liquid fraction (e.g., water cut from probe 230) may be corrected using a water cut correction module 2116. As described in more detail below, the various correction modules 2112-2118 may work in conjunction with one another, and/or with other components, in order to obtain their respective corrected values.

Once obtained, corrected values such as mass flow rate, density, water cut, or void fraction (or some combination thereof) may be output to a host computer 2110 for determination of individual mass flow rates of each of the three components of the three-phase fluid flow, using a component flow rate determination system 2120. As a result, and as referenced above, individual flow rates and/or amounts of each of the three components may be determined.

More generally, an example of the system 2100 includes three general elements used to obtain corrected measurement values and/or individual component flow rates: the transmitter 104, one or more of the individual external sensors identified generically with a reference numeral 2122, and one or more elements of the corrections system 2108. Of course, many combinations, variations, and implementations of these elements may be used, various examples of which are discussed in more detail below.

For example, in some implementations, the digital transmitter 104 may not include the void fraction determination system 2102. In some cases, the void fraction determination system 2102 may be included with, or associated with, the liquid fraction probe 230, or may be unneeded depending on a type or configuration of the void fraction sensor 235. In such cases, to the extent that it is needed, the void fraction may be determined from outputs of the correction modules 2112, 2116, and/or 2118.

Further, although the external sensors 2122 are shown in FIG. 21 to be in communication with the digital transmitter 104 and the flowtube 215, it should be understood that the external sensors 2122 may obtain their respective measurements in a number of different ways. For example, examples of the temperature sensor 220, the pressure sensor 225, and the void fraction sensor 230 are described above, with respect to, for example, FIG. 2. Further, the liquid fraction probe 235 may be in series with the flowtube 215 with respect to a primary pipe for transporting the three-phase fluid flow, and may maintain separate communication with the transmitter 104, the corrections system 2108, and/or the host computer 2110.

In FIG. 21, the corrections system 2108 is shown as being separate from the digital transmitter 104 and the host computer 2110. In some implementations, however, the corrections system 2108 may be located within the digital transmitter 104, the host computer 2110, or may be associated with one or more of the external sensors 2122. In still other implementations, portions of the corrections system 2108 may be included within different sections of the system 2100. For example, density and mass flow rate corrections may be performed at the digital transmitter 104, while water cut corrections may be performed at the liquid fraction probe 230.

In some implementations, the corrections system 2108 may include all of the modules 2112-2118 (as shown), or some subset thereof, or may include other modules, not specifically illustrated in FIG. 21 (e.g., a corrections module for correcting a density of the two-liquid component within the three-phase flow, such as the oil/water mixture in an oil/water/gas fluid flow). Further, some or all of any such correction modules may be integrated with one another.

For example, the mass flow rate and density corrections may be incorporated into one module, while the water cut correction module 2116 may be separate.

Along the same lines, it should be understood that the component flow rate determination system 2120 may be situated in a number of places within the system 2100. For example, the component flow rate determination system 2120 may be located within the corrections system 2108, or may be located within the digital transmitter 104.

Various examples of the above and other implementations, as well as examples of specific techniques for obtaining corrected flow measurements and individual component flow rates, are described in more detail below. In general, however, it should be understood that the system 2100 and other implementations thereof allows for all or substantially all of the three-phase fluid flow to flow continuously through the flowtube 215 and through an associated pipe or other conduit for transporting the three-phase flow material.

As a result, determinations of individual component flow rates do not require separation of the three-phase fluid flow into separate flows containing one or more of the constituent components. For example, when the three-phase flow contains oil, water, and gas, it is not necessary to separate the gas from the oil/water liquid combination in order to perform measurements (e.g., mass flow rate) on the oil portion of the resulting oil/liquid flow. Accordingly, reliable measurements of an amount of oil produced, for example, at an oil production facility, may be made easily, quickly, inexpensively, and reliably.

Figure 22:
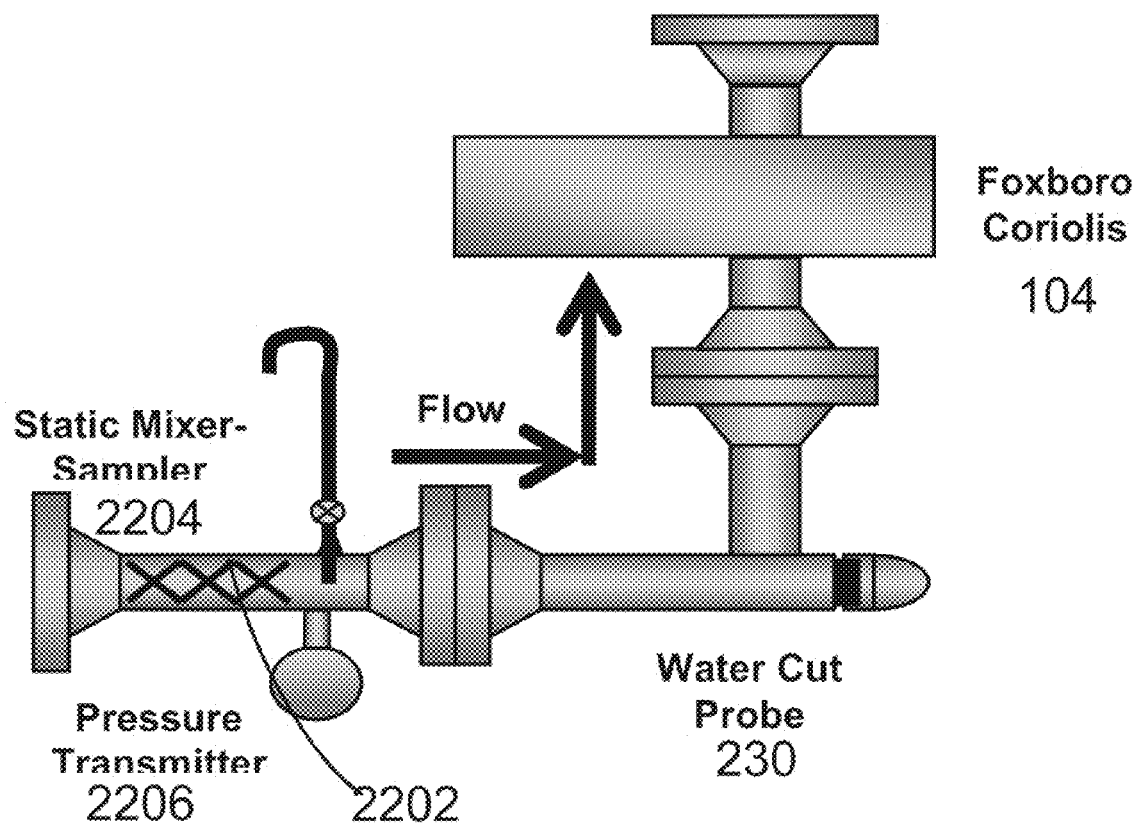
FIG. 22 is a diagram of a first implementation of the system of FIG. 21.

FIG. 22 is a diagram of a first implementation of the system 2100 of FIG. 21. In FIG. 22, the liquid fraction probe 230 is illustrated as a water cut probe that is in series with the digital transmitter 104 with respect to three-phase fluid flow through a pipe 2202. Examples of using measurements from the water cut probe 230 in determining flow measurements are provided in more detail below.

Also in FIG. 22, a static mixer-sampler 2204 is illustrated that serves to homogenize the three-phase fluid. The mixer-sampler 2204 also may be used for other measurements. For example, the mixer-sampler 2204 may be used to validate measurements of the water cut probe 230, or other measurements. In one implementation, the mixer-sampler 2204 may be used to siphon off a portion of a three-phase flow of oil/water/gas for evaporation of the gas therefrom, for independent confirmation of a water fraction within the resulting two-liquid composition.

Somewhat similarly, a pressure transmitter 2206 may be used in various post-processing techniques for validating or confirming measurements of the system.

Figure 23:
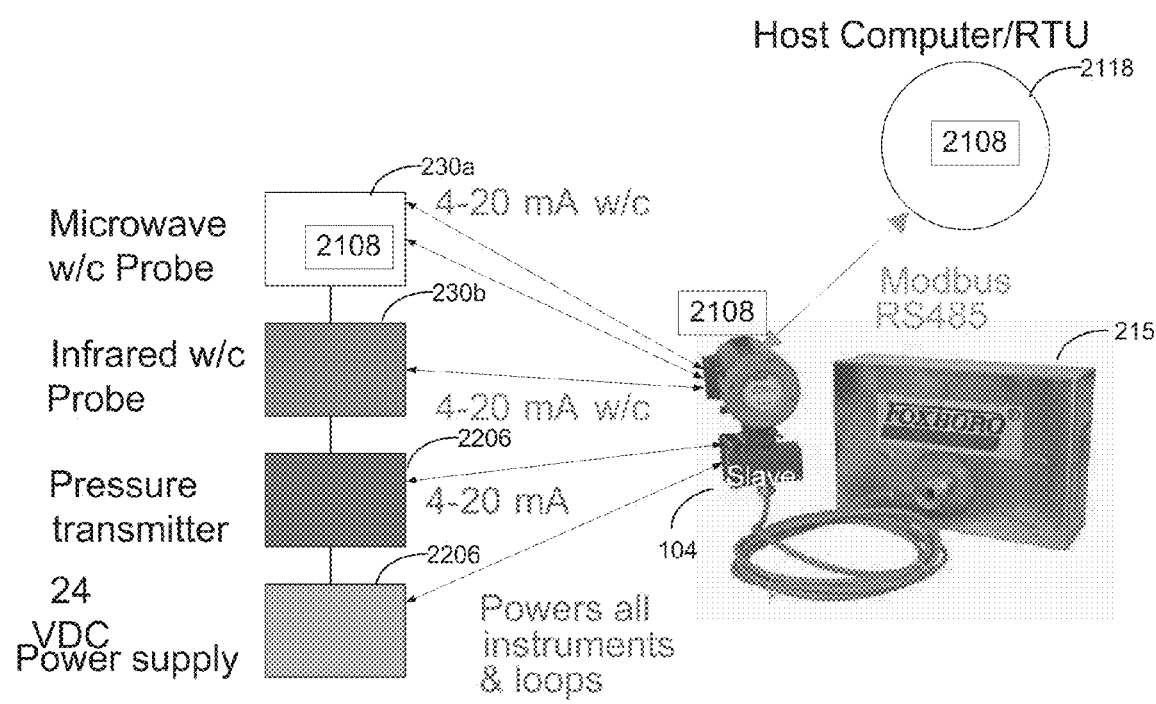
FIG. 23 is a block diagram of a second implementation of the system of FIG. 21.

FIG. 23 is a block diagram of a second implementation of the system of FIG. 21. In FIG. 23, the liquid fraction probe 230 is illustrated as a microwave water-cut probe 230a and/or an infrared water-cut probe 230b. A power supply 2302 for supplying power to the system also is illustrated. The flowtube 215 of FIG. 23 should be understood to contain, for example, the bent flowtube 102 of FIG. 1A, although, of course, the straight flowtube 106 of FIG. 1B, or some other flowtube, also may be used.

Further in FIG. 23, the sensors 230a, 230b, and/or 2206 are illustrated as being in bi-directional communication with the transmitter 104, including a standard 4-20 mA control signal. Meanwhile, the transmitter 104 is in communication with the host computer 2110 by way of a Modbus RS485 connection.

Also, as referenced above, FIG. 23 illustrates several possible locations for the corrections system 2108. For example, as shown, the corrections system 2108 may be located at, or associated with, a processor associated with the host computer 2110, or with the digital transmitter 104, and/or with the water-cut probe 230a (and/or other external sensor 230b).

Figure 24:
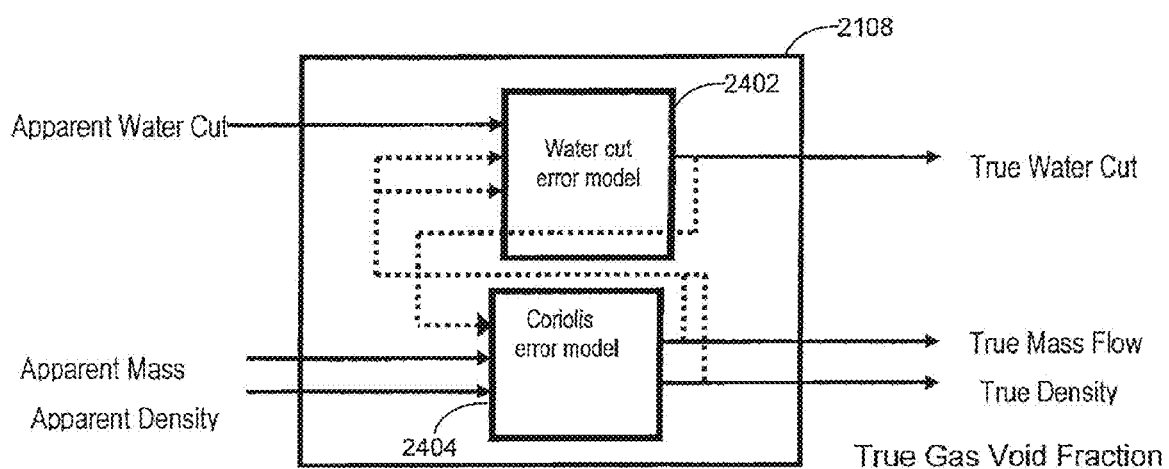
FIG. 24 is a block diagram of an implementation of the corrections system 2108 of FIGS. 21-23

FIG. 24 is a block diagram of an implementation of the corrections system 2108 of FIGS. 21-23. In FIG. 24, and as should be apparent from the above description of FIG. 21, the corrections system 2108 inputs, from the transmitter 104, measurements such as an apparent (or raw) measurement of a liquid fraction (e.g., water cut) of the three-phase flow, along with an apparent bulk mass flow rate and apparent bulk density.

The corrections system 2108 in this example includes a water cut error model 2402 and a Coriolis error model 2404.

The models 2402 and 2404, as shown, allow for calculations of the corrected, or the estimation of the true, corresponding measurements of water cut, mass flow rate, and density. In other words, as should be apparent from the above discussion of two-phase fluid flows, 2402 and 2404 model known configurations and flow parameters, so that subsequently measured flow parameters may be correlated with the modeling results by way of, for example, interpolation.

For example, as discussed in more detail below, the models 2402 and 2404 may be implemented to provide polynomial fittings of measured (apparent) flow parameters. In other examples, the models 2402 and 2404 may represent neural net correction models for correcting water cut and mass flow/density.

In the example of FIG. 24, where the available measurement includes an apparent water cut, then the resulting corrected measurements allow for the calculation of the additional parameter of gas void fraction. Conversely, if an apparent gas void fraction were available, rather than an apparent water cut measurement, then the corrections system may output a corrected void fraction measurement (thereby allowing subsequent estimation of a true water cut). In either case, or in similar cases, the corrections system 2108 may output the corrected measurements to the component flow rate determination system 2120 for calculation of individual component mass flow rates.

FIG. 24 illustrates an example in which the outputs of each model 2402 and 2404 are fed back into one another, in order to obtain sequentially better results, before outputting a final value for corrected water cut, (bulk) mass flow rate, and (bulk) density, and, thereafter, calculating individual component flows. In other words, for example, it is assumed that the initial determination of an apparent water cut may be dependent on, and vary with, an amount of gas within the three-phase fluid flow (i.e., the gas void fraction). However, an accurate value of the gas void fraction may not generally be available until after an estimate of the true water cut measurement has been determined.

Therefore, as illustrated, by feeding the values of a first determination of a corrected water cut value from the water cut error model 2402 back into the Coriolis error model 2404, an improved estimate of corrected mass flow rate, density, and gas void fraction may be obtained, and, thereafter, fed back into the water cut error model. This process may continue, for example, until a desired level of accuracy is reached, or until a determined amount of time has passed.

In FIG. 24, the models 2402 and 2404 may be orthogonal to one another, so that one may be replaced without affecting an operation of the other. For example, if a new water cut probe is used (e.g., the probe 230a instead of the probe 230b of FIG. 23), then a corresponding water cut error model may similarly be substituted, while the Coriolis error model may continue to be used.

In other implementations, and, for example, where a specific water cut probe, Coriolis meter, and configuration thereof with respect to one another are known and assumed to be unchanging, then it may be possible to construct a single error model that inputs all three measurements of water cut, mass flow rate, and density, and outputs corrected values of all three (along with, possibly, a corrected gas void fraction). In such implementations, it may not be necessary to feed sequential results back into the error model in order to obtain all three (or four, or more) corrected values.

Figure 25:
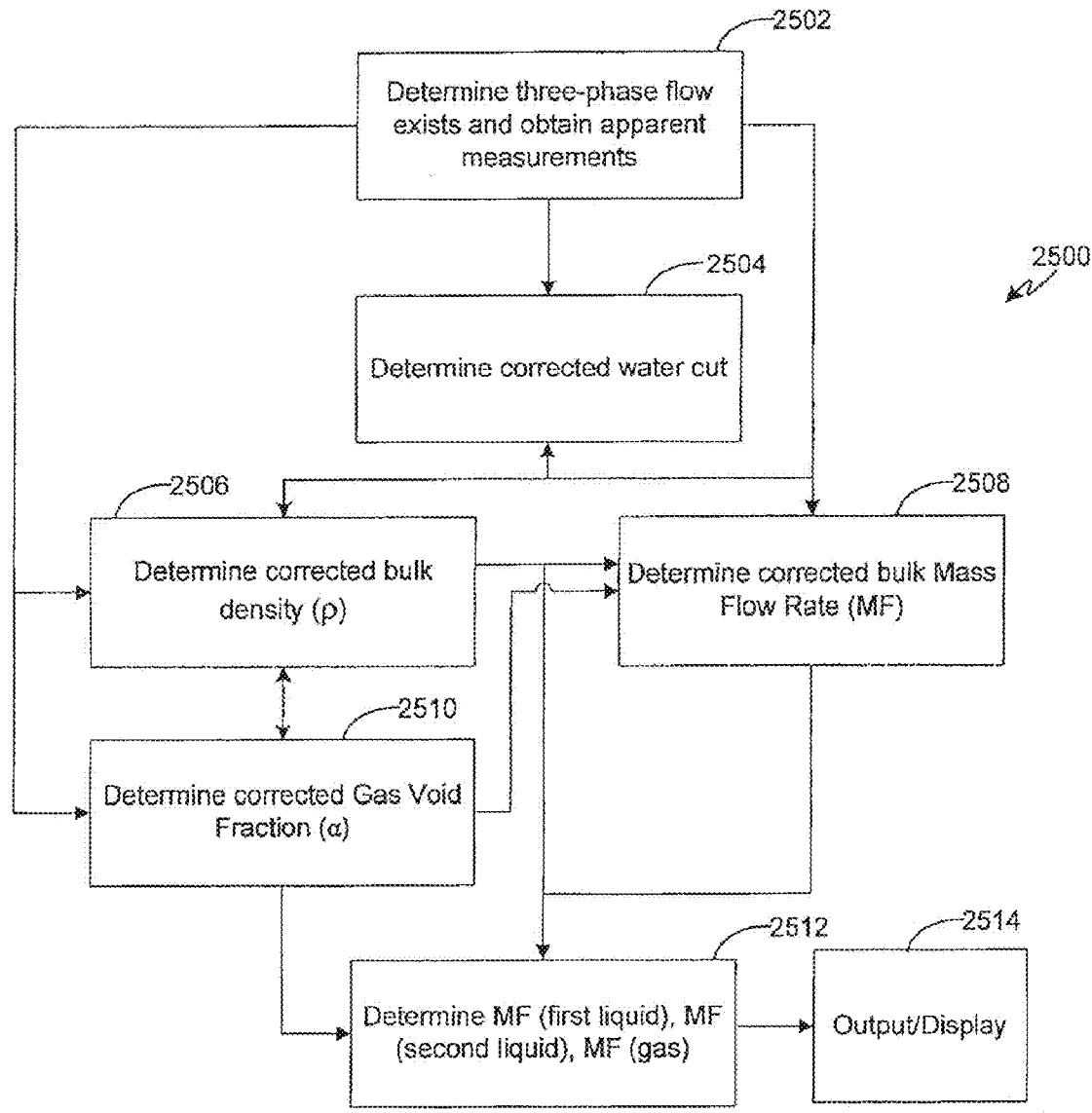
FIG. 25 is a flowchart illustrating a first operation of the flowmeters of FIGS. 21-23.

FIG. 25 is a flowchart 2500 illustrating a first operation of the flowmeter of FIGS. 21-23. More particularly, FIG. 25 represents a high-level description of many different techniques and combinations of techniques, specific examples of some of which (along with other examples) are presented in more detail, below.

In FIG. 25, existence of a three-phase flow is determined and apparent measurements are obtained (2502). For example, the transmitter 104 may obtain an apparent bulk density and an apparent mass flow rate, and the liquid fraction probe 230 may obtain an apparent water cut measurement. As shown in FIG. 21, these measurements may then be output to the corrections system 2108.

In this way, a corrected water cut (2504), corrected bulk density (2506), corrected bulk mass flow rate (2508), and corrected gas void fraction (2510), may be obtained. As illustrated, there are many variations for obtaining these corrected measurements.

For example, the corrected mass flow rate may be determined based only on apparent measurements, such as apparent mass flow rate, or may be determined based on these factors along with an already-corrected density and/or gas void fraction measurement. Similar comments apply, for example, to techniques for obtaining corrected density and/or gas void fraction measurements. Also, it should be apparent that other factors and parameters may be used in calculating corrected values that are not necessarily shown in FIG. 25, such as, for example, temperature, pressure, liquid or gas densities of the flow components, or other parameters, known or measured.

Further, as referenced above, a given correction may be obtained multiple times, with later corrections being based on intervening corrections of other parameters. For example, a first-corrected water cut measurement may be obtained, and may then be revised based on a following void fraction determination, to obtain a second-corrected water cut measurement.

Once some or all of the corrected parameters are obtained, individual component flow rates for one or more of the first liquid component, second liquid component, and gas component may be obtained (2512). Then, these outputs, and/or the corrected values themselves, may be displayed or otherwise output (2514).

Figure 26:
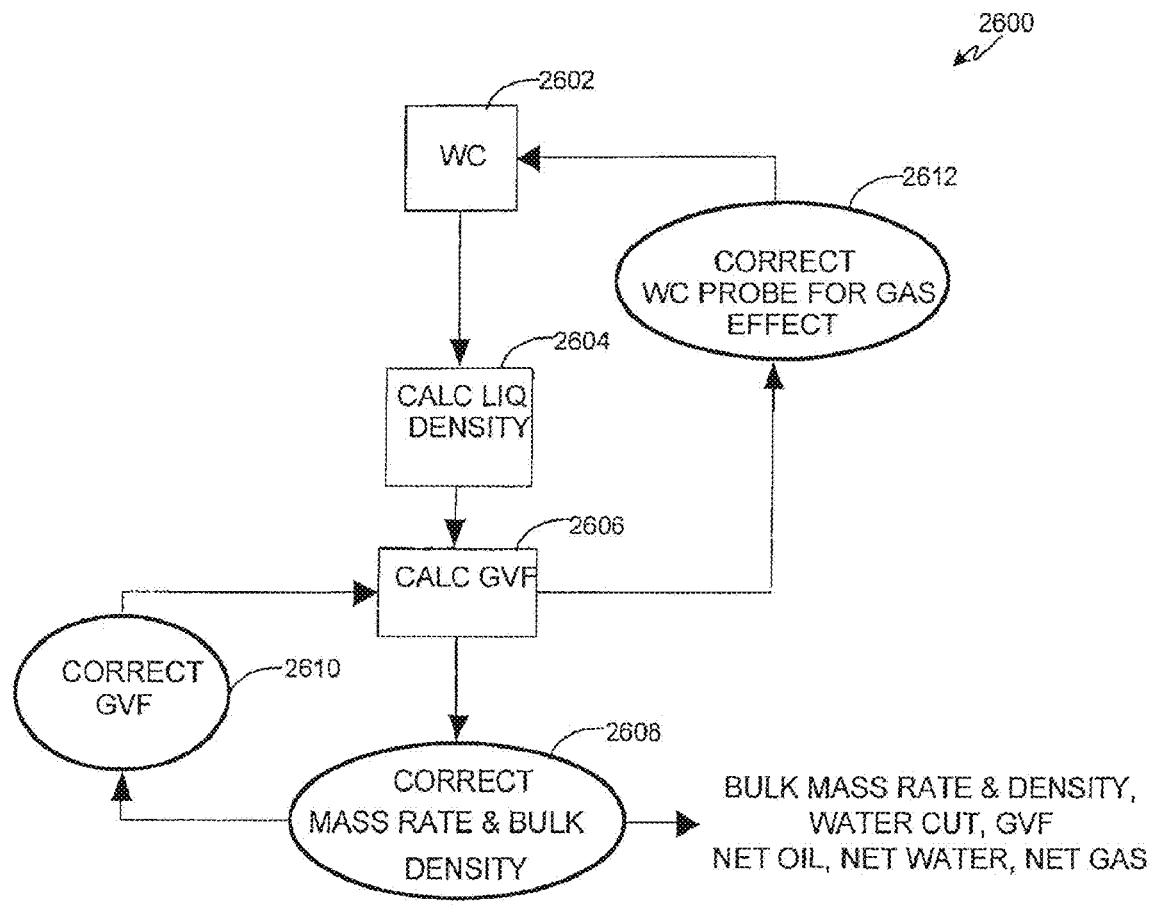
FIG. 26 is a flowchart illustrating a first example of the techniques of FIG. 25.

FIG. 26 is a flowchart 2600 illustrating a first example of the techniques of FIG. 25. In particular, in FIGS. 21-25, correcting bulk density may be associated with determining a water cut measurement, using the water cut probe 230.

Thus, in FIG. 26, an existence of a three-phase flow having a first liquid, a second liquid, and a gas is assumed, and the process begins with a determination of an apparent water cut measurement (2602). Then, the density of the mixture of the two liquids is determined (2604).

Based on this knowledge, an apparent gas void fraction $\alpha_{apparent}$ is determined (2606). Then, in one implementation, the process 2600 continues with a determination of corrected values of, for example, bulk density and bulk mass flow rate (2608).

Once these values are known, a correction for gas void fraction $\alpha_{corrected}$ may be performed (2610), resulting in a new, revised determination of gas void fraction (2606). In this way, a correction of the initial water cut measurement may be performed (2612), so as to take into account an effect of the gas within the three-phase flow on the initial water cut measurement (2602), and thereby obtain an improved water cut measurement.

Then, the improved water cut measurement may be used to determine and improve the liquid density measurement (2604), which, in turn, may be used to determine a corrected or improved gas void fraction measurement (2606). As a result, further-corrected bulk density and bulk mass flow rate measurements may be obtained (2608).

The process 2600, or variations thereof, may be continued until satisfactory results for corrected values of bulk density, bulk mass flow rate, water cut, and/or gas void fraction have been determined. Then, individual mass flow rates for the three components (e.g., oil, water, and gas) of the multiphase flow may be determined.

Specific equations and discussion for implementing the example processes 2500 and 2600, as well as for subsequent examples, are provided below. In this context, specific examples of how and why selected parameters are used also are provided.

For example, water cut in a two-phase flow is defined as the volume fraction of water in the two-phase (e.g., oil-water) mixture, when devoid of gas. Under this condition, water cut is given by Eq. 29:

$$WC = \frac{\rho_{liquid} - \rho_{oil}}{\rho_w - \rho_{oil}} \quad \text{Eq. 29}$$

where $\rho_{liquid}$ is the oil-water mixture density, $\rho_{oil}$ and $\rho_w$ are the pure oil and pure water densities, respectively. Of course, the liquid components of oil and water are just examples, and other liquids may be used.

Generally, in the case of just a two-phase oil-water flow, where no gas is present, the Coriolis flowmeter may measure the mixture (bulk) density, $\rho_{liquid}$, and the mixture mass flow rate, MF. The water cut of the mixture is then calculated based on Eq. 29. This technique is described in more detail in, for example, U.S. Pat. No. 5,029,482, assigned to Chevron Research Company, and may be useful in deriving water cut from a density measurement using a Coriolis flowmeter.

The volumetric flow rate of the liquid (oil-water) mixture may be derived using Eq. 30:

$$VF_{liquid} = \frac{MF_{liquid}}{\rho_{liquid}} \quad \text{Eq. 30}$$

Thus, the two independent measurements of bulk (mixture) density and mass flow rate by the Coriolis flowmeter provide sufficient information to satisfy the mathematical closure requirement where two components are present in the combined stream.

Eqs. 29 and 30, however, cannot be directly applied when three distinct phases (i.e., oil, water and gas) are in a co-mingled stream, i.e., a three-phase flow, as discussed above with respect to FIGS. 21-25, because the Coriolis flowmeter may measure the density and massflow of the mixture of the two liquids and gas. In the three-phase case of, for example, oil-water-gas flow, a third component is introduced which benefits from a third independent source of information to satisfy mathematical closure for three-phase flow.

In the implementations described above, the independent information is provided by another device installed in-line with the Coriolis flowmeter, which encounters the same three-phase mixture, i.e., the water cut probe 230. The water cut probe 230, as described above with respect to FIGS. 21-25, may be of any possible technologies including microwave, capacitance, capacitance-inductance, nuclear magnetic resonance, infrared, and near infrared, and may be implemented using a combination of these types of water cut probes. The use of other types of water cut probes (or, more generally, liquid fraction probes) is envisioned within the scope of the present description, as well.

The transmitter 104, as described above, may be used to provide an apparent bulk density, $\rho_{apparent}$ as well as an apparent bulk mass flow rate, $MF_{apparent}$. Meanwhile, in this example, the water cut probe 230 may be used to obtain an apparent water cut measurement $WC_{apparent}$. The density of the oil-water liquid portion only of the three-phase mixture may thus be derived from the water cut information as shown in Eq. 31, where, as above, component liquid densities are known or may be obtained, for example, according to techniques that also are described above.

$$\rho_{liquid} = (1 - WC_{apparent})\rho_{OIL} + WC_{apparent}{}^{10}\rho_w \quad \text{Eq. 31}$$

The gas void fraction, $\alpha$, as referenced above, is defined as the volume fraction occupied by the gas phase in the three-phase mixture. A definition of $\alpha$ in terms of apparent or non-corrected values, is provided above and repeated here as Eq. 32:

$$\alpha_{apparent} = \frac{\rho_{apparent} - \rho_{liquid}}{\rho_{gas} - \rho_{liquid}} \quad \text{Eq. 32}$$

The density of the gas phase in Eq. 32 above may be calculated based on an independent measurement of process pressure and temperature. For example, pressure may be measured with the pressure transmitter 225, while the temperature is either measured independently using a temperature transmitter or obtained from the Coriolis flowmeter's temperature, e.g., the temperature sensor 220, such as a Resistance Temperature Detector (RTD). Application of, for example, American Gas Association (AGA) algorithms, incorporated into the transmitter 104, may then be used to provide the gas phase density.

In Eq. 32, and as already described with respect to FIG. 26, the calculated liquid phase density (2604) and gas void fraction (2606) based on the water cut input are approximations, since the water cut measurement itself is affected by the presence of gas, which heretofore is unknown. A solution technique to converge to the correct liquid phase density and gas void fraction may thus be used, as shown in FIG. 26.

Specifically, following application of mass flow and bulk density corrections, an updated gas void fraction is obtained (2610, 2606). This updated gas void fraction value is then applied to the water cut reading to correct for the effect of the presence of gas (2612, 2602).

For each specific water cut device, the relationship between water cut and the effect of gas void fraction may be known as shown in Eq. 33:

$$WC_{apparent} = f(\alpha_{apparent}, \rho_{apparent}, MF_{apparent}, \text{others}) \quad \text{Eq. 33}$$

That is, an apparent water cut measurement may be a function of many different parameters, so that a corrected water cut measurement $WC_{corrected}$ may generally be a function of the same parameters, corrected values of those parameters, and/or of the apparent water cut measurement itself.

With the water cut reading updated, the process is repeated, starting with Eq. 31, until suitable convergence criteria has been satisfied. Then, the corrected three-phase mixture (bulk) mass flow rate, density, and gas void fraction may be reported at process temperature.

The individual volumetric flow rate of each phase/component is then calculated and corrected to standard temperature using, for example, the American Petroleum Institute (API) equations for crude oil and produced water, and the AGA algorithms for produced gas. These functionalities also may be incorporated into the transmitter 104.

For example, in one implementation, the water cut meter 230 may be operable to feed its measurement signal and information directly into either an analog or digital communications port (input/output) of the transmitter 104. In another implementation, the water cut meter is capable of communicating with the transmitter 104 in a bi-directional communications mode. As part of this implementation, the water cut meter is able to feed its measured signal and information directly into the communications port of the transmitter 104 as just described. The transmitter 104 also may be capable of sending signals and information to the water cut probe 230.

Figure 27:
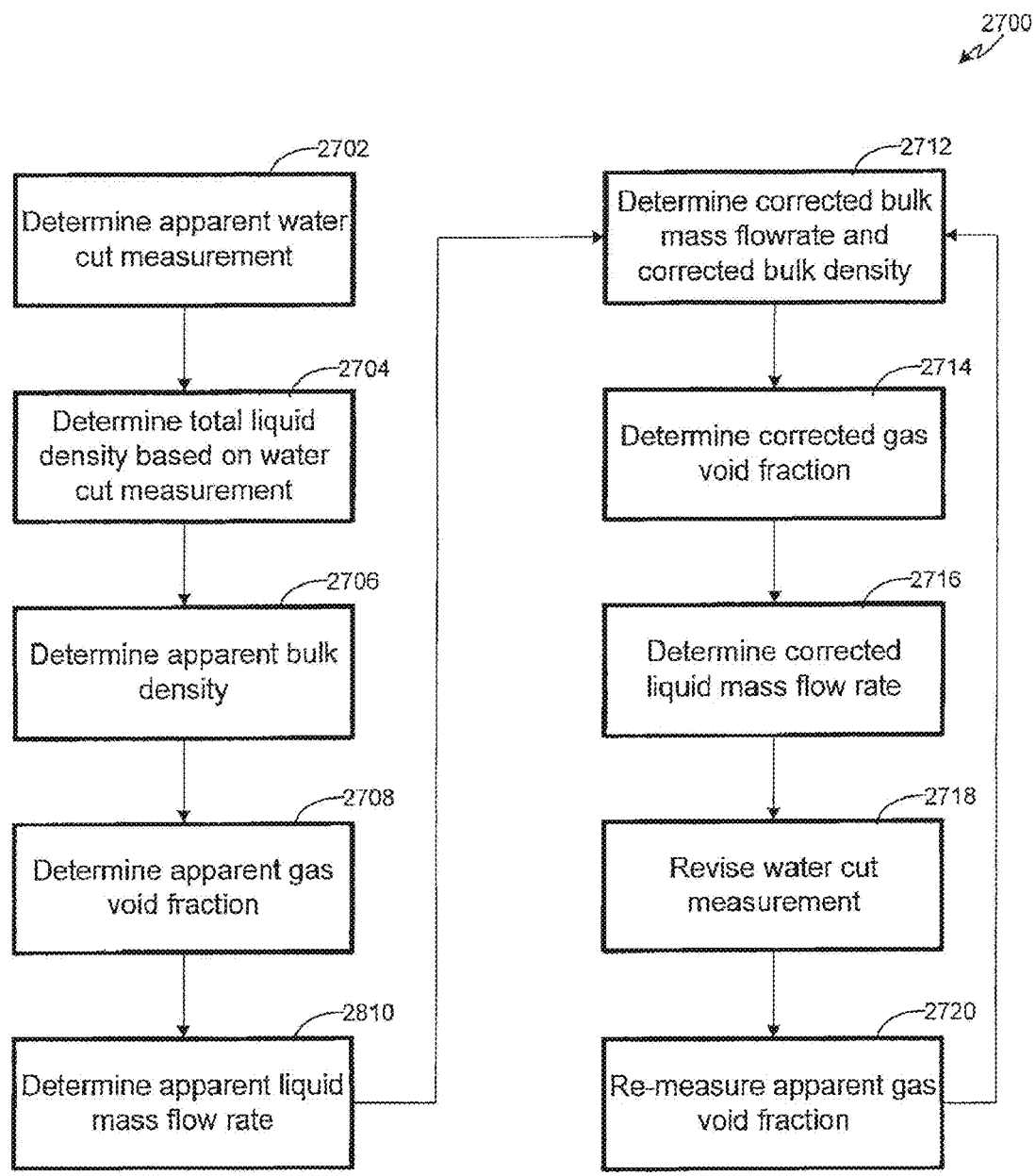
FIG. 27 is a flowchart illustrating a second example of the techniques of FIG. 25.

FIG. 27 is a flowchart 2700 illustrating a second example of the techniques of FIG. 25. In FIG. 27, as in FIG. 26, the process 2700 begins with a determination of an apparent water cut measurement (2702).

Then, the water cut measurement may be used to determine a density of the total liquid component (e.g., a density of a combined oil and water portion of the three-phase flow), perhaps using Eq. 31 (2704). An apparent bulk density of the multiphase flow, or an apparent density drop as described above, may be determined (2706), and an apparent gas void fraction may be determined, either independently of, or based on, the apparent bulk density (2708). Similarly, an apparent mass flow rate of the total liquid component may then be calculated (2710), using some or all of the previously-calculated parameters.

At this point, first values for corrected and bulk density and corrected bulk mass flow rate may be determined (2712). Then, values for a corrected gas void fraction (2714), a corrected total liquid component mass flow rate (2716), and a revised or corrected water cut measurement (2718) may be determined.

With the revised water cut measurement and other parameters, a revised gas void fraction measurement may be obtained. Then, as shown, further corrections to the bulk mass flow rates and bulk density may be performed, and this process may be repeated until a suitable level of correction is reached. And, as described above with respect to FIGS. 25 and 26, outputs for the corrected bulk mass flow rate, corrected bulk density, corrected water cut measurement, and/or corrected gas void fraction measurements may be obtained. Also, although not explicitly illustrated in FIG. 27, mass flow rates for the three individual components of the multiphase flow may be obtained.

Figure 28:
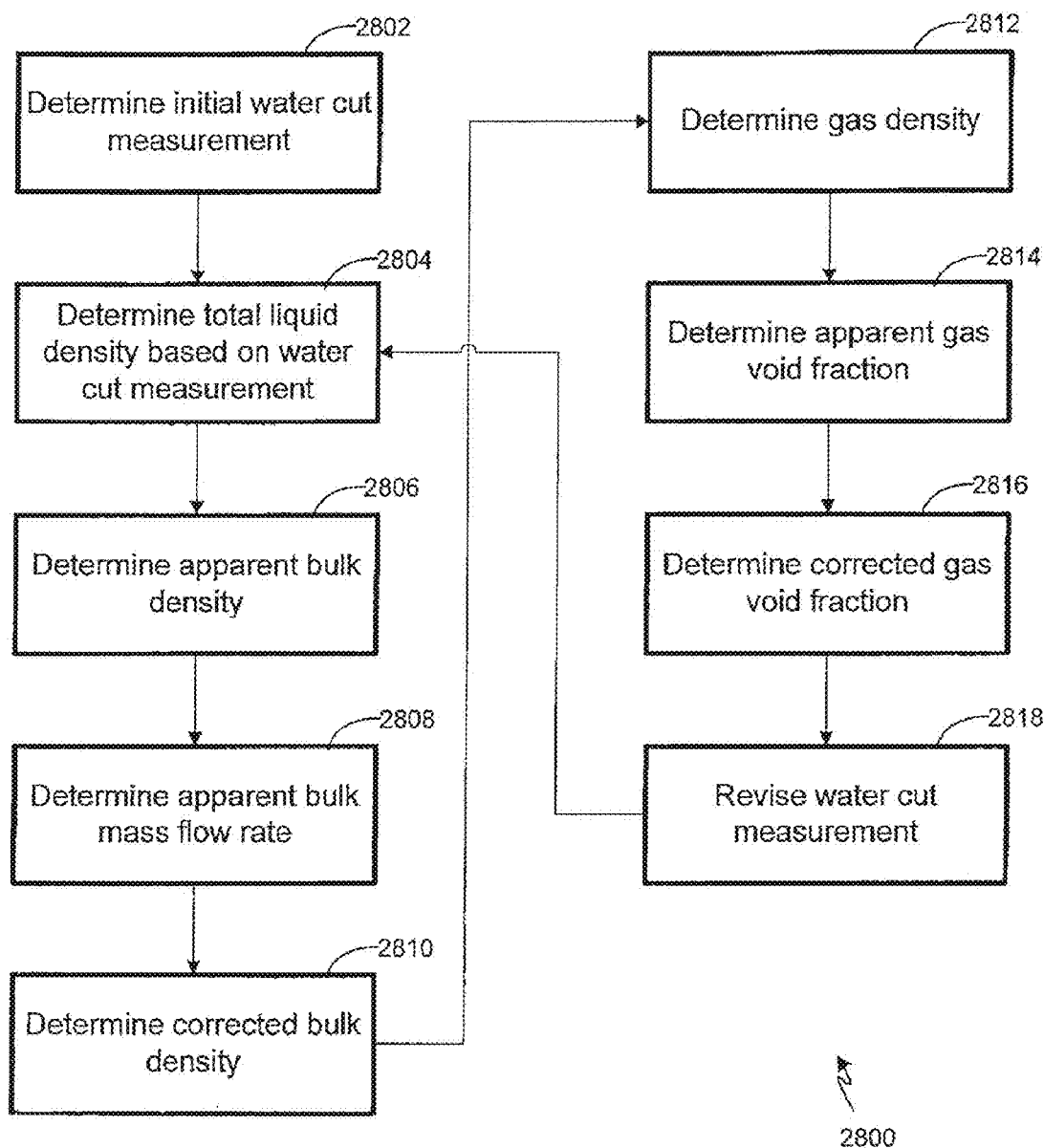
FIG. 28 is a flowchart illustrating a third example of the techniques of FIG. 25.

FIG. 28 is a flowchart 2800 illustrating a third example of the techniques of FIG. 25. The process of FIG. 28 begins, as in the process 2700, with determinations of water cut measurements, total liquid density, and apparent bulk density (2702, 2704, 2706). Then, an apparent bulk mass flow rate is determined (2802).

Based on this information, corrected values for bulk density and bulk mass flow rate may be determined (2804). Then, a gas density may be determined, as, for example, a function of pressure and temperature (2806). Accordingly, a gas void fraction can be determined (2808) and corrected (2810). Using the corrected gas void fraction, a revised water cut measurement can be determined (2812), and used to calculate an improved liquid density, and the process repeated until a satisfactory result is reached.

As with FIG. 26, and in combination with the discussion thereof, specific examples, equations, and techniques are presented below for implementing the processes of FIGS. 27 and 28. Of course, other techniques also may be used.

The water cut probe 230 or other instrument, as described above, provides a measurement of the volumetric ratio of water to bulk liquid in the liquid phase, as shown in Eq. 34 (2702), where the water cut value WC initially represents an apparent water cut value (i.e., calculated based on apparent values of mass flow and density) that may be improved or corrected as the processes continue, as already described:

$$WC = \frac{VF_w}{VF_w + VF_{oil}} = \frac{\frac{MF_w}{\rho_w}}{\frac{MF_w}{\rho_w} + \frac{MF_{oil}}{\rho_{oil}}} \qquad \text{Eq. 34}$$

The flowmeter is therefore able to use the water cut measurement to calculate the liquid phase density as shown in Eq. 31 (2704). From this the flowmeter is able to determine the apparent drop in density caused by the presence of the gas, as discussed above with respect to, for example, a normalized Eq. 23, which is reproduced here for convenience:

$$\Delta\rho_{apparent} = \frac{\rho_{liquid} - \rho_{apparent}}{\rho_{liquid}} \qquad \text{Eq. 23}$$

and, as described above, apply a correction algorithm, according to the orientation of the meter, apply a cubic form of Eq. 17, also reproduced here for convenience:

$$\Delta\rho_{true} = \sum_{i=1}^{M} a_i (\Delta\rho_{apparent})^i \qquad \text{Eq. 17}$$

and determine a corrected mixture density using Eq. 35:

$$\rho_{true} = (1 - \Delta\rho_{true})\rho_{liquid} \qquad \text{Eq. 35}$$

which can be used to calculate a 'best estimate' of the gas void fraction defined by Eq. 32, above.

Other techniques for use with the processes of FIGS. 25-28 should be understood from the above discussion of similar calculations in the context of, for example, two-phase (e.g., liquid and gas) flow. In particular, it should be understood that some or all of the equations used in a two-phase setting may be applicable with respect to a three-phase flow, inasmuch as a three-phase flow of, for example, oil, water, and gas, may be considered to be a two-phase flow of gas with and oil/water mixture. Still other techniques for using the systems of FIGS. 21-24 are described below with respect to data gathered with respect to specific uses and implementations thereof.

Figure 29:
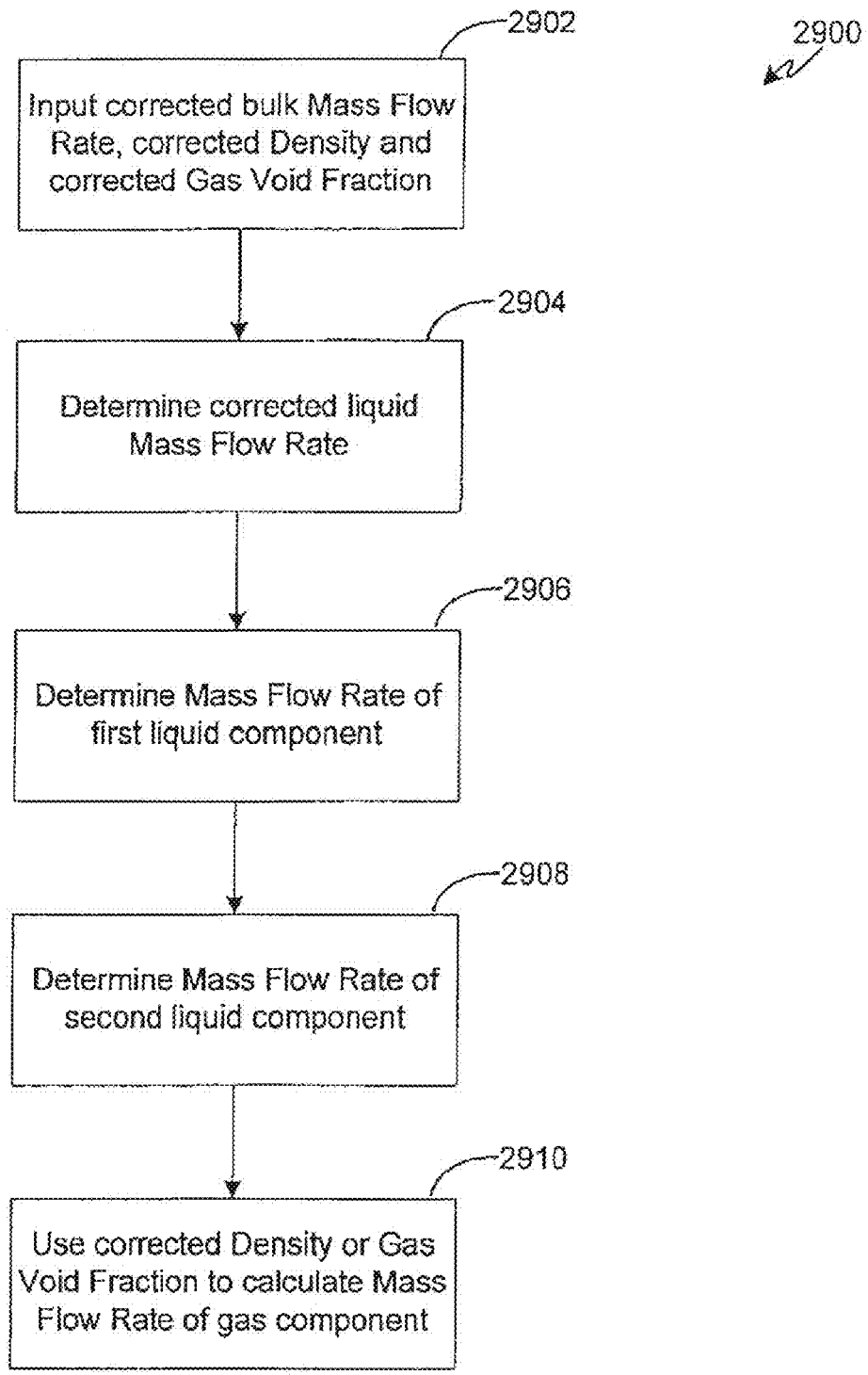
FIG. 29 is a flowchart illustrating techniques for determining component flow rates for a three-phase flow.

FIG. 29 is a flowchart 2900 illustrating techniques for determining component flow rates for a three-phase flow. That is, FIG. 29 corresponds to a more detailed view of determining component flow rates, as shown in FIG. 25 (2512).

In FIG. 29, the parameters of corrected bulk mass flow rate, corrected bulk density, and corrected gas void fraction (and/or corrected water cut) are input (2902). Then, a corrected liquid flow rate is determined (2904), i.e., a flow rate of the mixture of the two liquids (e.g., oil and water) in the three-phase flow.

A mass flow rate of a first liquid component (e.g., water) is then determined (2906), followed by a determination of a mass flow rate of the second liquid component (e.g., oil) (2908). Finally, the corrected density, gas void fraction, and/or water cut value may be used to determine a mass flow rate of the gas component of the three-phase flow (2910).

Figure 30:
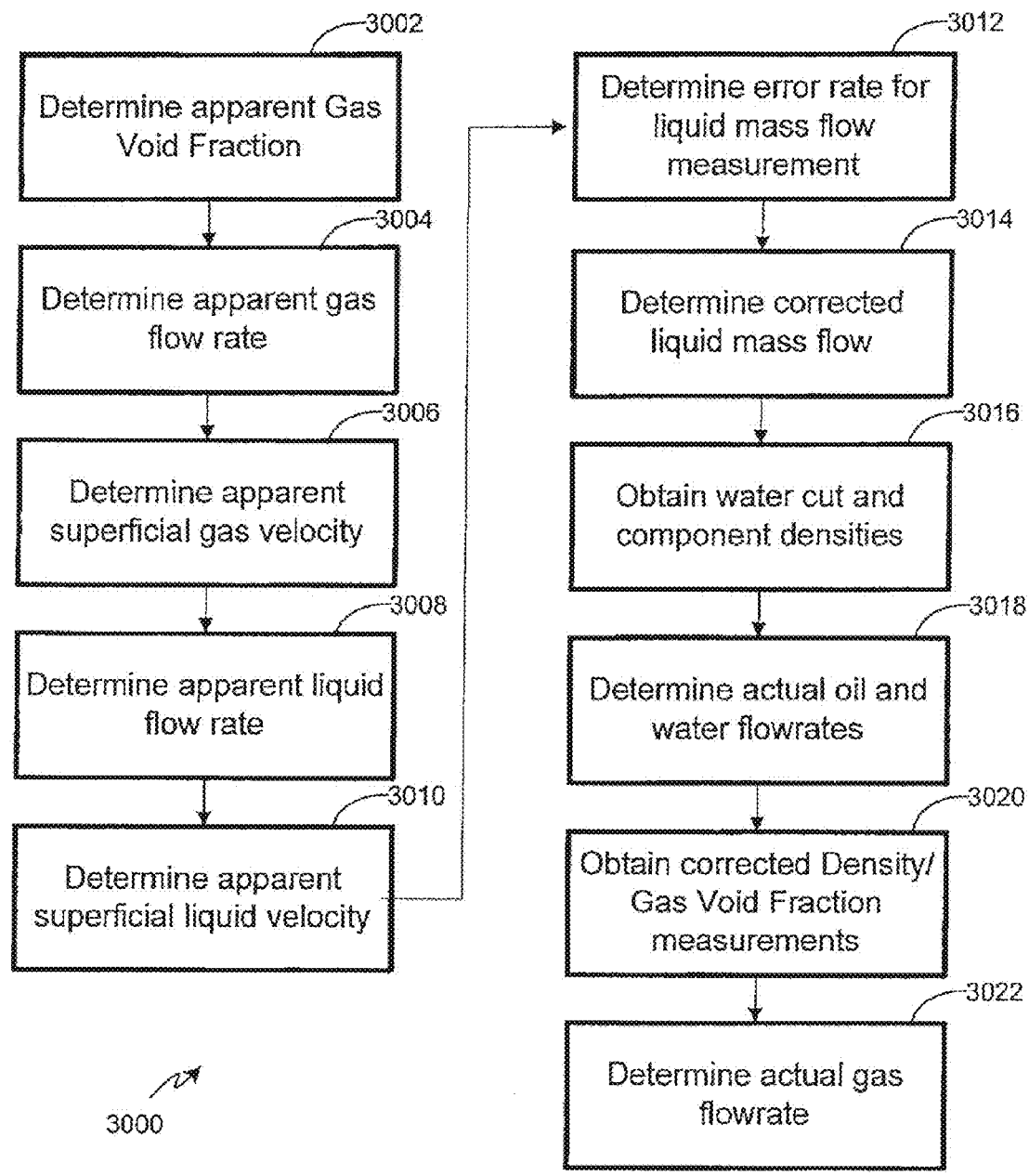
FIG. 30 is a flowchart illustrating more specific techniques for performing the determinations of FIG. 29.
Figure 31A:
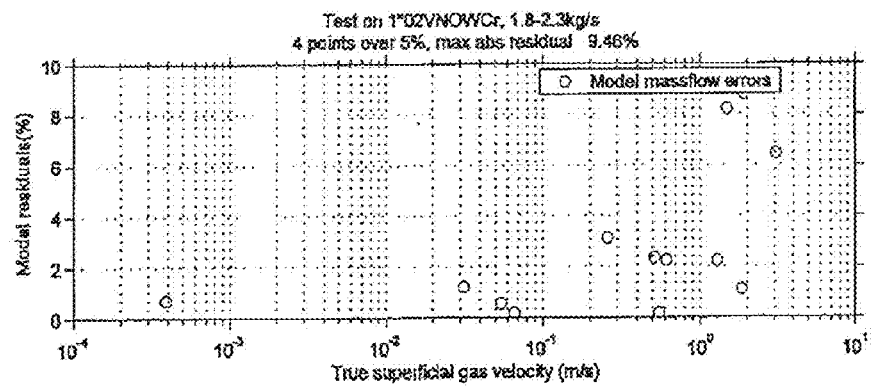
FIGS. 31A-31D are graphs illustrating correction of a mass flow rate of a two-phase liquid in a three-phase flow.
Figure 31B:
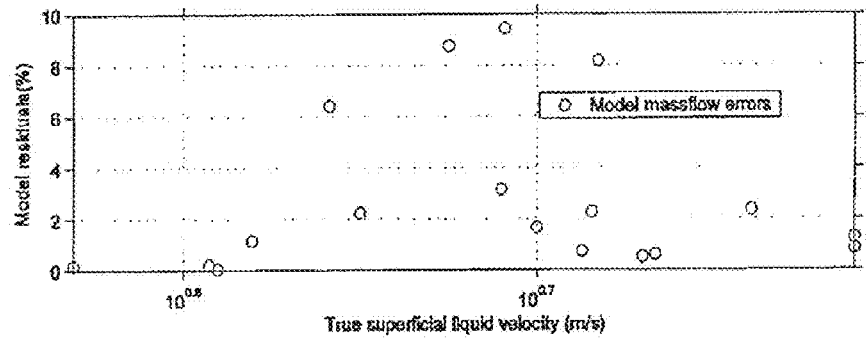
Figure 31C:
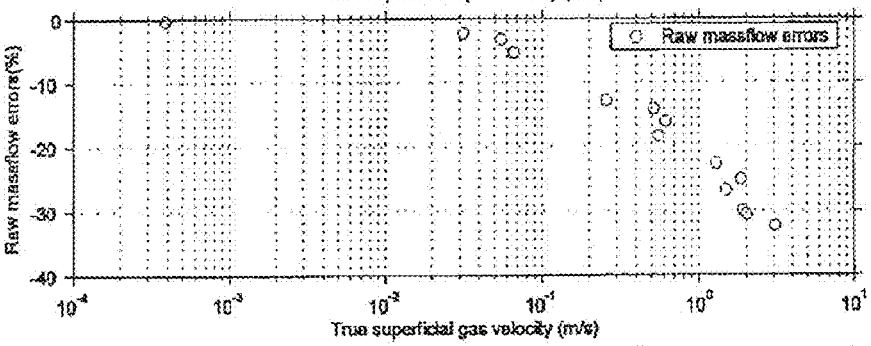
Figure 31D:
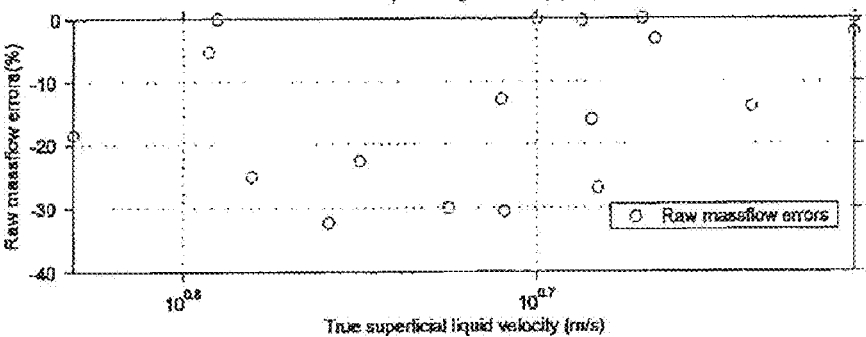

FIG. 30 is a flowchart 3000 illustrating examples of more specific techniques for performing the determinations of FIG.

29. In FIG. 30, it should be understood that the corrected mass flow rates of the liquid and its components are determined independently of the corrected density or gas void fraction measurements.

Specifically, an apparent gas void fraction is determined (3002), using Eq. 32, above.

Then, an apparent gas flow rate is determined (3004), using Eq. 36:

$$MF_{apparent}^{gas} = \alpha_{apparent}\left(\frac{\rho_{gas}}{\rho_{apparent}}\right)MF_{apparent} \quad \text{Eq. 36}$$

$$= \left(\frac{\rho_{gas}}{\rho_{liquid} - \rho_{gas}}\right)\left(\frac{\rho_{liquid} - \rho_{apparent}}{\rho_{apparent}}\right)MF_{apparent}$$

Then, an apparent superficial gas velocity is determined (3006). The apparent superficial gas velocity may be calculated by the volume flowrate of the liquid divided by the flowtube cross sectional area $A_T$, as shown above, and reproduced here, in Eq. 1:

$$SV^{gas} = \frac{MF^{gas}}{\rho_{gas}A_T} \quad \text{Eq. 1}$$

An apparent liquid flow rate may then be determined (3008). The apparent liquid phase mass flowrate may be derived from the apparent bulk mass flowrate and apparent gas void fraction, using Eq. 37:

$$MF_{apparent}^{liquid} = MF_{apparent} - MF_{apparent}^{gas} \quad \text{Eq. 37}$$

$$= (1 - \alpha_{apparent})\left(\frac{\rho_{liquid}}{\rho_{apparent}}\right)MF_{apparent}$$

Apparent superficial liquid velocity can then be determined (3010). To find the apparent superficial liquid velocity, the volume flowrate of the liquid may be divided by the flowtube cross sectional area $A_T$, as shown above and reproduced here in Eq. 2:

$$SV^{liquid} = \frac{MF^{liquid}}{\rho_{gas}A_T} \quad \text{Eq. 2}$$

Then, an error rate for liquid mass flow measurement is determined (3012). This error in the apparent liquid mass flowrate may be defined as a fraction of the true liquid mass flow, as shown in Eq. 38:

$$\text{error}(MF_{apparent}^{liquid}) = \left[\frac{MF_{apparent}^{liquid} - MF_{true}^{liquid}}{MF_{true}^{liquid}}\right] \quad \text{Eq. 38}$$

This fractional liquid mass flow error as a function of both apparent superficial liquid and apparent superficial gas flows (normalized) may be estimated using a polynomial expression shown in Eq. 39, where the error term is shown as $e_l^c$ to indicate a corrected error for the liquid mass flow:

$$v_{ln}^a = \frac{v_l^a}{v_{lmax}}, \quad \text{Eq. 39}$$

$$v_{gn}^a = \frac{v_g^a}{v_{gmax}}$$

$$e_l^c =$$

$$a_1 v_{gn}^a \cdot e^{a_2 v_{gn}^{a2} + a_3 v_{gn}^a v_{ln}^a + a_4 v_{ln}^{a2} + a_5 v_{ln}^a} + a_6 v_{gn}^{a2} + a_7 v_{gn}^a + a_8 v_{ln}^{a2} + a_9 v_{ln}^a$$

In Eq. 39, due to the size of the expression(s), the following notation is used: $v_{ln}{}^a$ refers to a normalized apparent liquid flow (replacing "l" with "g" in the subscript for the corresponding gas parameter), where normalization is based on, for example, a maximum possible flowrate(s), as indicated by $v_{lmax}$ and $v_{gmax}$.

A corrected liquid mass flow rate measurement may be determined (3014), using Eqs. 38 and 39, expressed here as Eq. 40:

$$MF_{corrected}^{liquid} = \left[\frac{MF_{apparent}^{liquid}}{1 + \text{error}(MF_{apparent}^{liquid})}\right] \quad \text{Eq. 40}$$

Then, the water cut and component densities may be determined (3016), or obtained using the above-described techniques, and used to determine a corrected oil flow rate and a corrected water flow rate (3018). Then, using the corrected bulk density and corrected gas void fraction (3020), a corrected gas flow rate may be determined (3022).

For example, the water and oil mass flowrates may be calculated, using Eqs. 41 and 42:

$$MF_{corrected}^{water} = WC_{corrected}\left(\frac{\rho_{water}}{\rho_{corrected}^{liquid}}\right)MF_{corrected}^{liquid} \quad \text{Eq. 41}$$

$$MF_{corrected}^{oil} = (1 - WC_{corrected})\left(\frac{\rho_{oil}}{\rho_{corrected}^{liquid}}\right)MF_{corrected}^{liquid} \quad \text{Eq. 42}$$

Then, using the corrected mixture density (or corrected gas void fraction), the gas mass flowrate may be determined using Eqs. 43 and 44:

$$MF_{corrected}^{gas} = \alpha_{corrected}\left(\frac{\rho_{gas}}{\rho_{corrected}}\right)MF_{corrected} \quad \text{Eq. 43}$$

$$= \left(\frac{\alpha_{corrected}}{1 - \alpha_{corrected}}\right)\left(\frac{\rho_{gas}}{\rho_{corrected}^{liquid}}\right)MF_{corrected}^{liquid} =$$

$$= \left(\frac{\rho_{gas}}{\rho_{corrected}^{liquid}}\right)\left(\frac{\rho_{corrected}^{liquid} - \rho_{corrected}}{\rho_{corrected} - \rho_{gas}}\right)MF_{corrected}^{liquid}$$

$$MF_{corrected}^{gas} = \alpha_{corrected}\left(\frac{\rho_{gas}}{\rho_{corrected}}\right)MF_{corrected} \quad \text{Eq. 44}$$

$$= \left(\frac{\alpha_{corrected}}{1 - \alpha_{corrected}}\right)\left(\frac{\rho_{gas}}{\rho_{corrected}^{liquid}}\right)MF_{corrected}^{liquid} =$$

$$= \left(\frac{\rho_{gas}}{\rho_{corrected}^{liquid}}\right)\left(\frac{\rho_{corrected}^{liquid} - \rho_{corrected}}{\rho_{corrected} - \rho_{gas}}\right)MF_{corrected}^{liquid}$$

It should be understood that, based on the single phase densities and their variation with temperature, it is possible to convert the mass flows to volume flows at a reference temperature.

In some cases, there may be uncertainty in the polynomial fit to the error curves, where the effect of this uncertainty on the corrected mass flowrate is given by Eq. 45:

$$CE = \frac{(MF_{corrected}^{liquid} - MF_{true}^{liquid})}{MF_{true}^{liquid}} = \frac{(e_{apparent}^{liquid} - e_{true}^{liquid})}{(1 + e_{true}^{liquid})} \quad \text{Eq. 45}$$

Eq. 45 helps to explain why some data may exhibit large errors when the correction algorithms are use outside a tested region. For example, if the calculated error at a given flowrate is −70%, but the true error is −75% then the model error is only 5%, but the error in the corrected mass flow is $$\frac{-0.7 + 0.75}{1 - 0.75} = 0.2 = 20\%$$

Such a calculation also may be used in 2-phase flow modeling results as described above, to consider resulting residual error in the modeling. In one implementation, the model least square fit may be modified to minimize the resultant mass flow error rather than the model error. Also, generally speaking, a flowtube may be expected to exhibit small mass flow errors, so that if a flowmeter is expected to correct for large errors, then the error modeling (and hence experimental data) becomes relatively more important.

Thus, as described above with respect to FIG. 30, apparent superficial velocities are used to carry out mass flow corrections, so as to decouple the bulk density correction from the liquid mass flow correction.

FIGS. 31A-31D are graphs illustrating correction of a mass flow rate of a two-phase liquid in a three-phase flow. FIGS. 31A-31D show the predicted liquid mass flow errors when the 3-phase flow correction algorithm is applied to data obtained from four oil+water+gas trials using a vertical orientation. FIGS. 31A-31D show that the basic correction curve does work within 5% for all but the highest gas flows, which are outside the range of data used for modeling.

Figure 32:
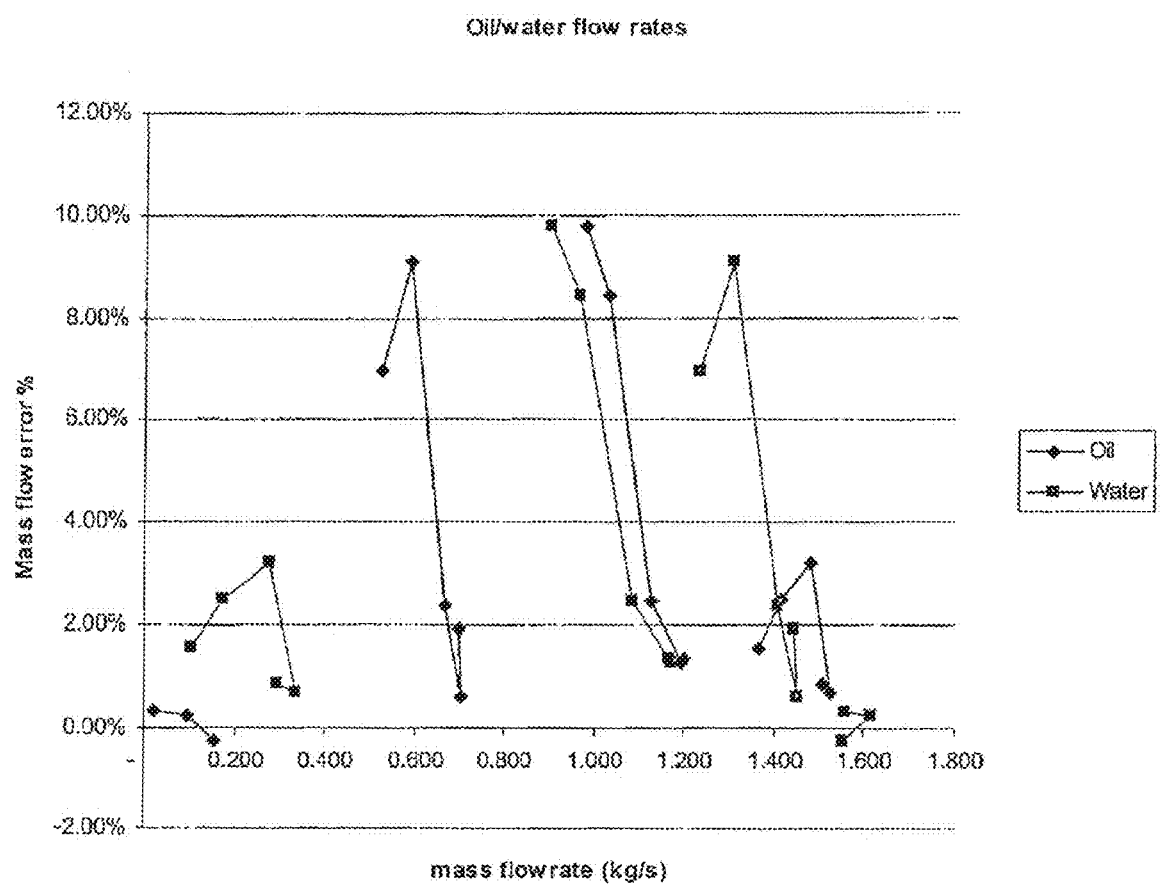
FIG. 32 is a graph showing a mass flow error as a function of mass flow rate for oil and water.
Figure 33:
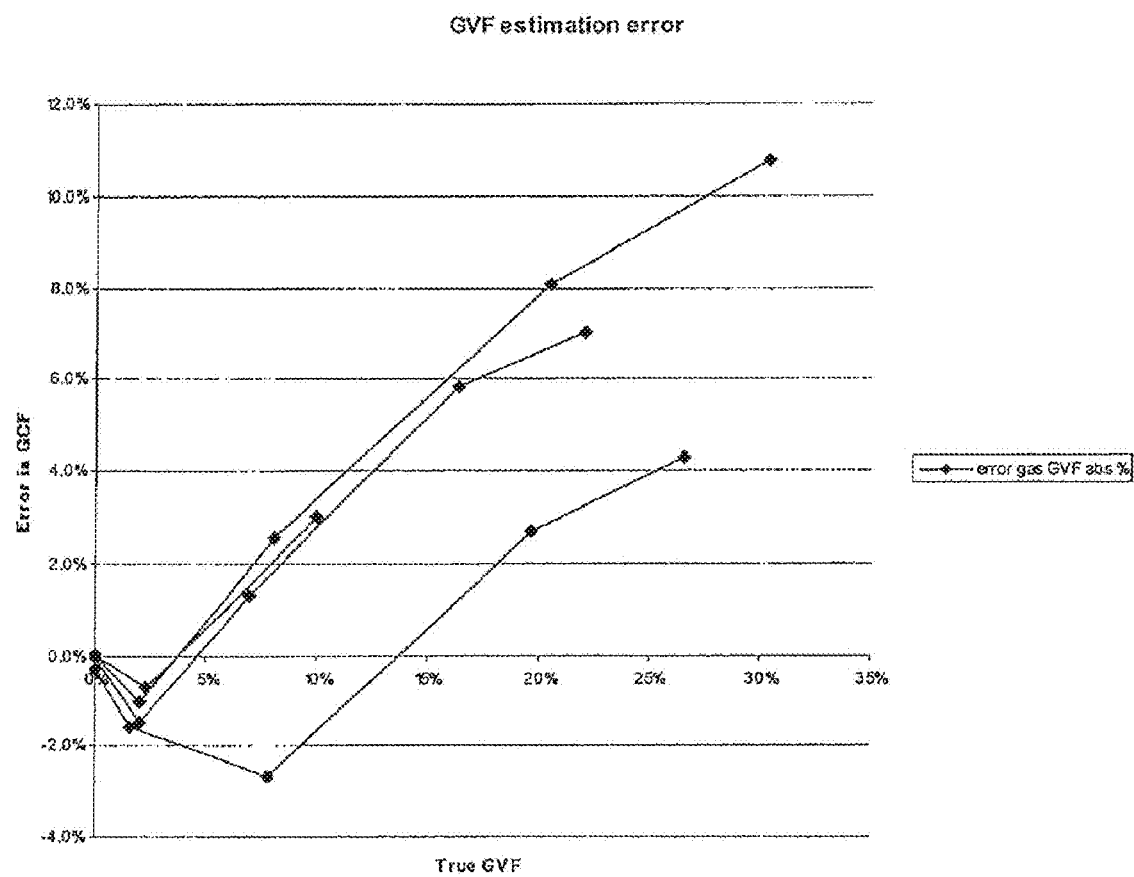
FIG. 33 is a graph showing a gas void fraction error as a function of true gas void fraction.

FIG. 32 is a graph showing a mass flow error as a function of mass flow rate for oil and water. FIG. 33 is a graph showing a gas void fraction error as a function of true gas void fraction. FIGS. 32 and 33 illustrate the errors in estimating the three mass flow fractions by spreadsheet implementation of the above algorithms.

It should be noted that the actual determination of the gas mass flow may be affected by uncertainty in the mixture density and a relative difference in density between the liquid and gas phase. Also, it should be understood that the density correction polynomial discussed above may be more or less applicable depending on, for example, flowtube orientation. As a result, for example, horizontal flow may result in a lower error than vertical flow, or vice-versa.

In the above-described approach, the use of superficial liquid and gas velocities may enable the correction algorithms to include knowledge of the multi-phase flow regimes encountered, which may lead to better correction algorithms.

The results on practical data indicate that the correction polynomial curves may benefit from being designed on data spanning the expected flow-ranges, and from being 'jacketed' to prevent spurious results when exposed to data outside the known range.

Although the implementations discussed above make use of an external water cut probe or similar technique, other implementations could be used that rely on the external void fraction sensor/meter 235, and/or on other input parameters.

Additionally, as referenced above, other devices, such as those designed to determine an "oil-cut," rather than a water cut, may be used. Further, if oil and water in a mixture have well-separated densities, a sampling system may be used that takes a representative sample of the mixture, de-gasses it and uses a Coriolis meter to determine the water cut.

As described, in the case of single liquid two-phase flow, knowledge of the liquid and gas densities at the operation temperature and pressure may be used with the corrected density and massflow measurements to calculate each of the liquid and gas mass flow rates, and, thereby, the liquid and gas volumetric flow.

In the case of three-phase flow, extra, external measurements may be used to enable the estimation of gas mass flow and the mass flow of each of the two liquids. In the case of water and oil liquid mixture, the water cut of the mixture may be measured up-stream of the Coriolis meter, as explained and illustrated above. In one implementation, it may be assumed that the two liquids do not interact in such a way as to invalidate the assumption that the mixture of the two liquid behave as a single liquid as far as the interaction with the gas phase is concerned. This assumption makes the three-phase flow an extension of the single-liquid two-phase flow, the extra measurements being used to determine the mixed liquid density and to decouple the separate liquid massflows, after two-phase flow calculations are applied.

As further discussed above, a Coriolis meter will generally under-read both the mixture density and the mixture massflow of a liquid/gas mixture. To compensate for the errors in these raw measurements and estimate the true measurement values, a model for the error surfaces may be used so as to find a mapping between the raw density and massflow measurements, and the value of the raw measurement errors, for both massflow and density measurements, i.e., to perform a data fitting.

As already pointed out, both the density and massflow error curve may depend on many factors, such as, for example, meter size, meter orientation (e.g., horizontal vs. vertical), and a nominal liquid mass flow. Accordingly, corrections may be developed for each individual meter size and orientation. In other implementations, the compensations may be scaled according to meter size and/or adjusted according to meter alignment.

General data fitting techniques include, for example, table lookup, polynomial/rational function interpolation, non-linear methods, and neural networks, among others. For example, FIG. 24 illustrates error models that may be implemented using neural networks.

Figure 34:
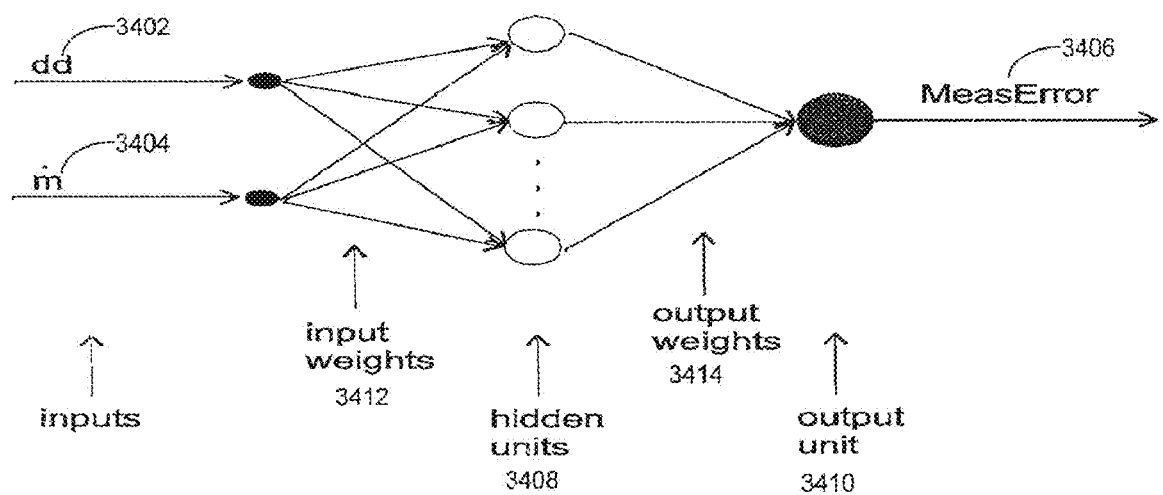
FIG. 34 is a graphical representation of a neural network model.

FIG. 34 shows a particular form of neural network model, the multi layer perceptron (MLP), with just two layers of weights 3412, 3414 and sigmoidal hidden units 3408, has been demonstrated to be capable of approximating any continuous mapping function to arbitrary accuracy (provided that the number of hidden units is sufficiently large), also referred to as the universality property. This is intuitively supported by the idea that any reasonable functional mapping can be approximated with arbitrary accuracy by a linear superposition (performed by the output units activation functions) of a sufficiently large number of non-linear functions (represented by the hidden units activation functions). Moreover, being a feed-forward network (i.e. there are no internal loops in data streaming from inputs to outputs), its outputs are deterministic functions of the inputs, making the whole network equivalent to a multivariate non-linear functional mapping.

For the design of a flexible compensation technique for two- or three-phase flow errors in a Coriolis meter, neural network models present at least the following advantageous features. For example, such models provide the ability to derive a non-linear functional mapping from a sufficiently large and representative database of relevant measurements, without prior knowledge of the underlying physical model of the process. Such a feature may be particularly advantageous in the example of the two/three-phase flow compensation problem, where actual physical processes inside the tube may be difficult to obtain.

Further, development time for a viable solution for a particular problem may be significantly reduced compared with other data fitting techniques, which may rely on domain expertise. For example, in the particular case of two-phase flow compensation, changing meter size/orientation/type might completely change the shape of the raw measurements surface, and for a conventional data technique, this may imply a process of finding another form for the functional mapping that is not guaranteed to find a solution in a reasonable time. By contrast, using the same neural network architecture, the neural network training may find the "best" (in the sense of the cost function chosen to control the network training) solution for the data available by adjusting its internal parameters during the training process.

The following discussion provides explanation of one example of a neural network, i.e., an MLP model. Specifically, FIG. 34 is a graphical representation of the MLP model.

To model raw measurements error surfaces for density and mass flow, as discussed above, a functional mapping may be given by MeasError=F(dd, ṁ), with dd the apparent drop in mixture density and ṁ the apparent massflow of the liquid. It should be noted that this notation is slightly different from the above notation for the same parameters, i.e., Δρ and MF, respectively.

FIG. 34 thus illustrates a multi-layer perceptron (MLP) model with two inputs (dd 3402 and ṁ 3404) and one output (MeasError 3406). The behavior of each unit is graphically represented in FIG. 35.

Figure 35:
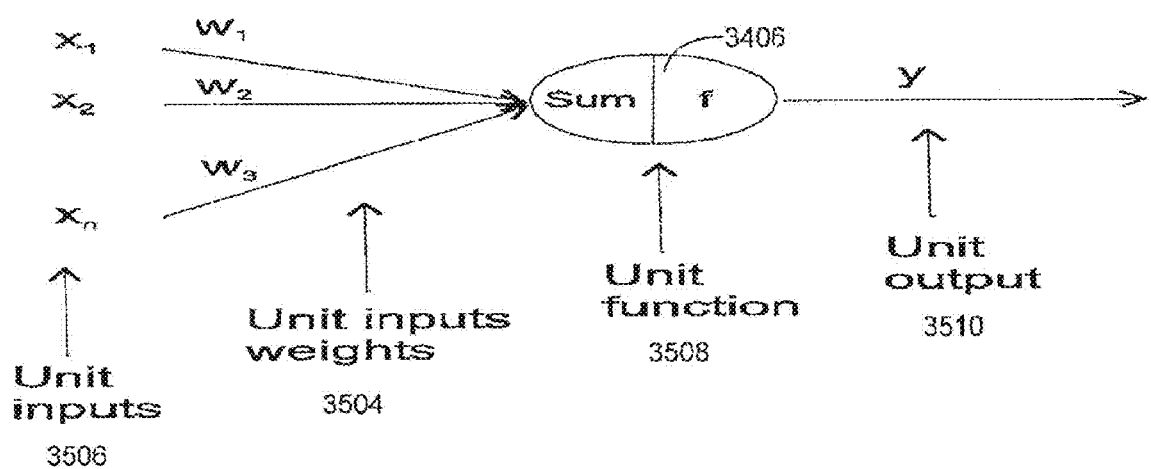
FIG. 35 is a graphical representation of units of the model of FIG. 34.
Figure 36A:
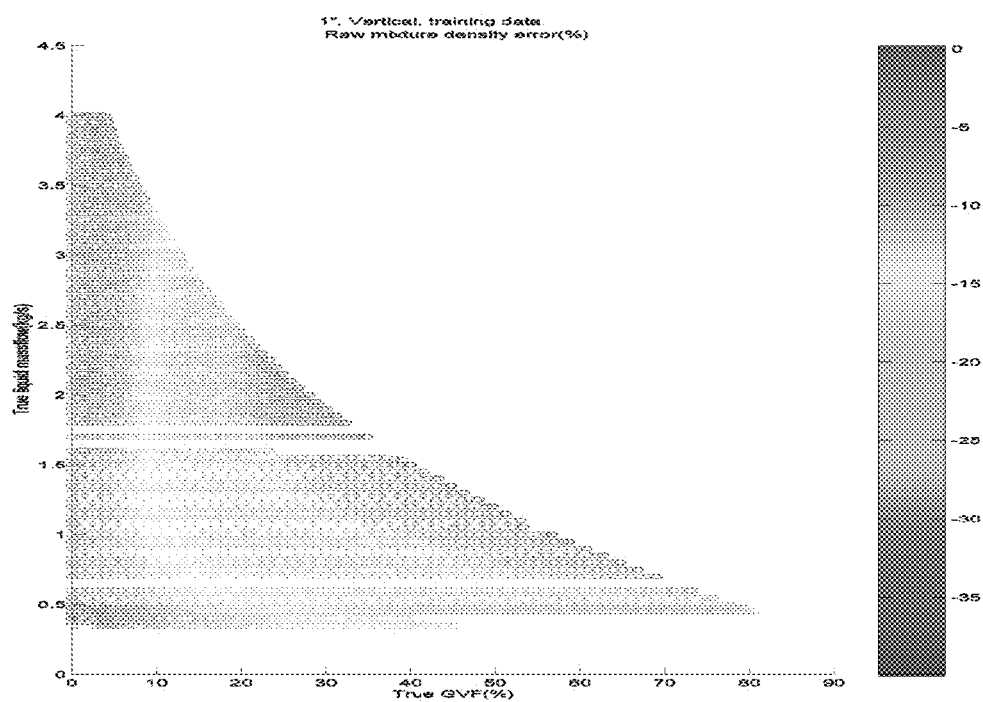
FIGS. 36A, 36B, and 37A-D illustrate results from two-phase flow data to which the model of FIGS. 34 and 35 is applied.
Figure 36B:
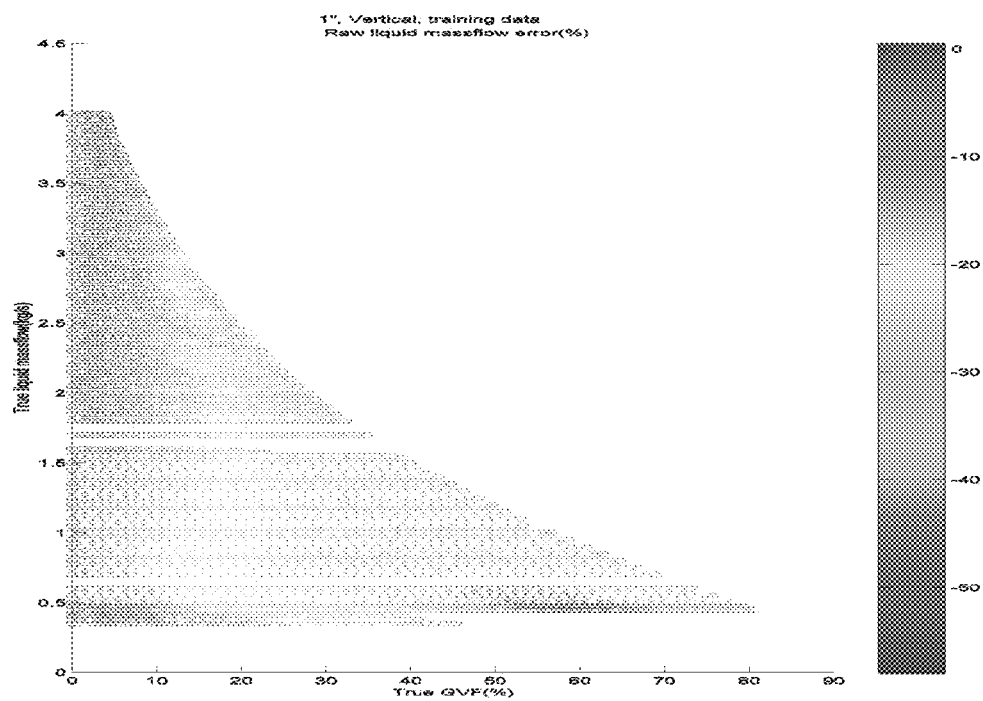
Figure 37A:
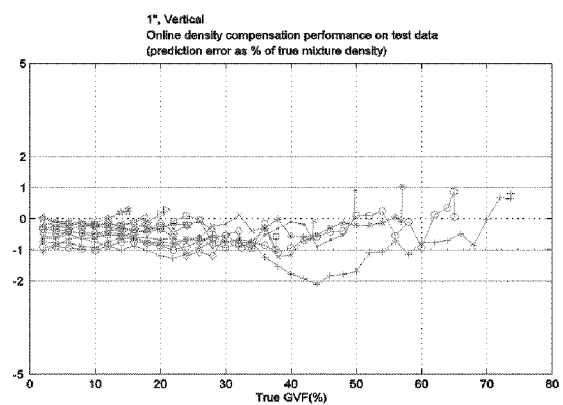
Figure 37B:
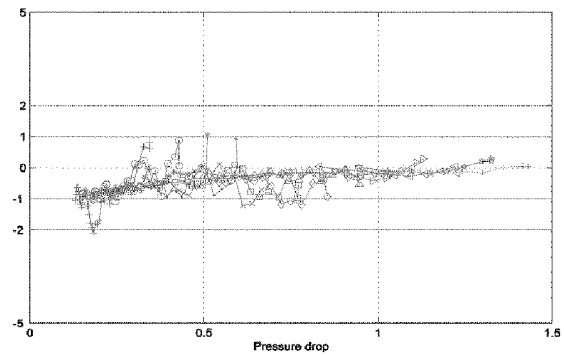
Figure 37C:
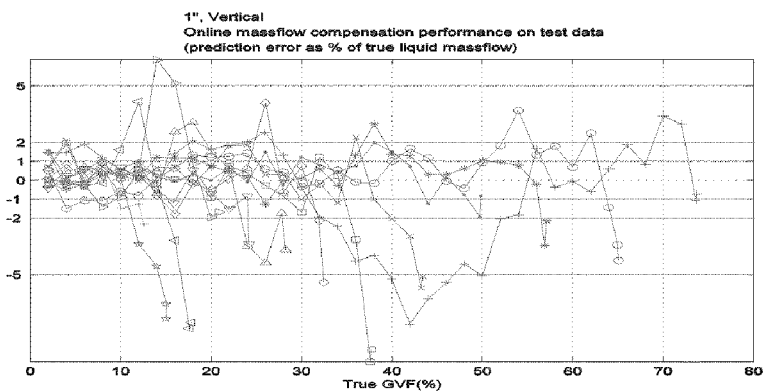
Figure 37D:
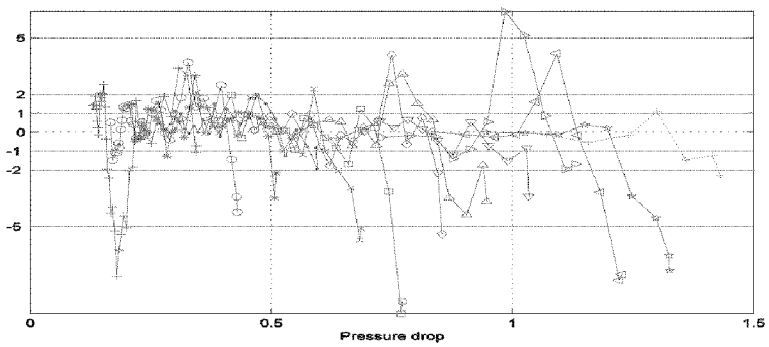

An output y 3510 of a unit may be given by applying an activation function $f$ 3502 to the weighted sums 3504 of the n unit inputs $x_i$ 3506, to thus define a unit function 3508, as shown in FIG. 35 and in Eq. 46:

$$y = f\left(\sum_{i=1}^{n} w_i x_i\right) \quad \text{Eq. 46}$$

In general terms, an MLP is a feed-forward neural network architecture with several layers of units. Being feed-forward means that the data flows monotonically from inputs to outputs, without inner loops; this ensures that the outputs function is deterministic. In order to ensure the universality property, the MLP used for two-phase flow measurement error compensation may be a two-layer architecture with sigmoidal activation functions for hidden units 3308 and linear activation function for the output unit 3410.

In this case, the sigmoidal activation function may be given by $$sig(a) = \frac{1}{1+e^{-a}},$$

while the linear activation function may be represented as lin(a)=a.

Then, an output of the MLP used as a function of the inputs can be written as in Eq. 47:

$$MeasError = \sum_{i=1}^{nh} w_i^{output} sig(w_1^{input} dd + w_2^{input} \dot{m}) \quad \text{Eq. 47}$$

$$= \sum_{i=1}^{nh} w_i^{output} \frac{1}{1+e^{-(w_1^{input} dd + w_2^{input} \dot{m})}}$$

That is, Eq. 47 represents a non-linear function in apparent drop in mixture density and massflow, with nh the number of hidden units 3408.

The network parameters $w^{input}$, $w^{output}$ and nh may be determined during a process called network training, essentially, an optimization of a cost function. As stated above, to ensure the universality property, nh has to be sufficiently large (it actually dictates the degree of freedom for the model, hence its complexity). However, its value should be chosen appropriately; a value too small may lead to a poor fit to the training data, while too large a value may lead to poor generalisation capabilities due to over-fitting the training data (the parallel in the field of conventional polynomial data fitting is the degree of the polynomial).

There are various methods for choosing the number of hidden units 3408. One technique is to perform an exhaustive search for nh (within some reasonable limits) and choose the value for which the best generalization is achieved.

The general outline of one implementation of a training process is described below. The data available for the training is divided into three independent sets: the training set (used to iteratively change the values of the MLP weights to minimize the cost function); the validation set (used to stop the training early to avoid over-fitting the training data); and the test set (used to choose the number of hidden units).

In one implementation, the network training starts with an initial set of network weights $w_0 = (w^{input_0}, w^{output_0})$ and successively changes them to minimize a pre-defined cost function, e.g., the mean square error. At each such change, the outputs of the MLP corresponding to the data in the training set may be evaluated, and the values of the weights are updated according to a specific "learning rule," as known in the field of neural network design, in order to minimize the cost function value over the training set.

The cost function also may be evaluated over the validation set, and the training stopped when this starts increasing, so that a suitable compromise between the fit of the training data and the generalization capabilities may be achieved. That is, over-fitting from training to convergence over the training set may be avoided. If enough data is available, a test set also may be used to assess the performance of several MLP trained, as described, but with different numbers of hidden units to choose the architecture that gives the minimum cost function over the test set.

In the case of massflow compensation, for a low GVF region, the compensation accuracy may be increased if this area is considered separate from the rest and modeled accordingly. Such approach(es) suggest the use of a "committee of models," also referred to as a "mixture of experts," with separate but overlapping areas of expertise to enable soft switching between the models.

An example of such a committee, one used to compensate the raw massflow errors for a 1" flowtube in vertical alignment, is:

Model 1: 0-1.5.kg/s, 0-15% GVF
Model 2: 0-1.5 kg/s, 10% GVF upwards
Model 3: 1.2 kg/s upwards, 0-15% GVF
Model 4: 1.2 kg/s upwards, 10% GVF upwards A different model, referred to as a "blanket model," also may be trained using the whole range of flows and GVFs. The blanket network may be used to provide a rough idea about the true liquid massflow. Using this estimation together with the estimated true GVF (based on the density compensation model), a specific expert model (or a combination of two expert models if the data falls in the overlap region) may be selected, and its compensation applied.

FIGS. 36A, 36B, and 37A-D illustrate results from two-phase flow data collected for a 1" Coriolis flowmeter, in both horizontal and vertical alignment, with water and air. Fifty-five flowlines were used, with nominal flow ranging from 0.35 kg/s to 3.0 kg/s in steps of 0.025 kg/s, with typical GVF steps of 0.5% and 1% GVF (depending on the nominal flow value), giving a total of 3400 experimental points, for an average of 45 points per flowline. The corresponding surfaces for raw density and massflow errors are given in FIGS. 36A and 36B, respectively.

Based on this data, compensation solutions for density and liquid massflow errors as described above may be derived and validated online, using independent test data, as shown in FIGS. 37A-37D. The model inputs for the compensation technique are the raw normalised liquid superficial velocity $$v_{ln}^a = \frac{v_l^a}{v_{lmax}} = \frac{\frac{MF_{apparent}^{liquid}}{A_\tau \rho_{liquid}}}{v_{lmax}}$$

(with notation in which $A_\tau$ represents a cross-sectional area of the flowtube and $v_{lmax}$ the maximum superficial velocity of the liquid, and $MF_{apparent}^{liquid}$ a mass flow rate of the liquid) and the apparent drop in mixture density.

The test data in this example included thirteen flowlines, with nominal flows ranging from 0.6 kg/s to 3 kg/s, in steps of 0.25 kg/s, with GVF steps of 2%, giving a total of 266 experimental points, an average of 20 points per flowline.

FIGS. 38-68 are graphs illustrating test and/or modeling results of various implementations described above with respect to FIGS. 1-37, or related implementations. More specifically, FIGS. 38-68, unless stated otherwise below, are graphs reflecting results from three-phase trials in which the fluids used were crude oil with a 35° API gravity, simulated brine (i.e., salt-water mixture) with 2% by weight NaCl, and nitrogen. The tests were conducted at a pressure of approximately 150 psig and temperature of 100° F.

In the following description and figures, reference is made to the following test conditions:
Test00wc—4000 bpd
Test00wc—6000 bpd
Test06wc—3000 bpd
Test06wc—4000 bpd
Test06wc—6000 bpd
Test06wc—8000 bpd
Test13wc—3000 bpd
Test13wc—6000 bpd
Test25wc—3000 bpd
Test25wc—7000 bpd
Test35wc—3000 bpd
Test35wc—7000 bpd
Test50wc—3000 bpd
Test50wc—5000 bpd
Test50wc—7000 bpd
Test50wc—8000 bpd In this context, FIGS. 38A and 38B illustrate gas-induced error resulting from the raw density and mass flow measurements, respectively, of the Coriolis meter.

Figure 39:
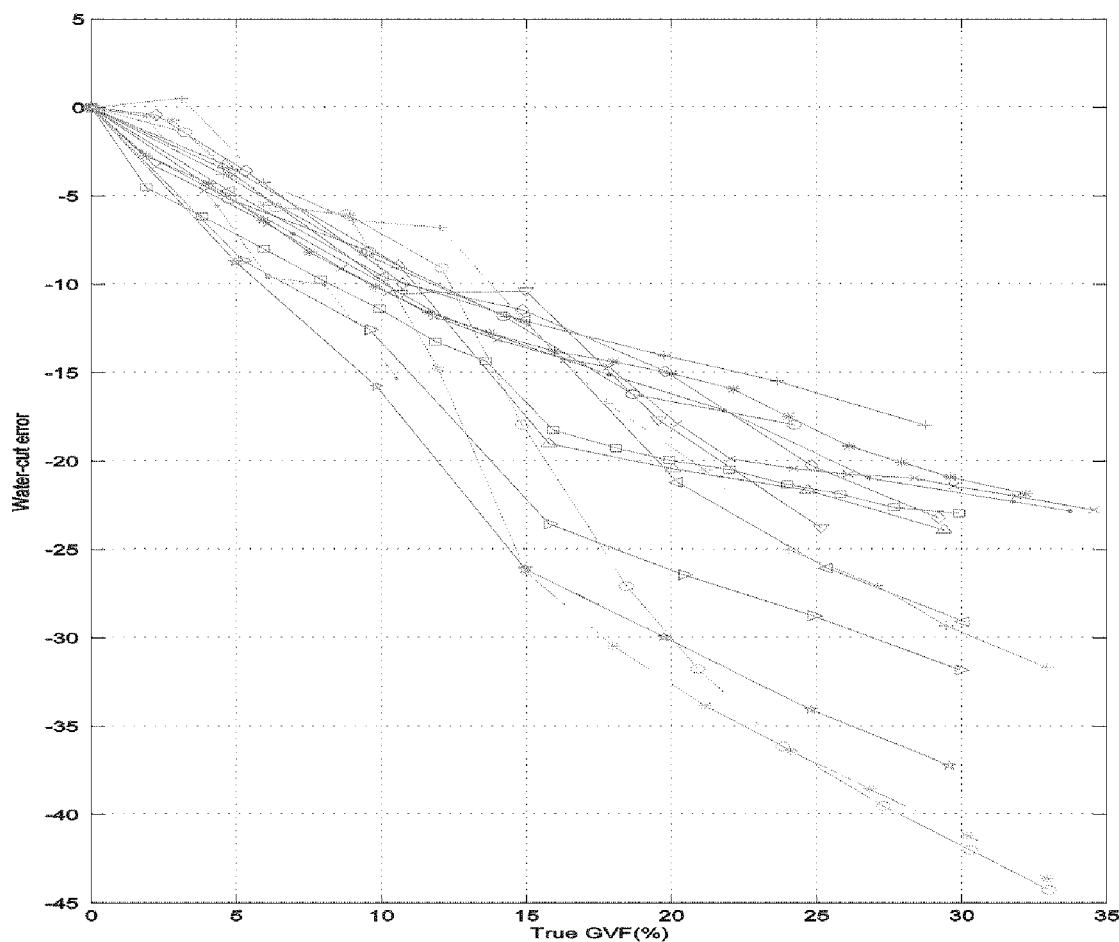

FIG. 39 illustrates the observed response of the water cut probe used in these trials. For this particular device, the presence of free gas reduces the observed water cut compared to the true value (for the gas-free oil-water mixture), decreasing monotonically as gas void increases. The response also may be a function of the total mass rate and the intrinsic water cut of the liquid phase, among other factors. For a given gas void fraction (GVF) level, the observed water cut generally decreases as total mass rate and intrinsic water cut increases. The water cut response surface also may be affected by parameters such as, for example, fluid properties and flow regime.

Figure 38A:
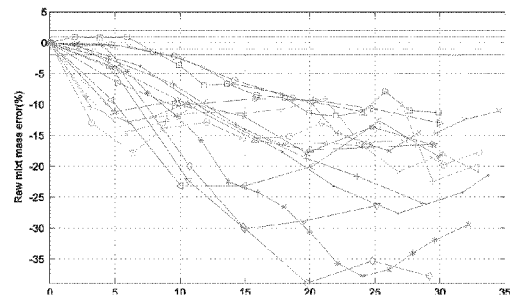
Figure 38B:
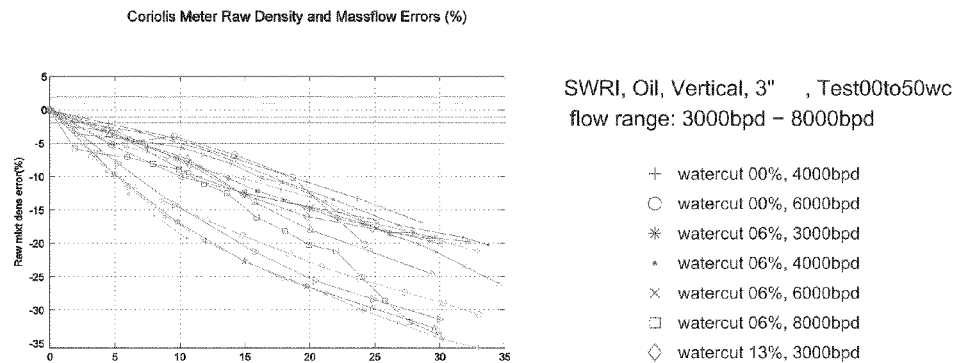
Figure 40A:
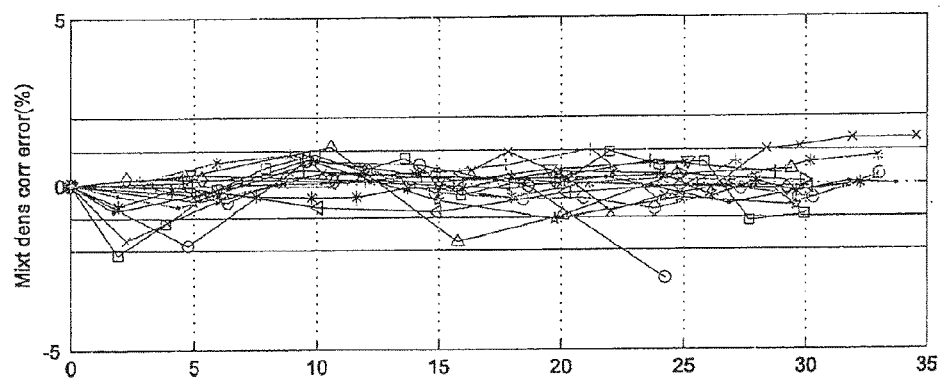
Figure 40B:
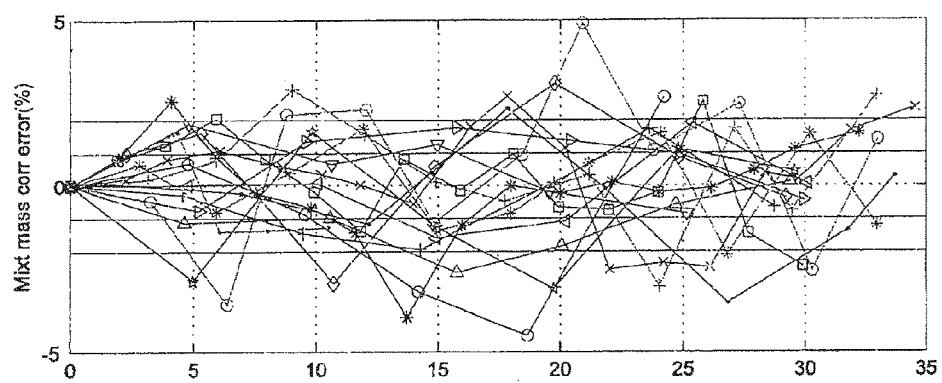
Figure 40C:
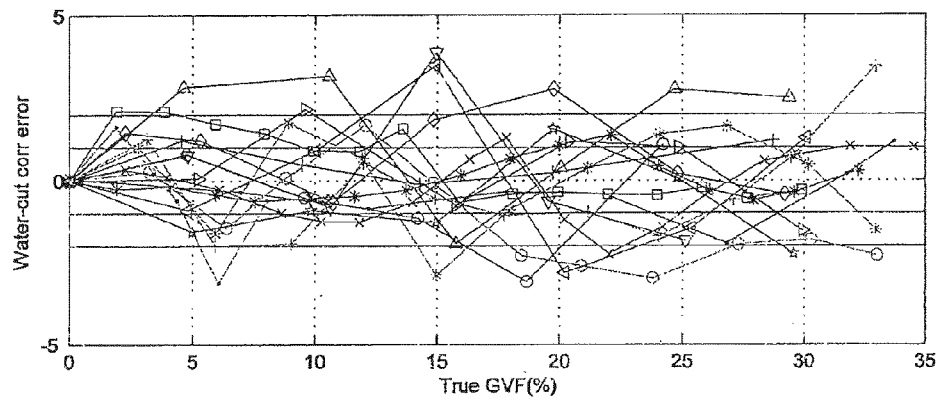

FIGS. 40A-40C illustrate residual errors for a bulk mixture mass flow and density, and water cut measurements, after a neural-net based modeling has been completed, based on the data sets shown in FIGS. 38A, 38B, and 39, with water cuts ranging from 0 to 50%. The bulk mass flow errors are mostly kept within 2% of reading, the bulk density errors are mostly within 1% of reading, and the water cut errors are mostly within 2% of the 0-100% fullscale range.

Figure 41A:
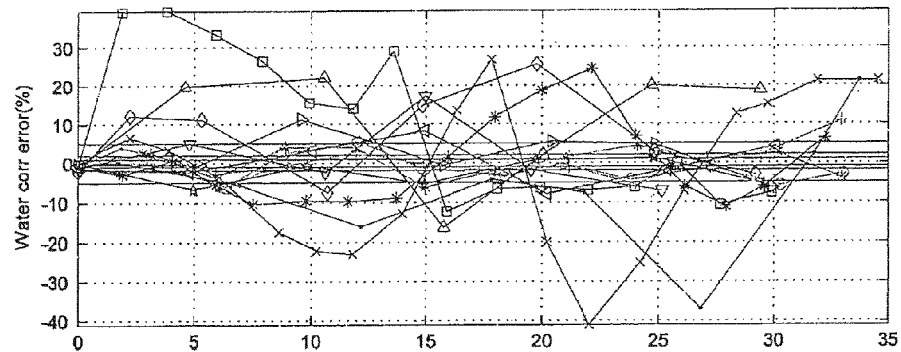
Figure 41B:
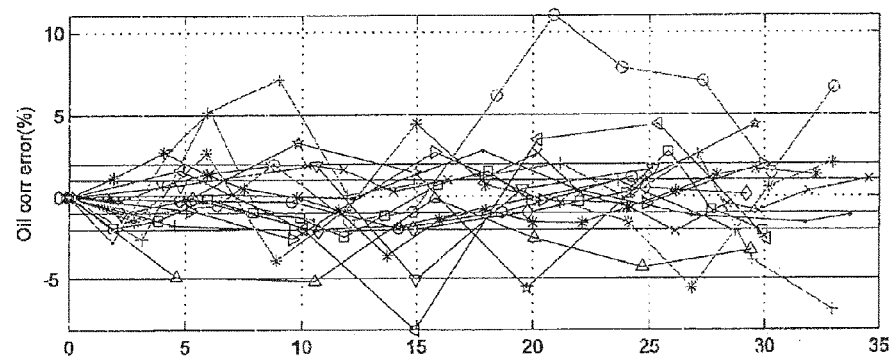
Figure 41C:
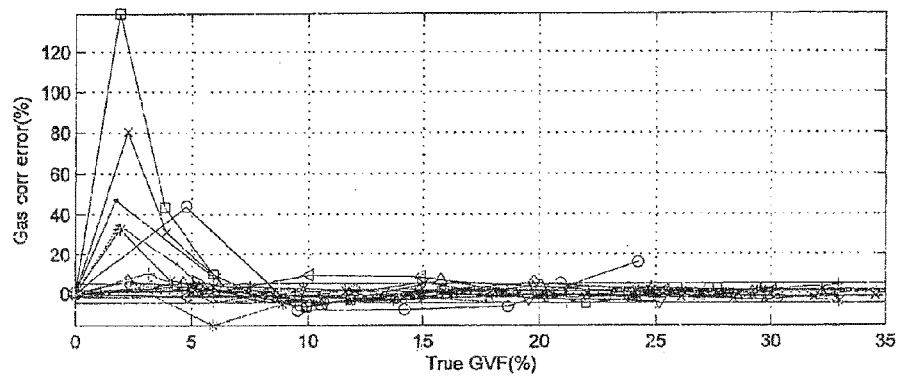

FIG. 41 illustrates how these results are mapped into the corresponding volumetric flow errors for the oil, water, and gas streams. Note that for both the gas and water volumes, low absolute volumetric flow (for water at low water cuts, and gas at low GVFs) may lead to large percentage errors as a proportion of the reading. As the oil flow rate may be significant in these trials, the errors in percentage terms remain mostly within 5%

FIGS. 42-47 are graphs demonstrating techniques for extending mass flow calculations to generate volumetric oil, water and gas readings. FIGS. 42-47 also demonstrate how errors in water cut reading may impact on the oil, water and gas volumetric measurements.

In FIGS. 42-47, massflow and density error corrections are based on the above-described oil data, with 6% water-cut and a reference water cut value of 5.5%. Since the graphs themselves also are based on this data set, the mass flow and density error predictions are relatively small, which is not necessarily pertinent to the demonstration of how water cut accuracy affects volumetric measurements.

The Coriolis principle and relate techniques, as described above, provide estimates for an overall mass flow and density of the three-phase, mixed fluid. Knowledge of the true fluid densities and (perhaps estimated or corrected) water cut, together with models of two-phase flow errors, gives estimates of the fluid-only mass flow rate, and the gas void fraction (GVF). Thus, in FIGS. 42-47, final calculations are illustrated, in which, given the fluid-only mass flow rate and the water cut, the volumetric flowrates of the oil and gas components are obtained, while the GVF yields the gas volumetric flowrate.

Figure 42:
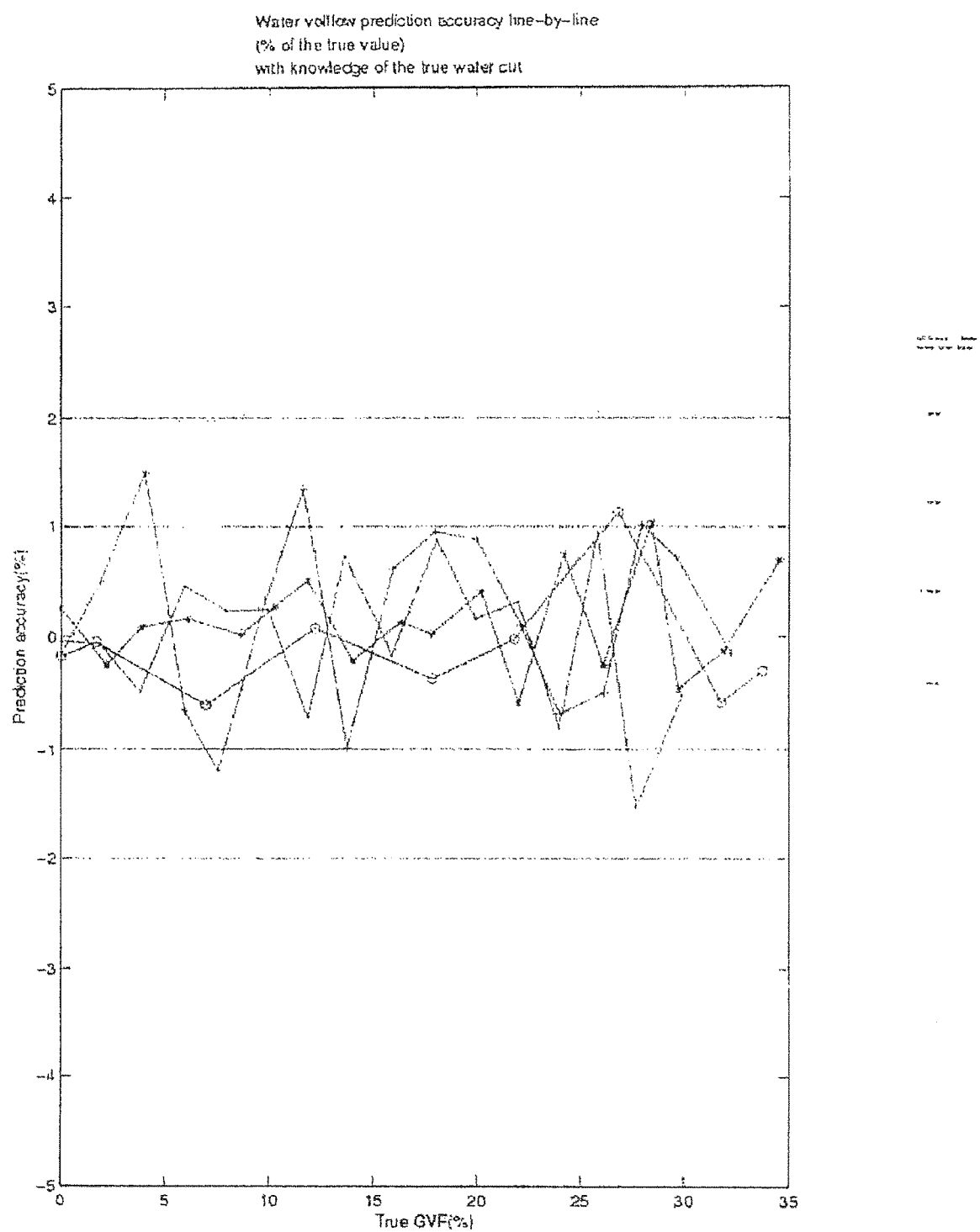
Figure 43:
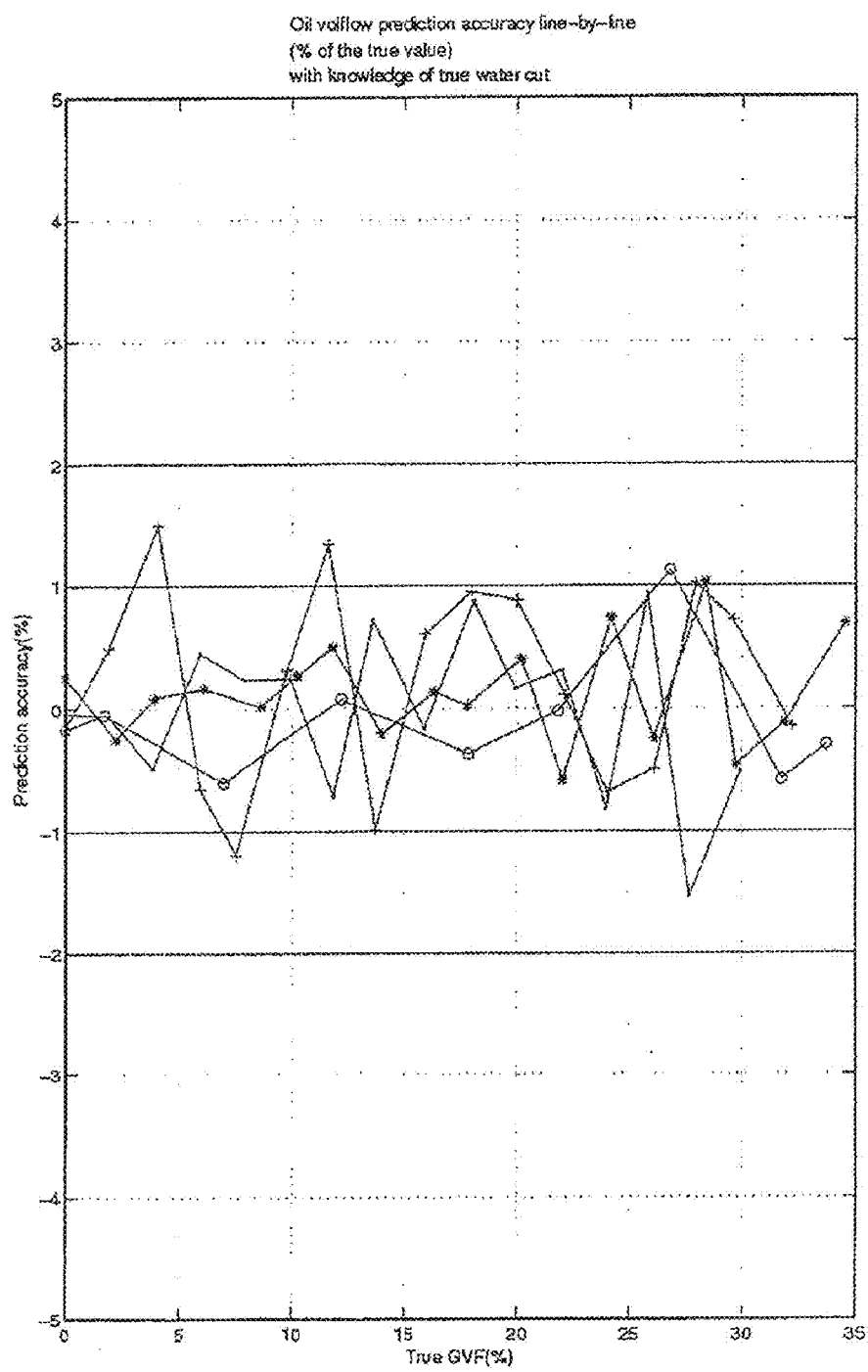
Figure 44:
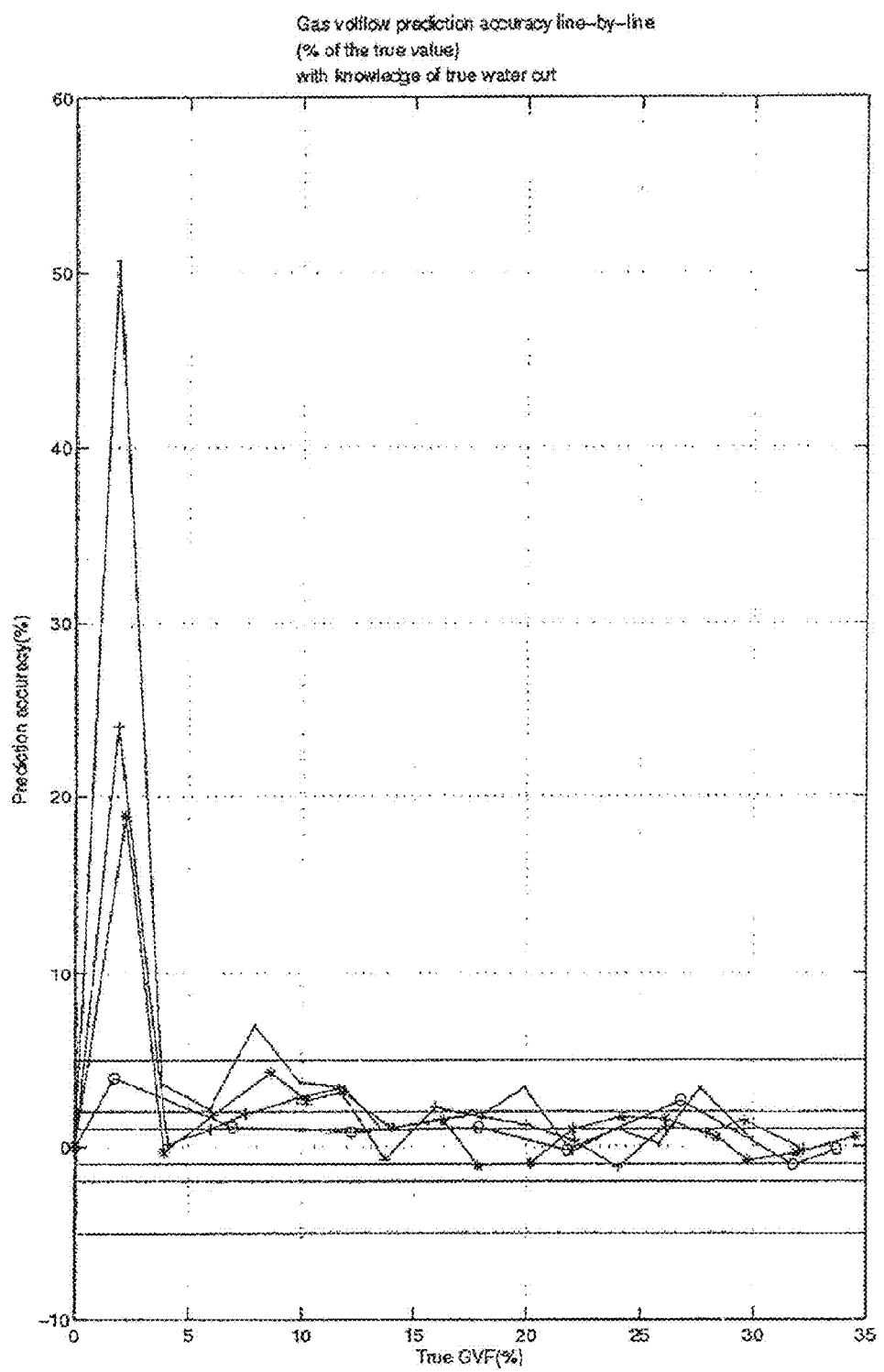

Accordingly, FIGS. 42-44 illustrate the calculations of volumetric water, oil, and gas flow rates, respectively, assuming the water cut is known perfectly. Under this assumption, both oil and water volumetric errors are consistently small, being primarily dependent upon the residual modeling errors for the density and mass flow corrections, which, under the conditions, are small.

The gas volumetric flow may be sensitive to errors in the density calculation at low GVFs. For example, with 2% GVF, a 1% absolute error in the estimate of GVF may lead to 50% error in the estimated volumetric gas flow. Such large relative errors may generally be associated with relatively low gas flows, and, therefore, may be unlikely to be significant in oil and gas applications, such as the examples described herein.

Figure 45:
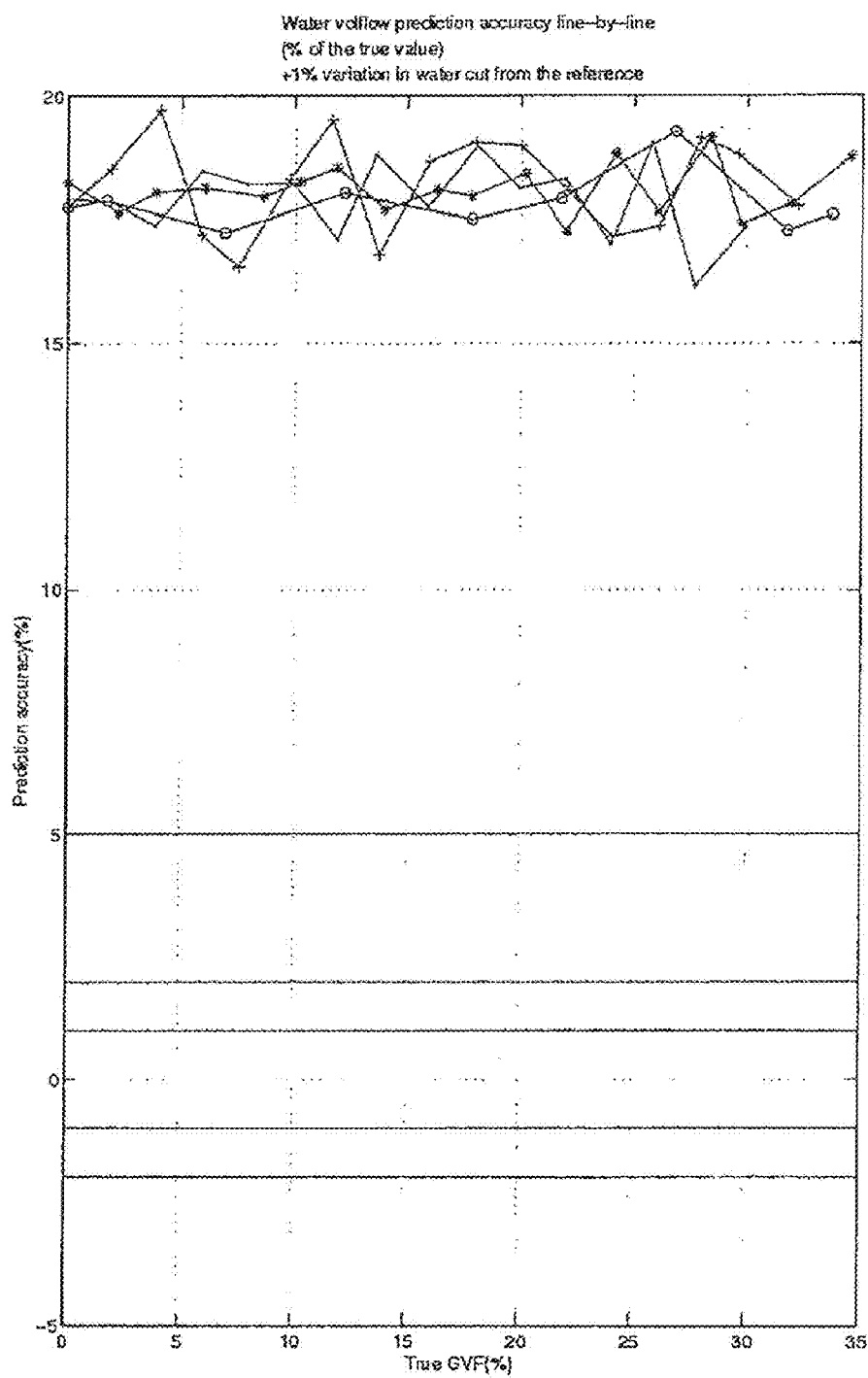
Figure 46:
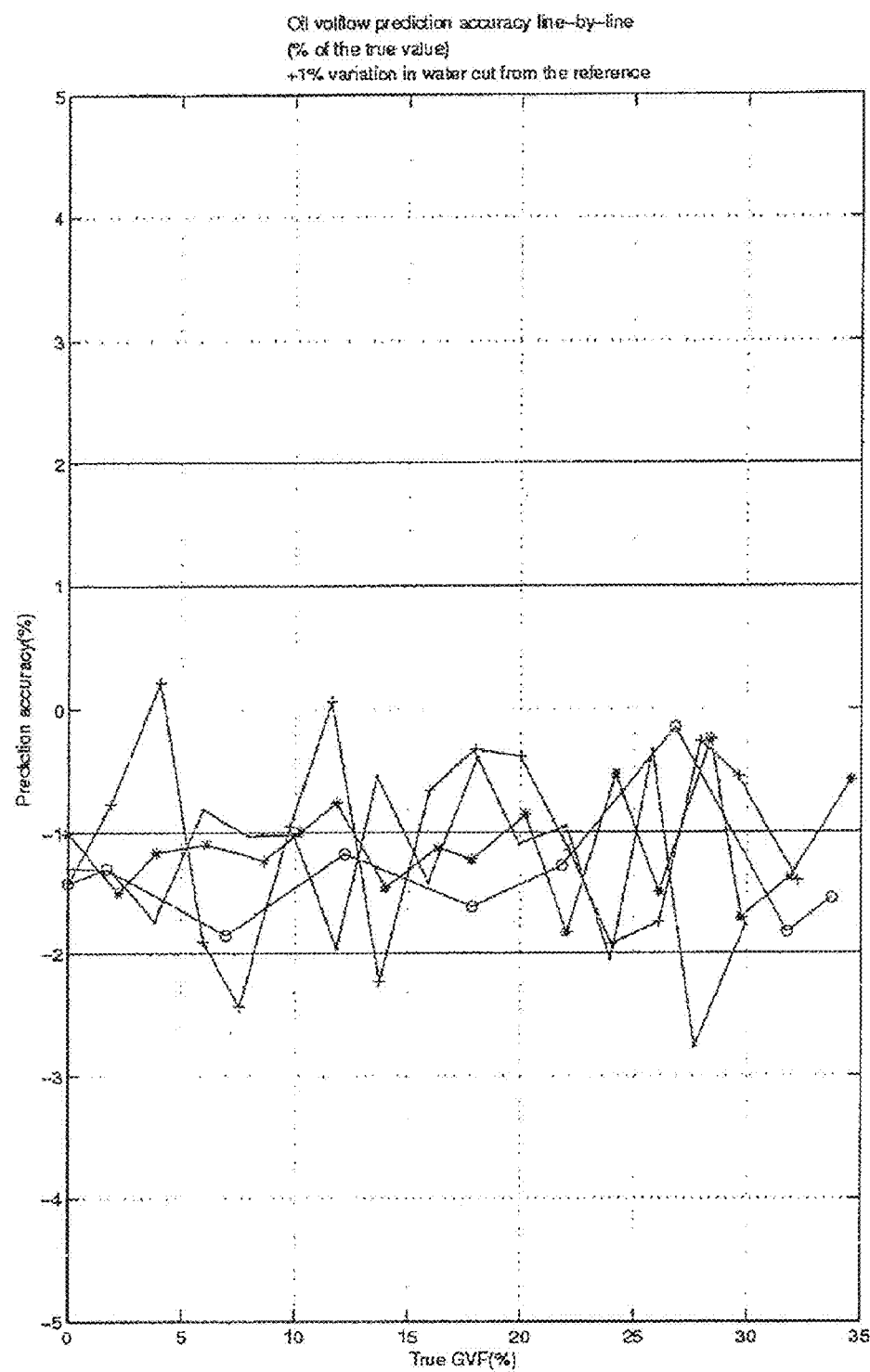
Figure 47:
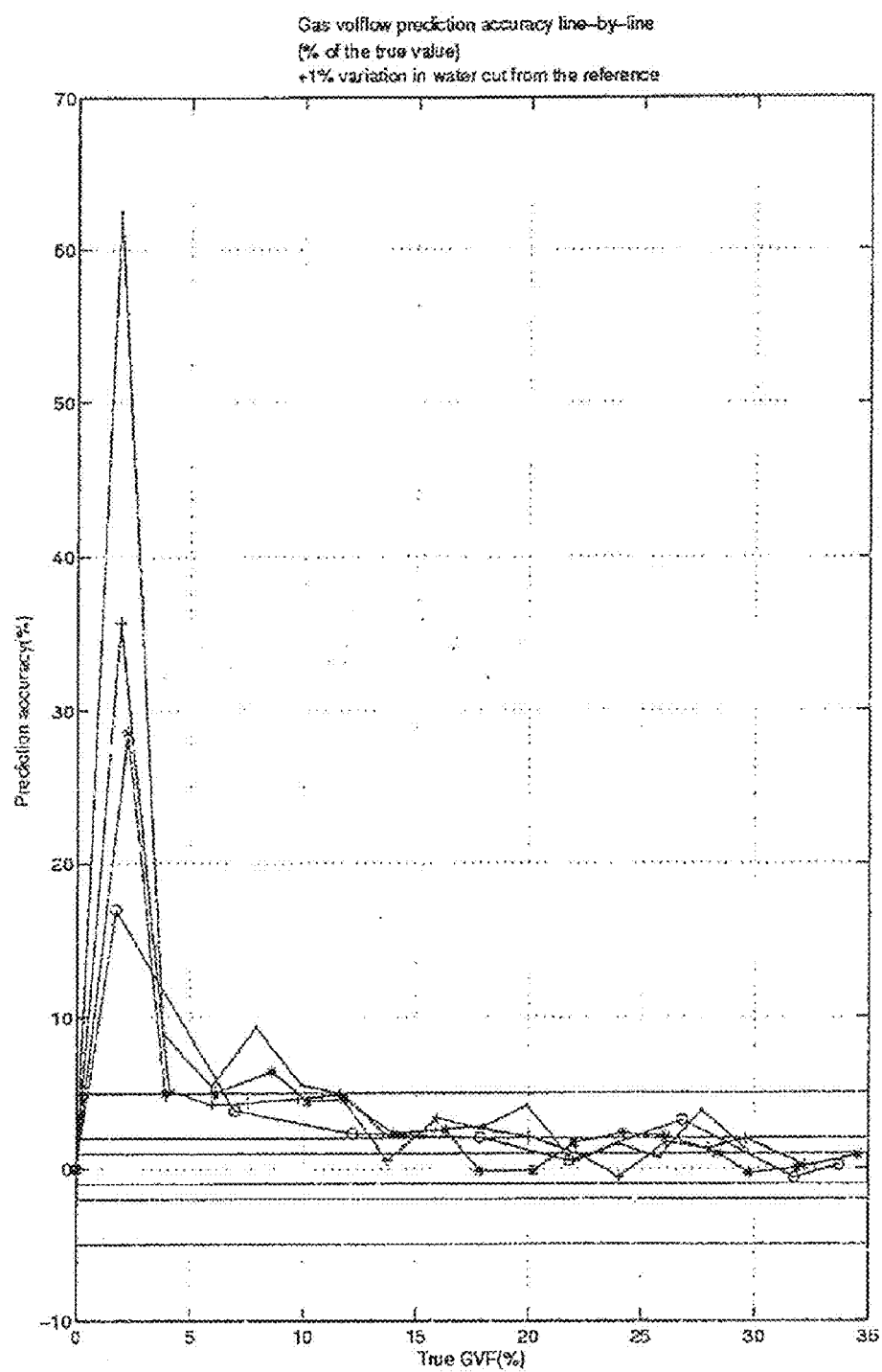

FIGS. 45-47 illustrate the same calculations when the water cut estimate is in error by +1% absolute. This is a reasonable margin of error, allowing for basic measurement accuracy, followed by corrections for the effects of two or three-phase flow.

More specifically, FIG. 45 illustrates the water volumetric error with a +1% water cut absolute error. The large mean error is about 16%. With a true water cut of only 6% of the total liquid volume, an error of 1% absolute in the water cut estimate may result in approximately 16% over-estimate of the water volumetric flowrate.

FIG. 46 illustrates that corresponding errors for oil volumetric flow are much smaller, reflecting the smaller impact the 1% water cut error has on the 94% oil cut measurement.

Finally, FIG. 47 illustrates the impact of the water cut error on the gas volume measurement.

Thus, gas flow errors may be seen to be sensitive to water cut errors at low GVF, where this influence may decrease with higher GVFs.

Figure 48:
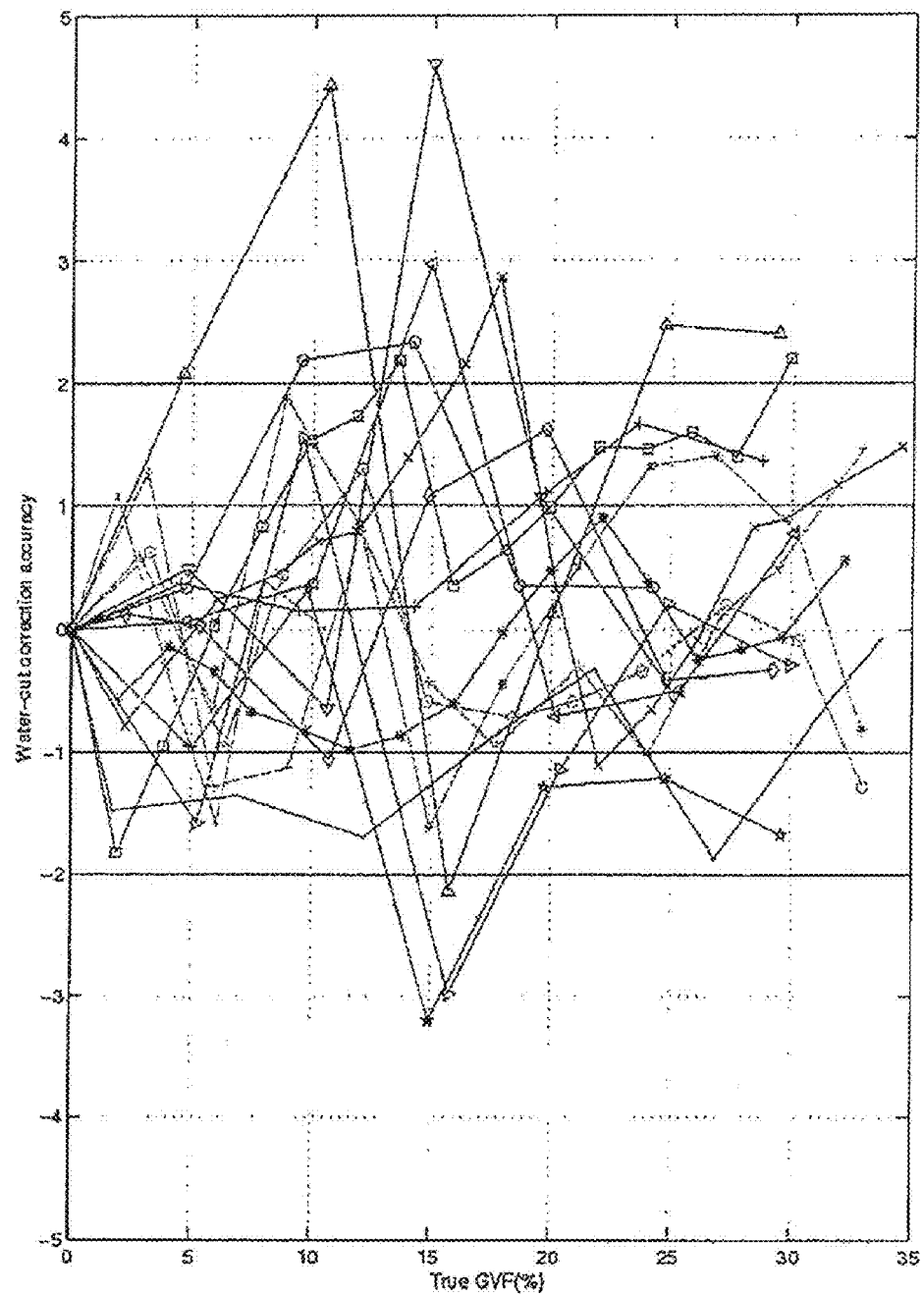
Figure 49:
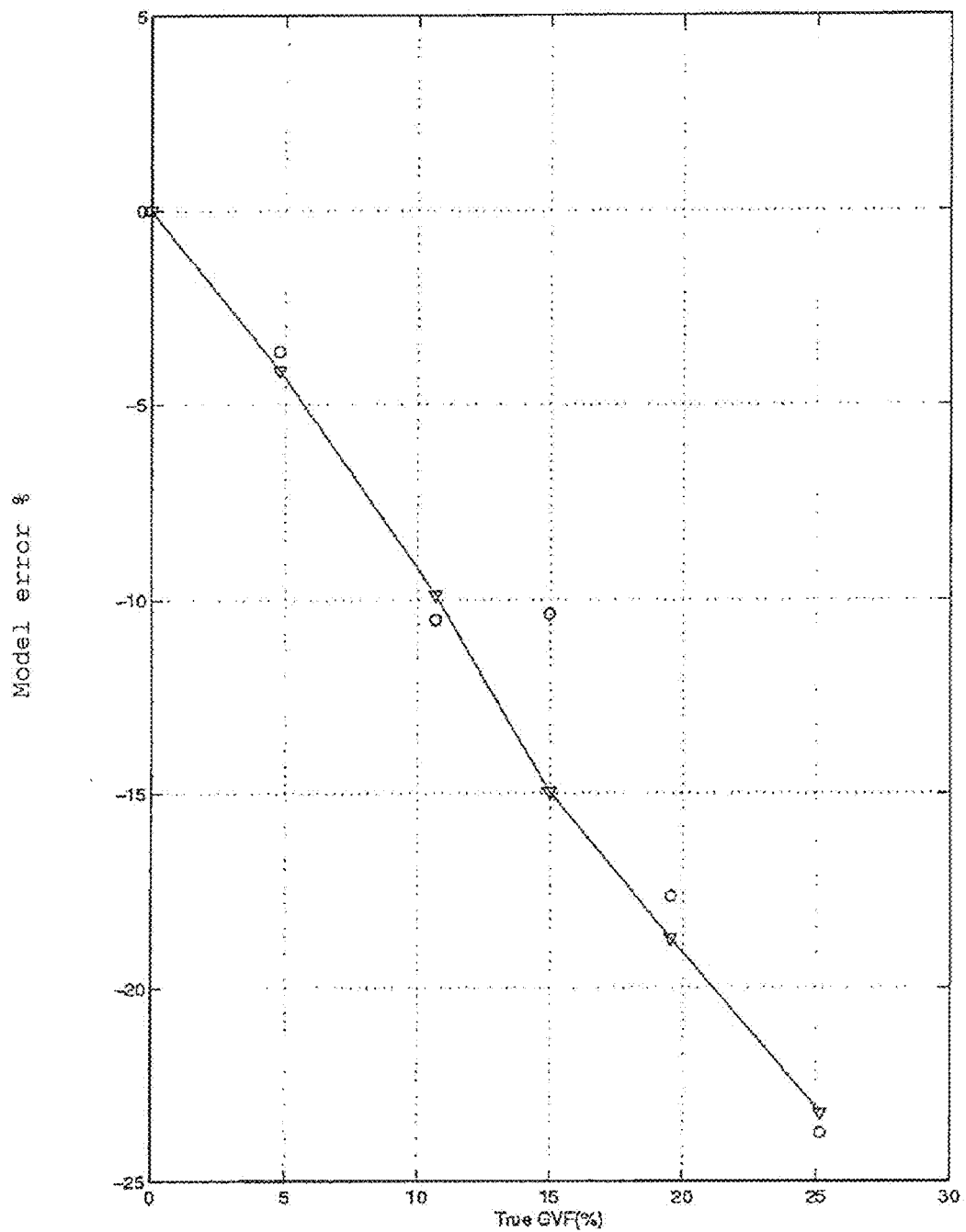

FIGS. 49-50 are graphs illustrating a correction of reading from a water-cut meter (i.e., the Phase Dynamics water cut meter) for gas-induced errors. The data for FIGS. 48-50 is based on the oil data described above, with nominal water-cut values of 0.0, 5.5, 13.1, 24.8, 35.6 and 50.0%. Although an actual water cut output is cutoff is generally zero, raw frequency data and characteristic equations associated with operations of the water cut meter allow for extended water cut readings which fall below zero %, as shown.

In this context, the water-cut meter has an error even at 0% GVF, due to the presence of residual amounts of gas 'carry-under' from the process, as follows (in absolute water-cut units) with respect to the specified test results referred to above:

Test00wc—4000 bpd: −0.52
Test00wc—6000 bpd: −1.91
Test06wc—3000 bpd: −0.89
Test06wc—4000 bpd: −0.74
Test06wc—6000 bpd: −1.53
Test06wc—8000 bpd: −2.78
Test13wc—3000 bpd: 1.17
Test13wc—6000 bpd: 0.87
Test25wc—3000 bpd: 0.91
Test25wc—7000 bpd: −0.56
Test35wc—3000 bpd: 0.74
Test35wc—7000 bpd: −0.35
Test50wc—3000 bpd: 3.89
Test50wc—5000 bpd: 2.64
Test50wc—7000 bpd: 2.90
Test50wc—8000 bpd: 2.31

For the purpose of correcting the gas-induced errors, the water-cut meter was considered without error at 0% GVF (as in FIG. 1).

In FIGS. 48 and 49, a neural net, along the lines described above, was built with inputs of: raw water cut reading, true mass flow reading, and true void fraction. The outputs include water cut error (in absolute units of water cut—in this case percentage). Accordingly, successive calculations between this neural network and mass flow/density corrections, as described above, lead to a converged overall solution.

With the data as described, the water-cut meter reading may be corrected from errors as large as −40% to mainly within 2 percent absolute error, as shown in FIG. 48, which, as referenced above with respect to FIGS. 42-47, may impact the water and oil corrections for the Coriolis meter.

FIG. 48 appears to illustrate that the neural network model fails to correct properly for some lines, but a detailed study of the lines in question shows that the model is a smooth, least-square approximation of the experimental behavior, while the actual water-cut error data is more non-linear (for examples, see FIG. 49). As with the density and mass flow errors, higher data density (i.e. more experimental points) may provide improvement in the quality of the fit, and also may allow for a good assessment of the level of experimental noise.

FIG. 50-54 are graphs illustrating successive correction of liquids and gas massflow and using the water-cut correction, as generally described above with respect to FIG. 27. In FIGS. 50-54, data is based on the oil data as described above, with nominal water-cut value of 5.5%, while massflow and density corrections used at this stage are based on oil data with 6% water-cut. The water cut correction model (i.e., neural network model) used here is the one described above with respect to FIGS. 48 and 49.

Raw water-cut errors are described and shown above with respect to FIG. 39, which shows the raw water-cut error, as described above, however, for the rest of the flow analysis, the water-cut reading is limited within 0 and 100%, with values outside the range being forced to take the limit value.

Figure 50A:
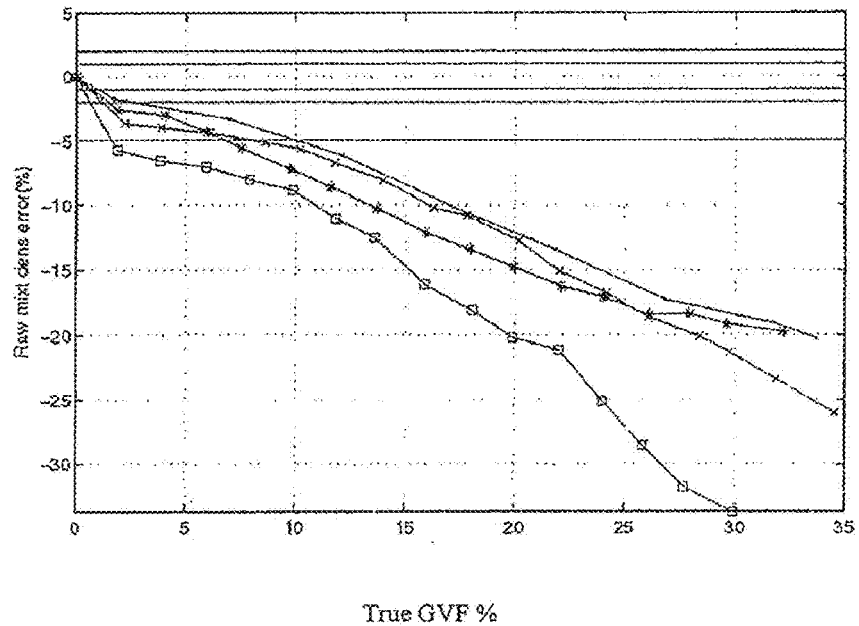
Figure 50B:
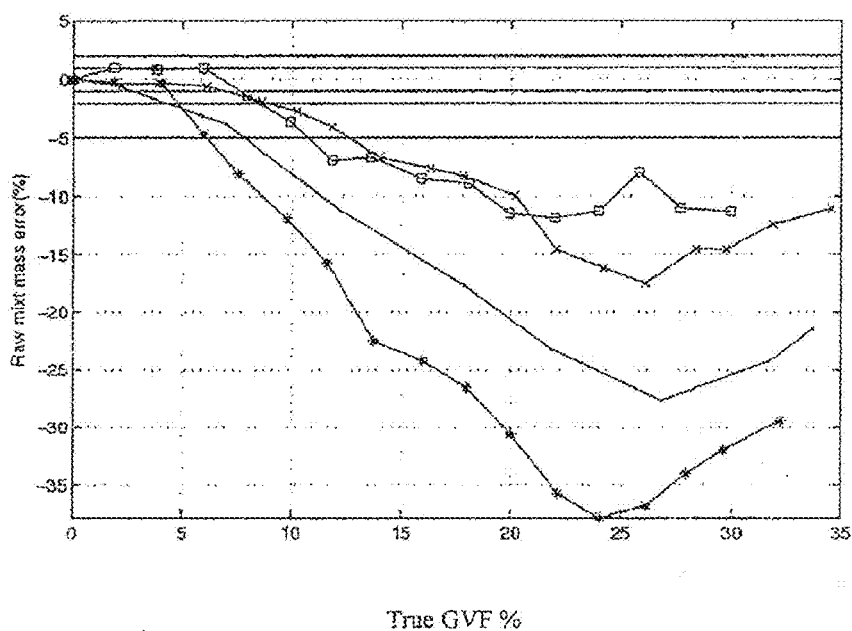
Figure 51A:
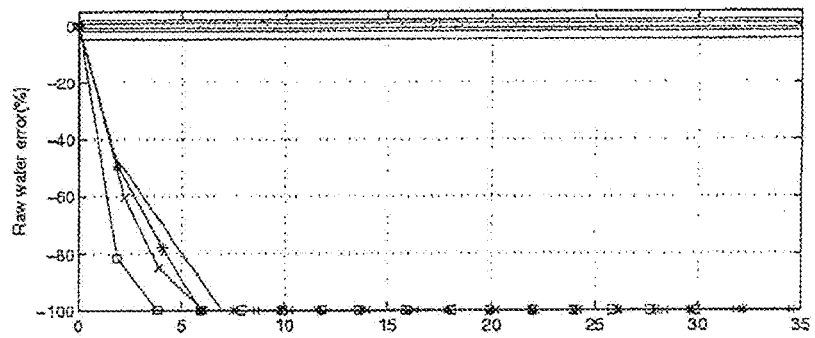
Figure 51B:
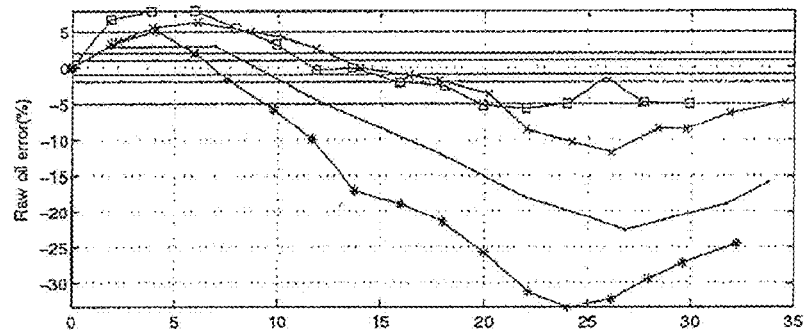
Figure 51C:
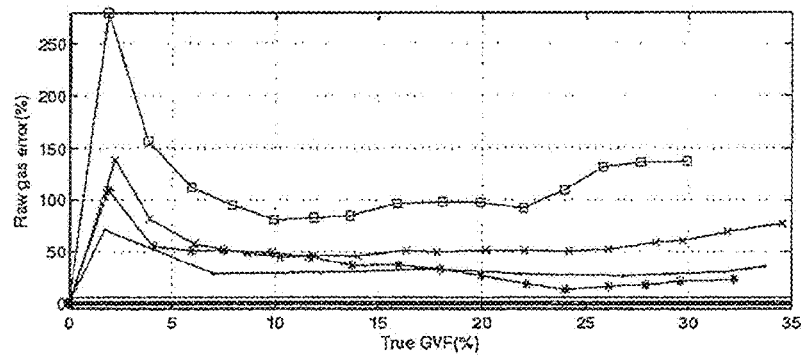
Figure 52:
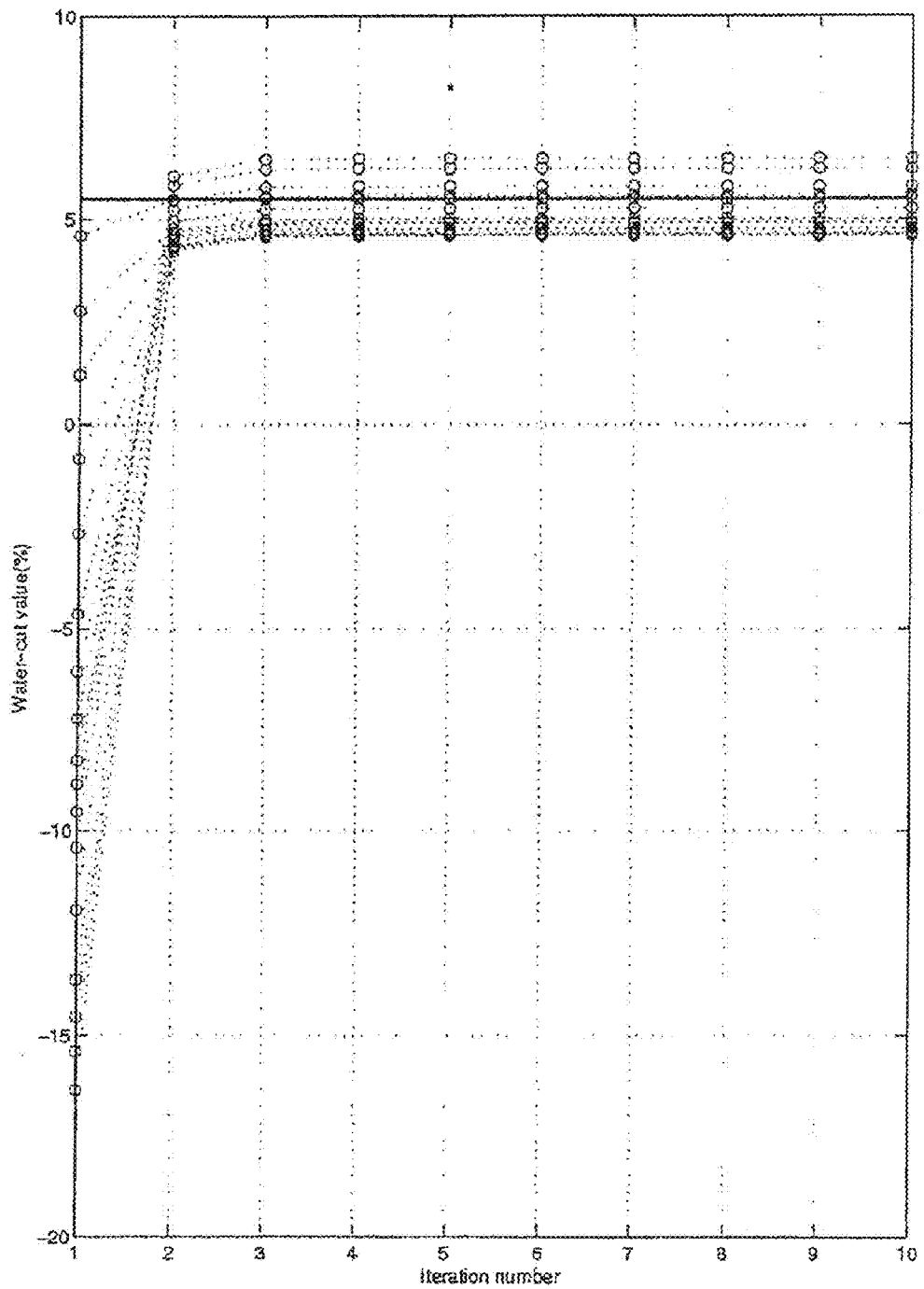

FIGS. 50A and 50B illustrate raw mixture density and massflow errors, respectively. FIGS. 51A-51C illustrate raw errors for the water, oil, and gas massflows, respectively. FIG. 52 illustrates convergence after two repetitions of FIG. 27, with the water-cut measurement corrected within 3%, the mixture density mainly within 1% and massflow mainly within 2%.

Figure 53A:
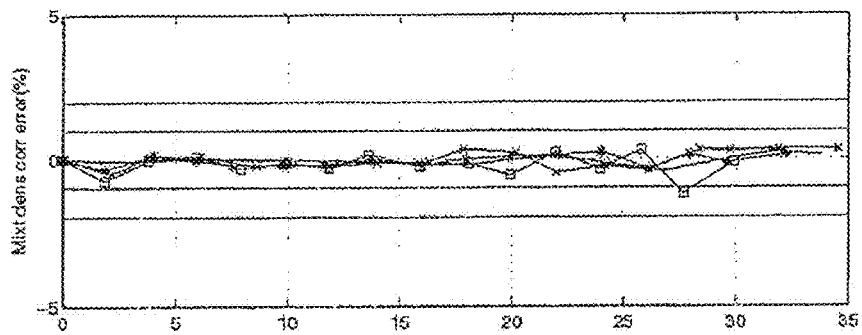
Figure 53B:
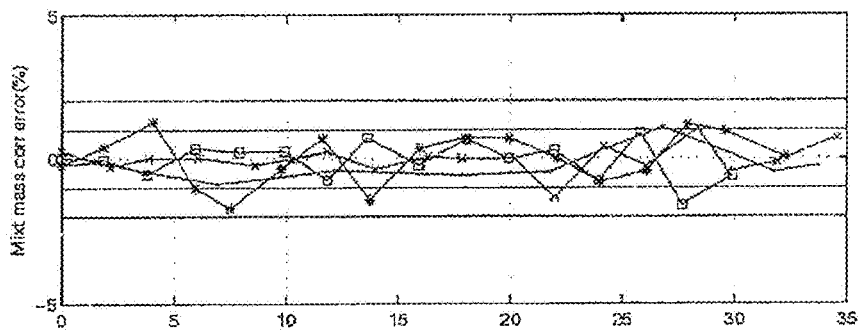
Figure 53C:
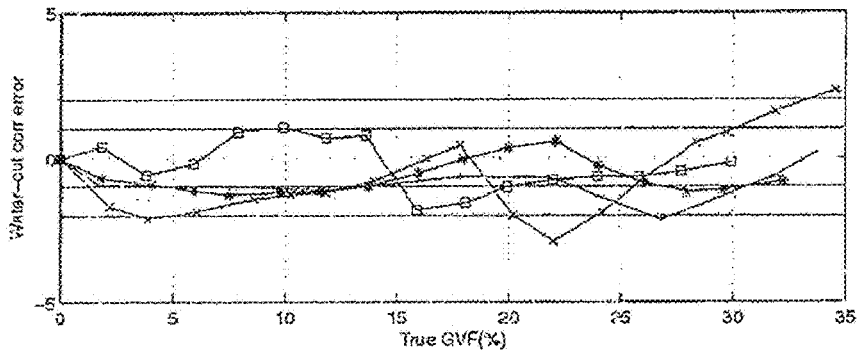
Figure 54A:
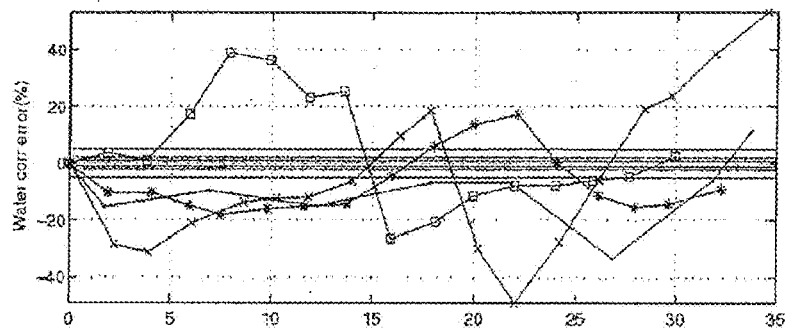
Figure 54B:
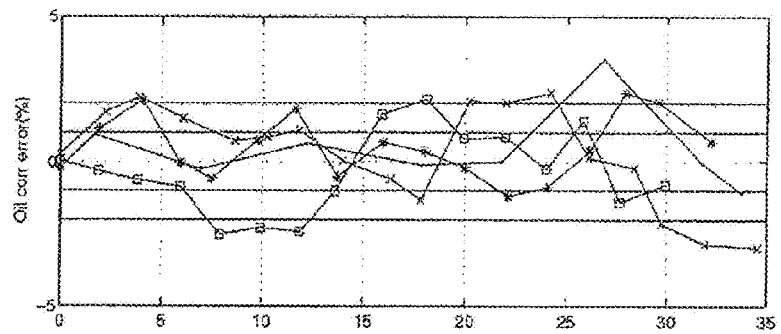
Figure 54C:
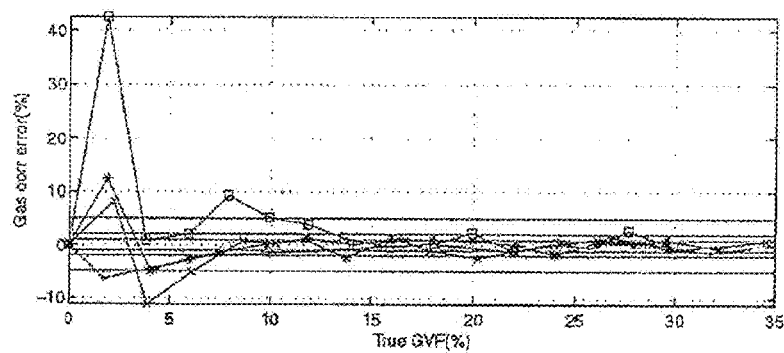

FIGS. 53A-53C illustrate the corrected water-cut behavior during the process. Water, oil, and gas correction accuracies are illustrated in FIGS. 54A-54C, respectively. Here, the oil massflow is corrected to within 3%. In FIGS. 54A-54C, the water massflow is most affected, with 2-3% error in water-cut yielding +/−40% error in water massflow. The gas error is high at low GVF, dropping to within 3% for GVFs over 15%. As with the density and mass flow errors, higher data density (i.e. more experimental points) may generally allow improvement in the quality of the fit, and also may allow for a better assessment of the level of experimental noise.

FIGS. 55-63 are graphs illustrating a "3-dimensional" correction for liquid massflow and density, which takes into account variations in the error due to variations in the water-cut measurement(s). This technique may be used to obtain acceptable errors over a wider range of water cuts (as opposed to the above examples, in which flow data reported on is generally limited to about 6% water cut).

Thus, in order to consider such variations in mass flow and density errors that are caused by variations in water cut measurement(s), FIGS. 55-63 illustrate the use of a true water-cut reading as an extra input parameter, alongside apparent drop in mixture density and apparent massflow.

Figure 55A:
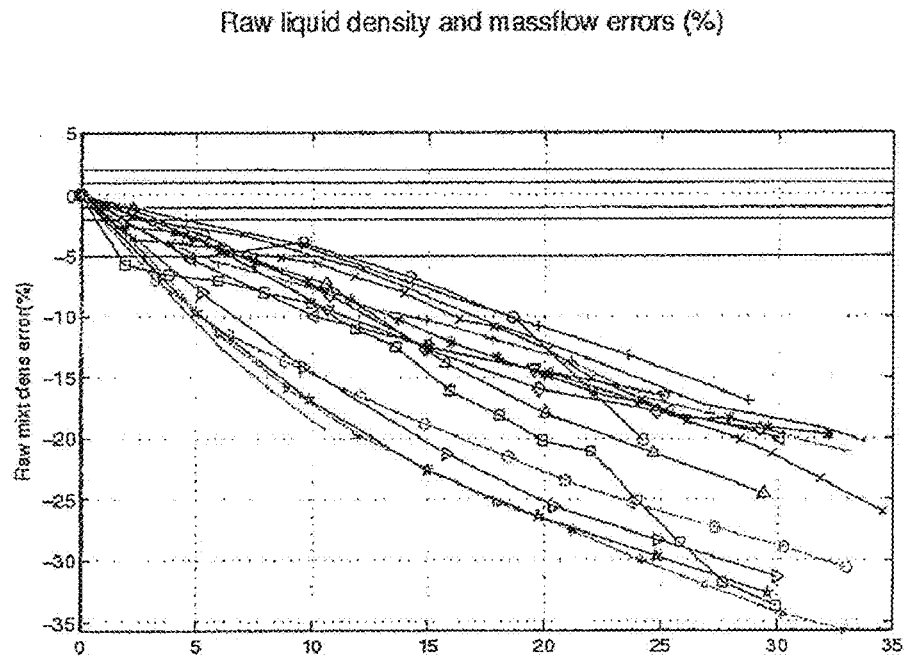
Figure 55B:
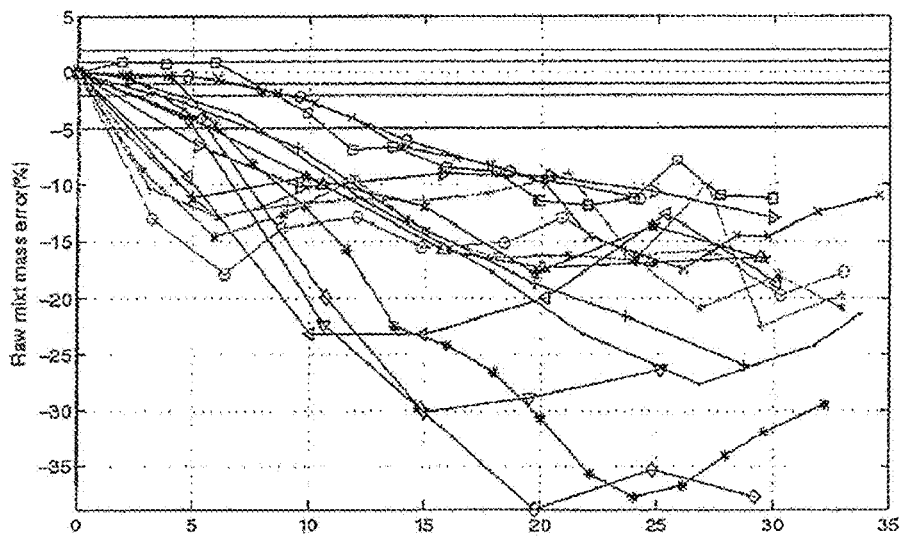
Figure 56:
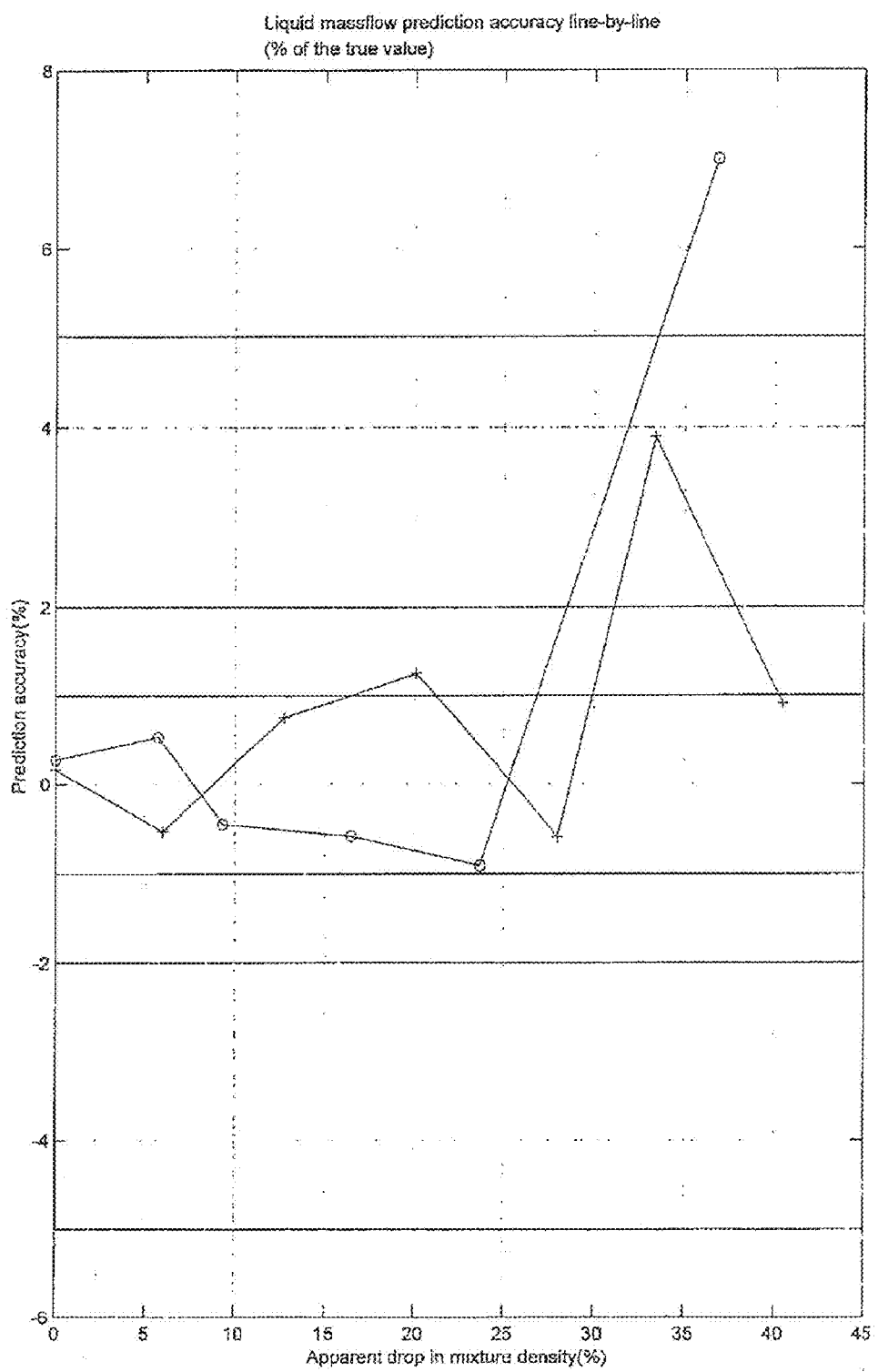
Figure 57:
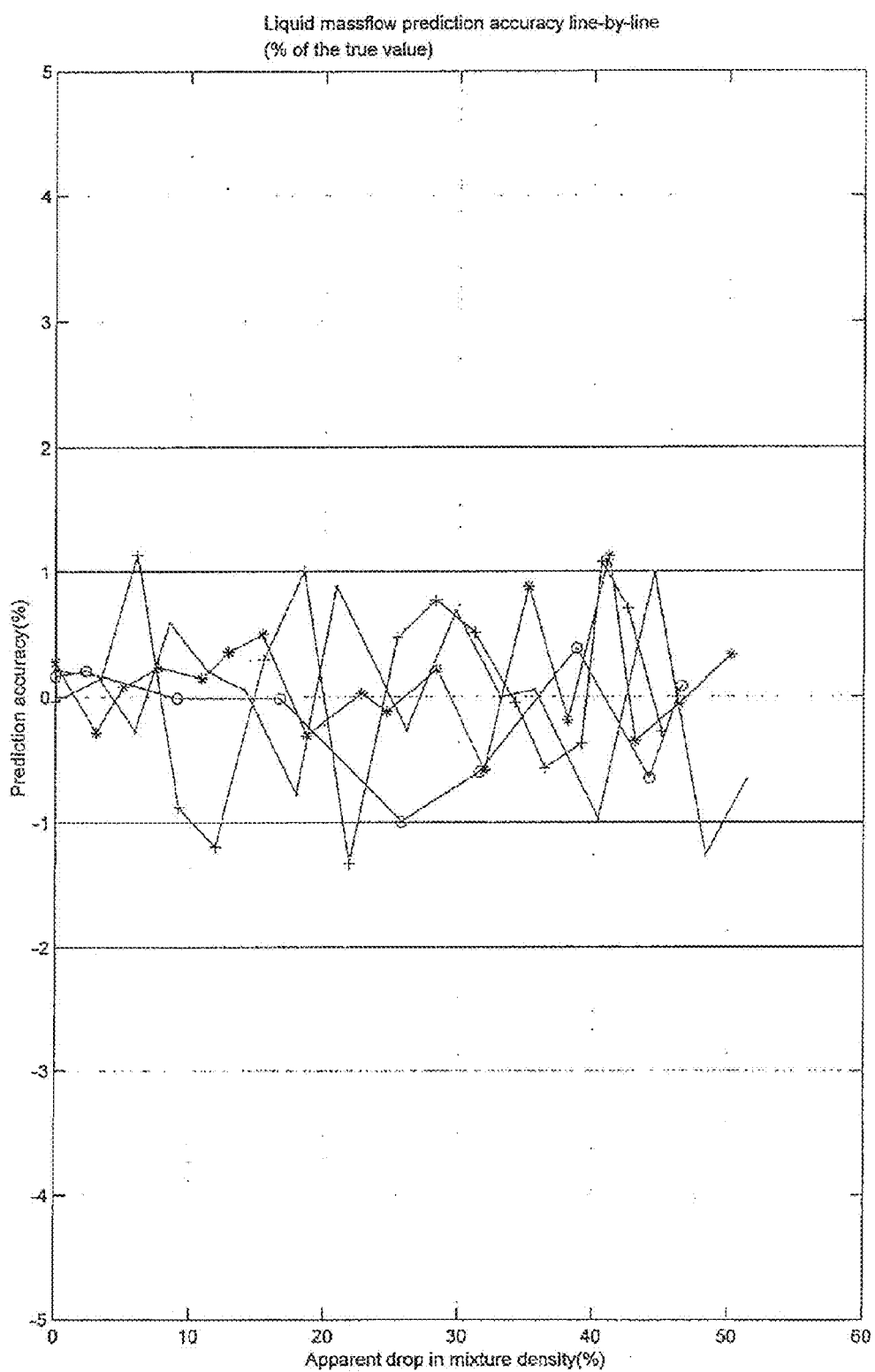
Figure 58:
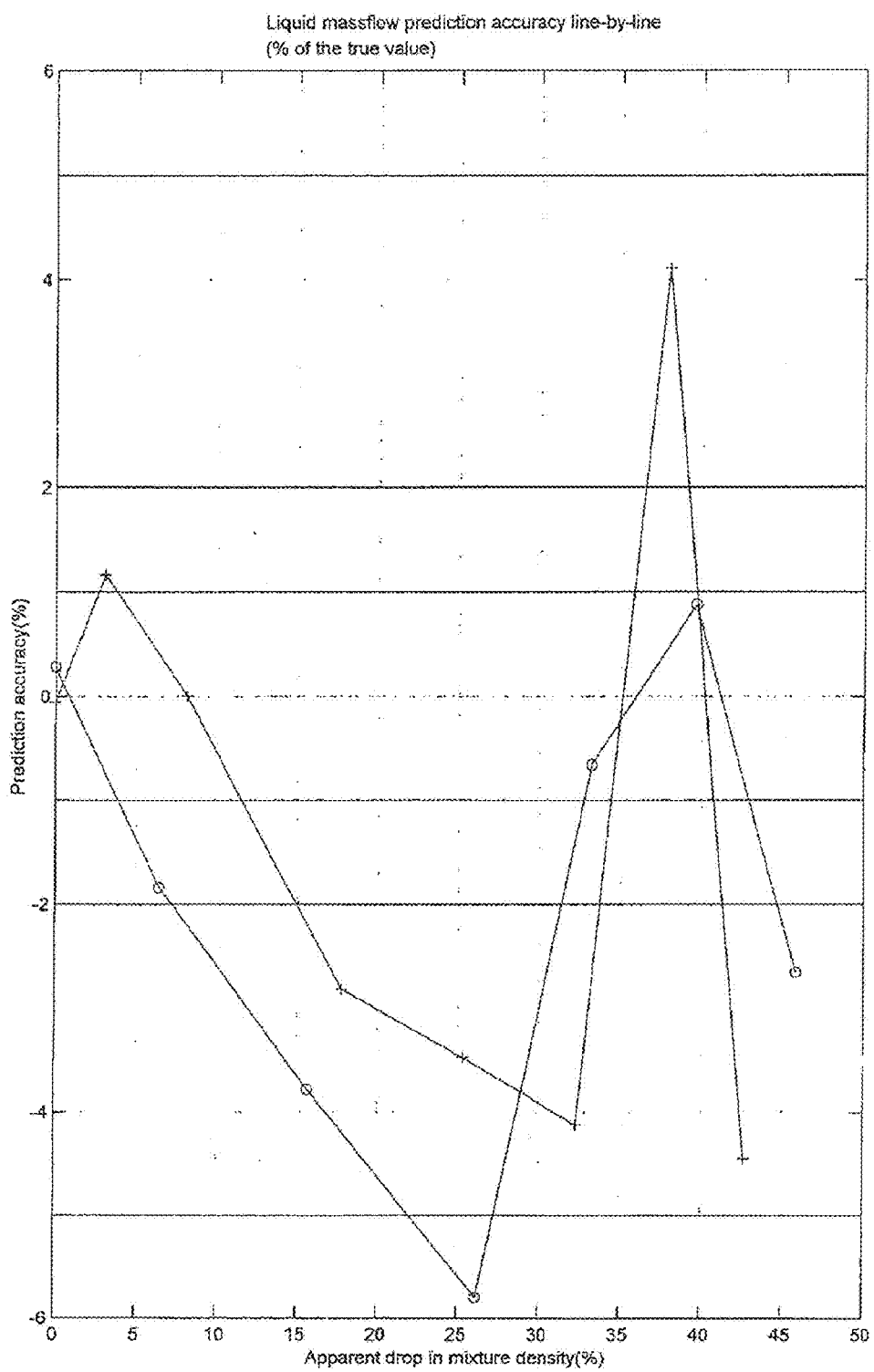
Figure 59:
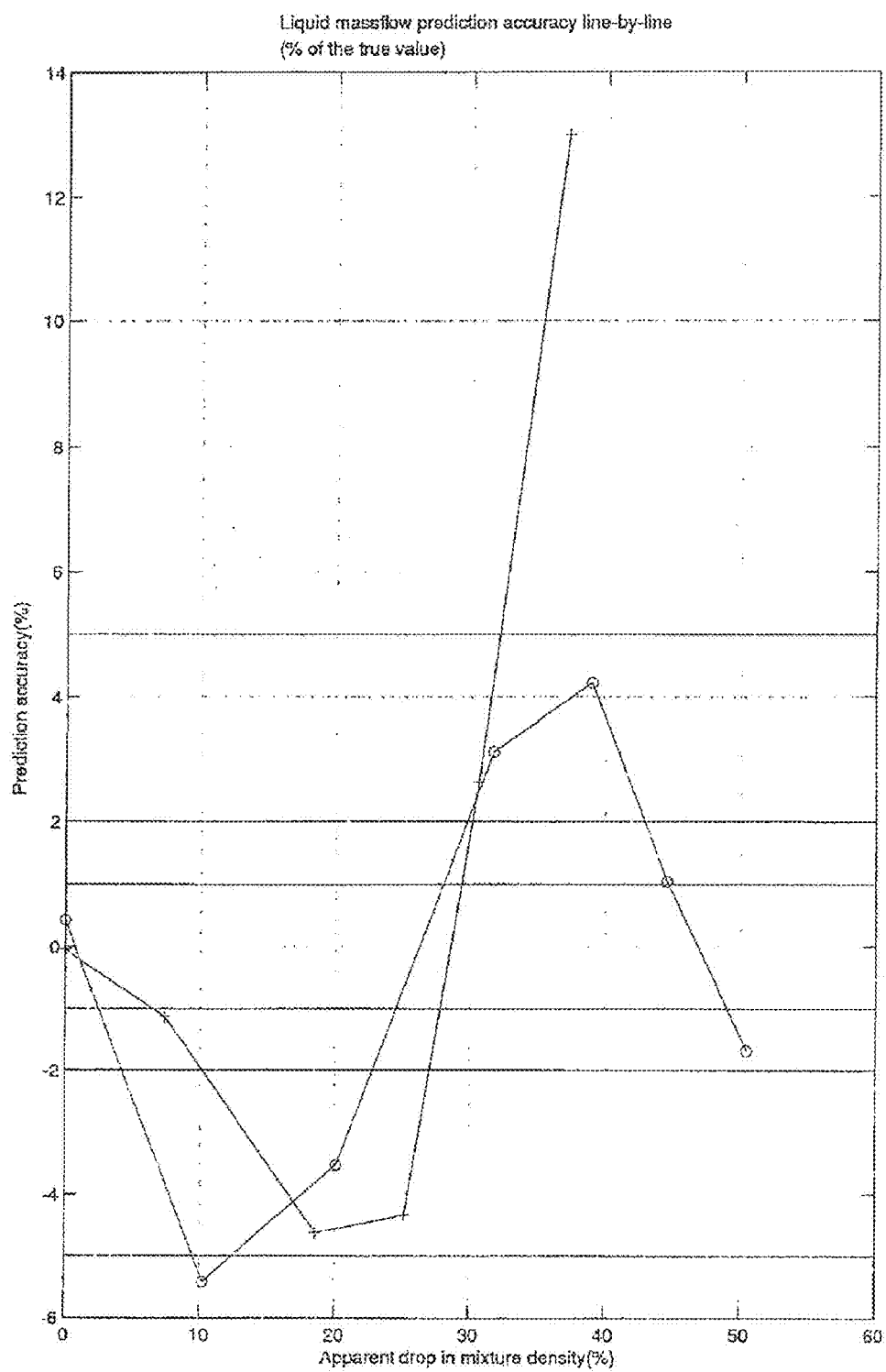
Figure 60:
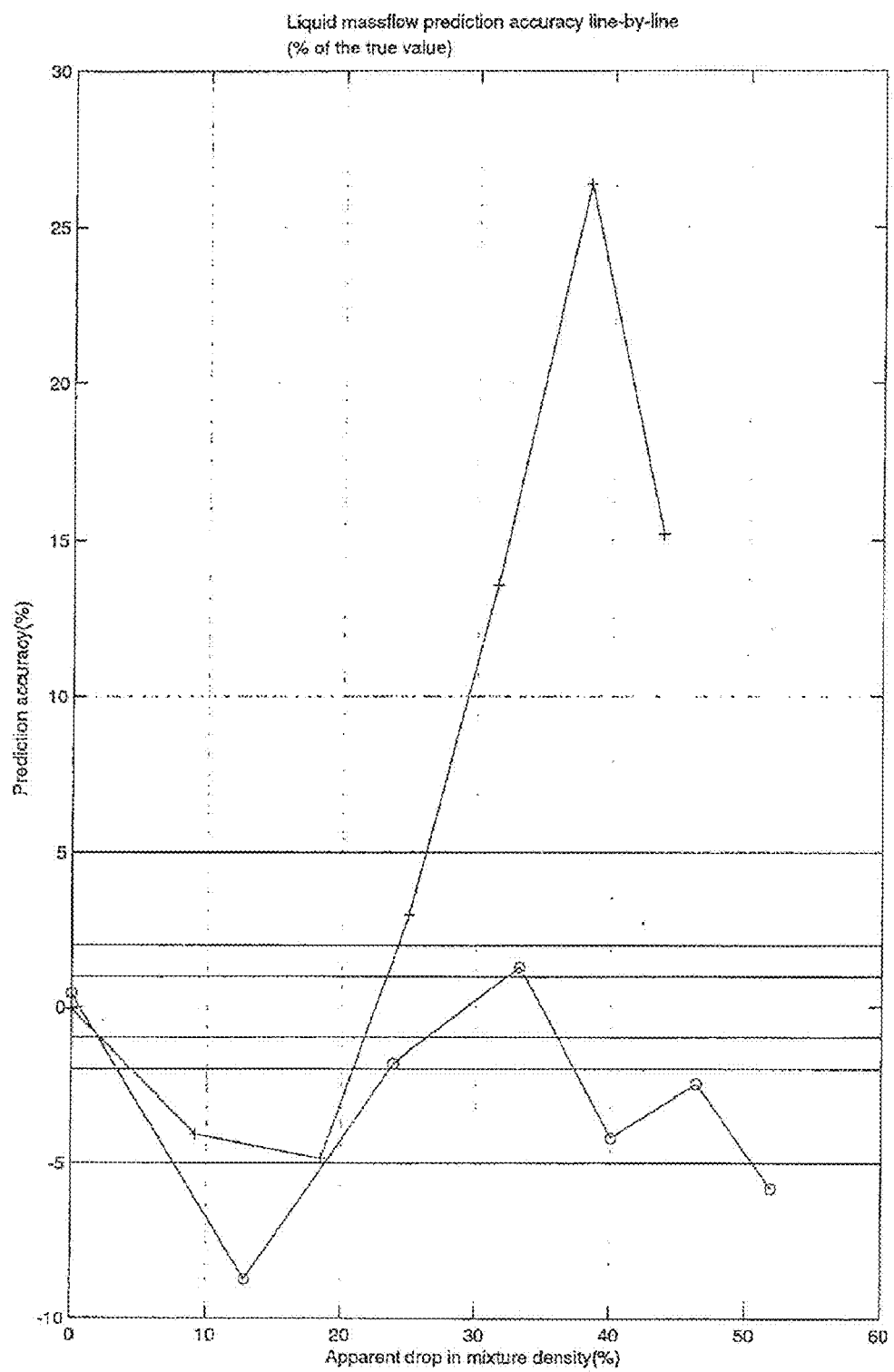
Figure 61:
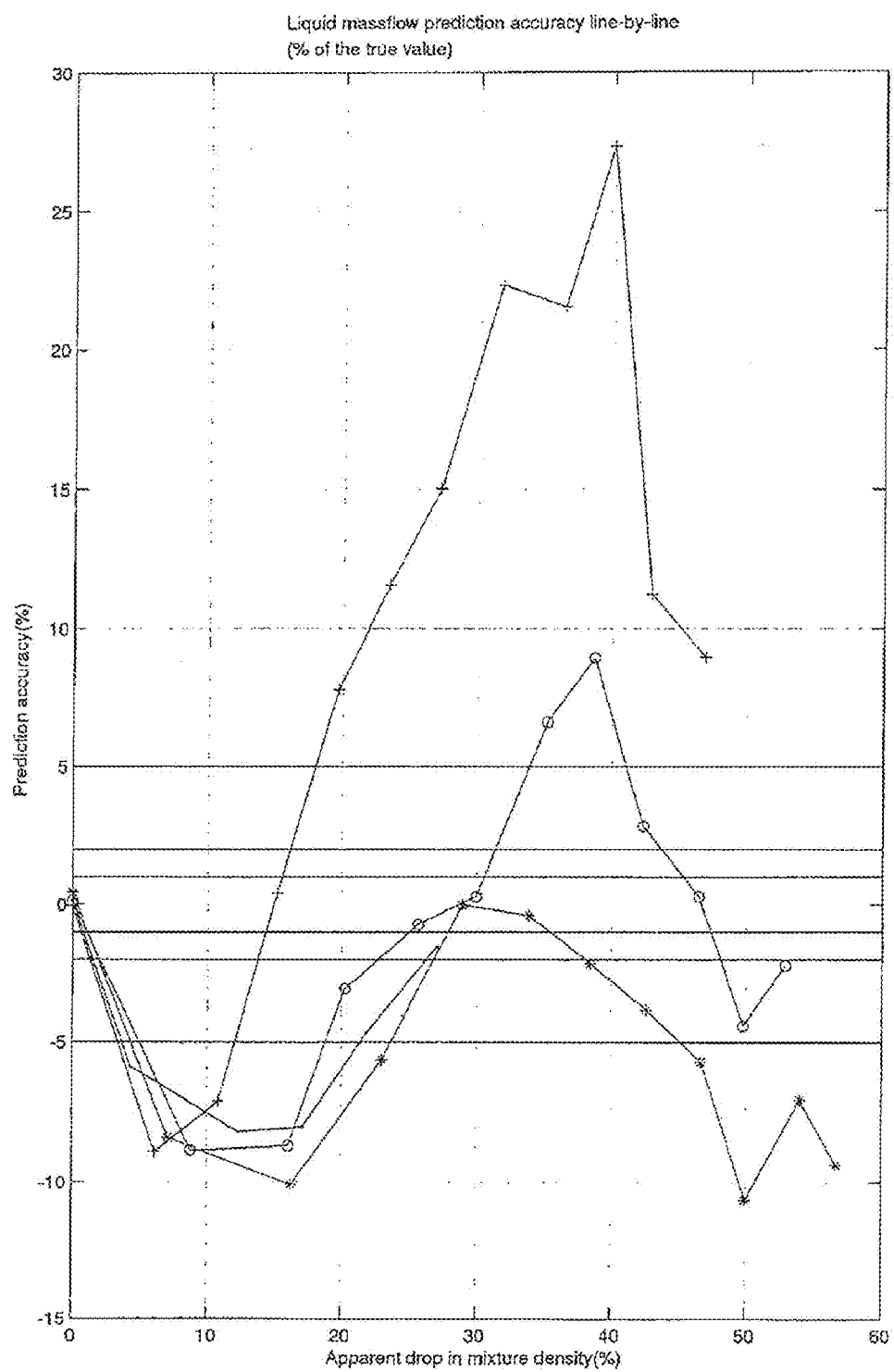
Figure 62:
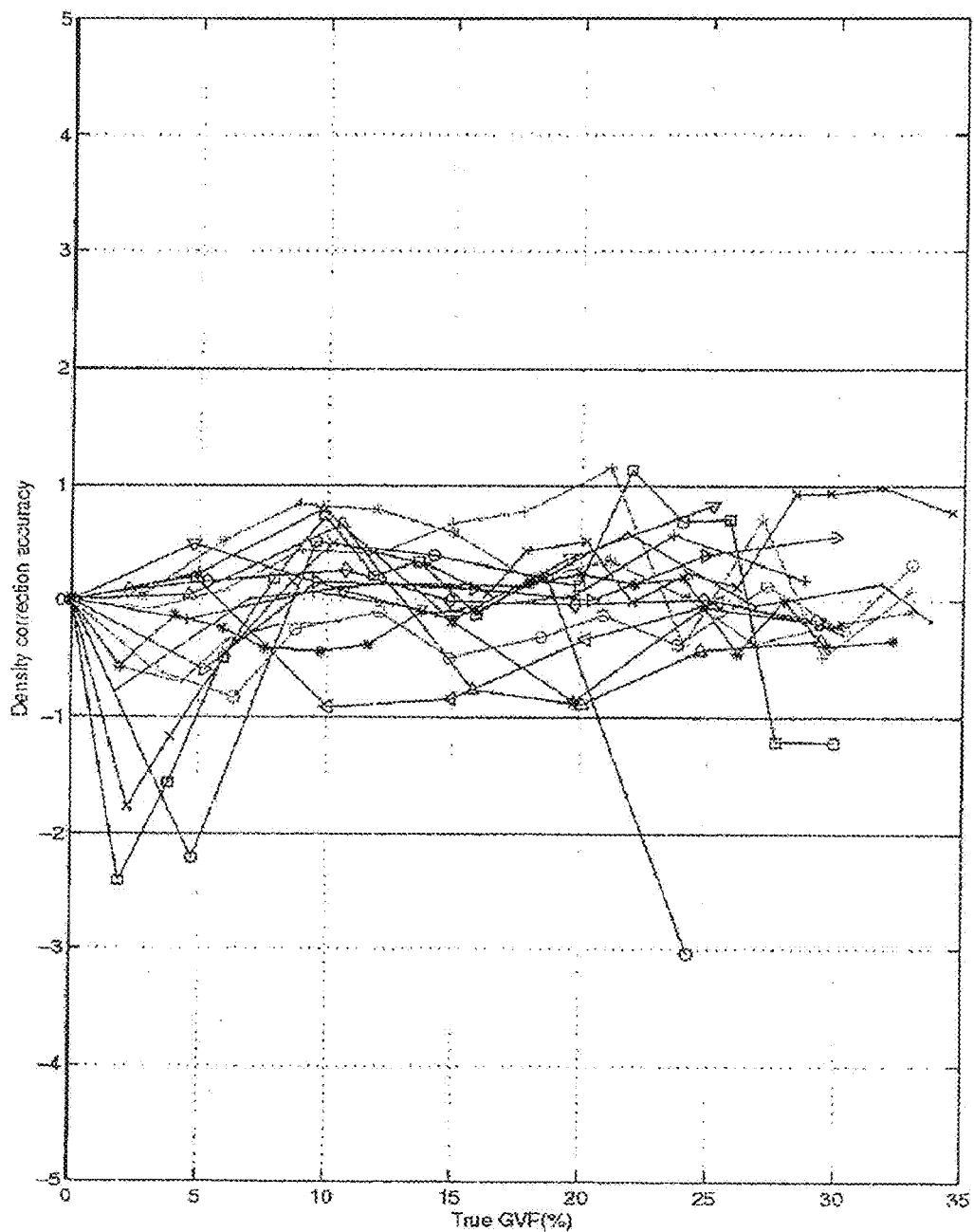
Figure 63:
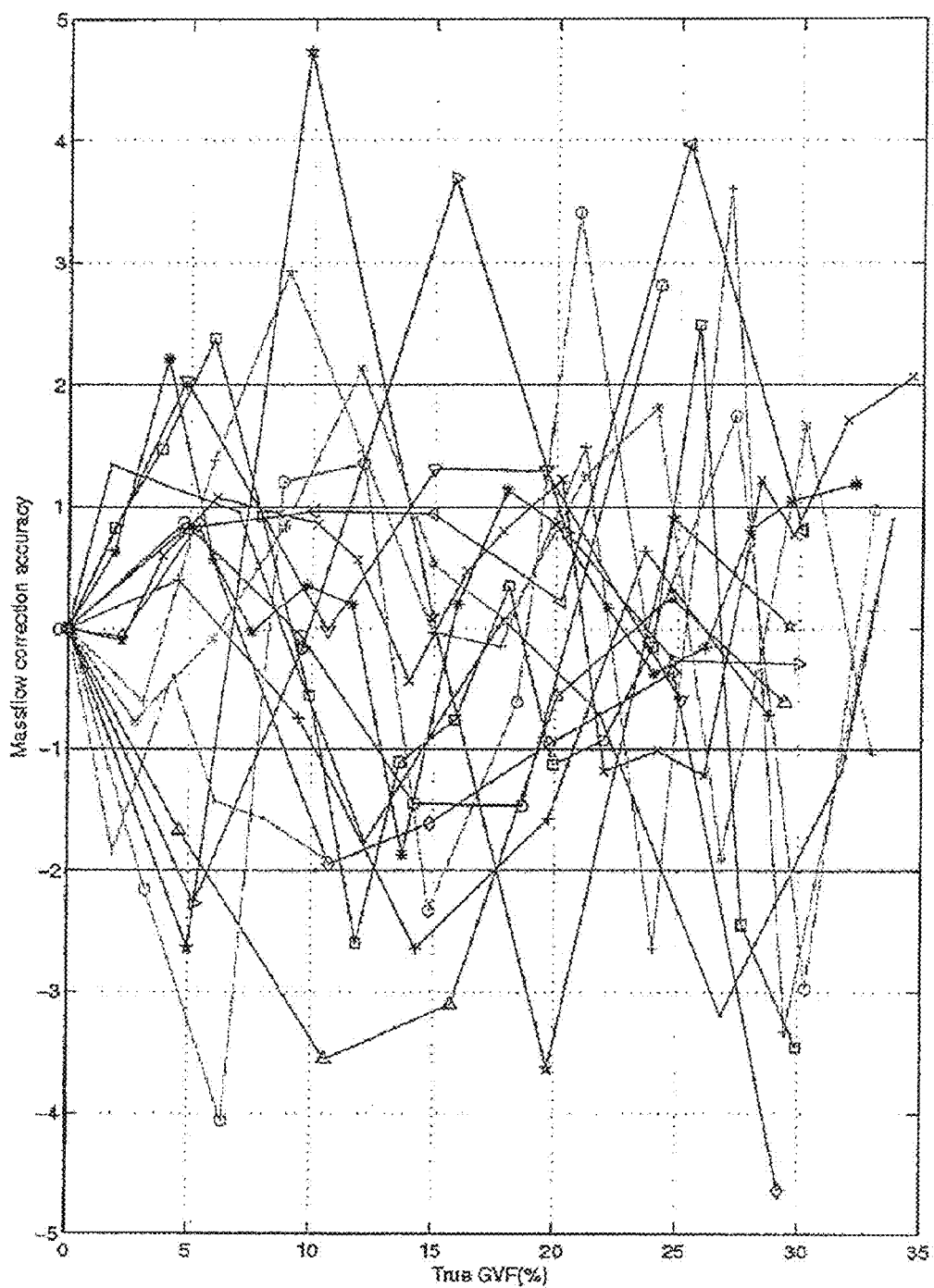
Figure 64A:
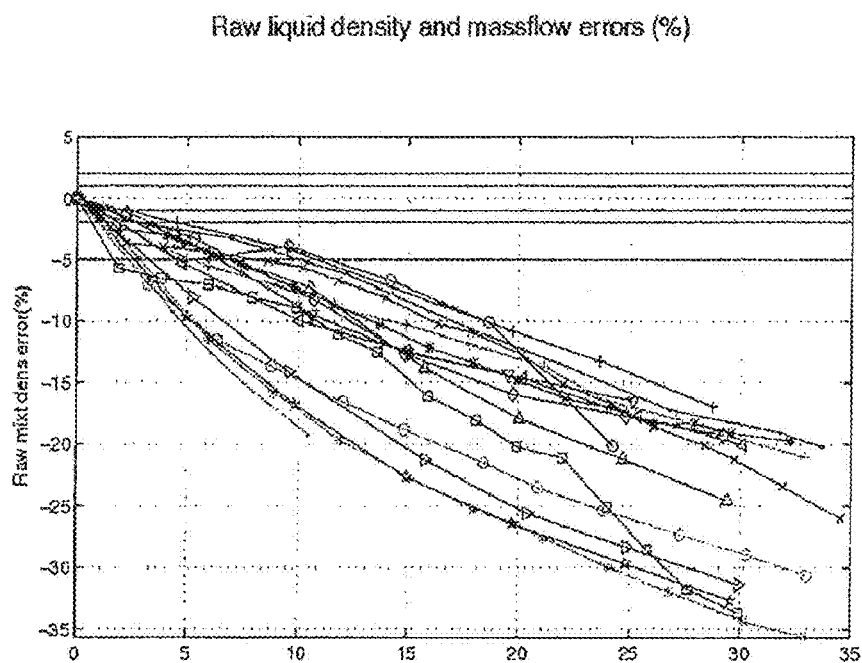
Figure 64B:
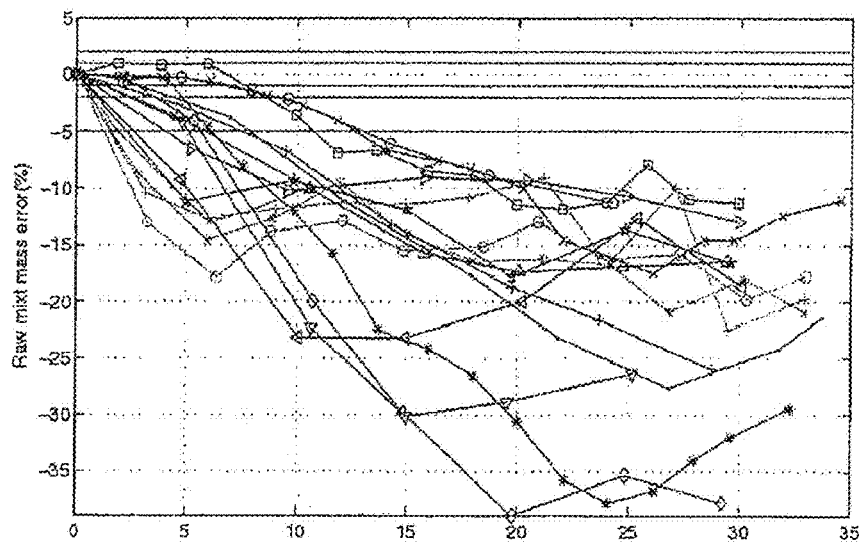
Figure 65A:
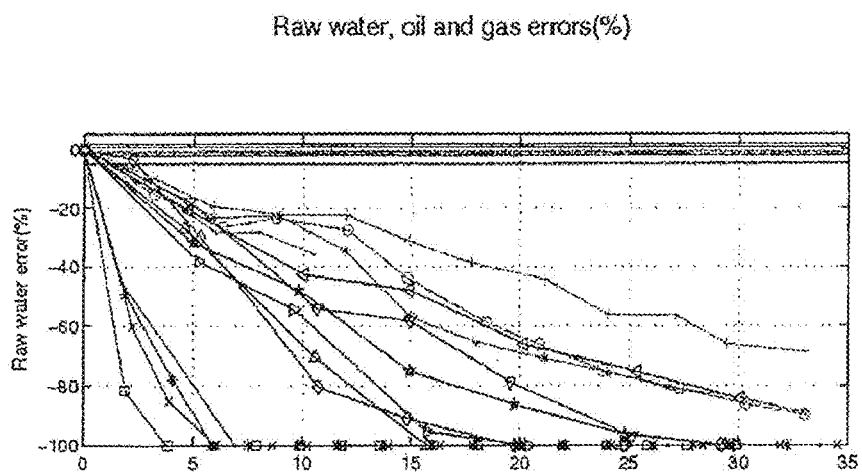
Figure 65B:
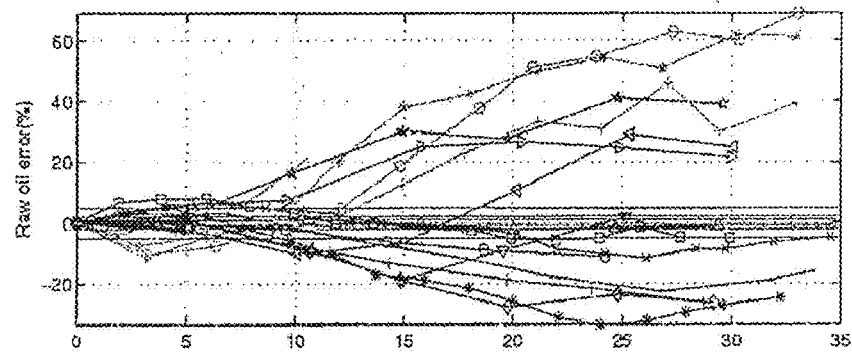
Figure 65C:
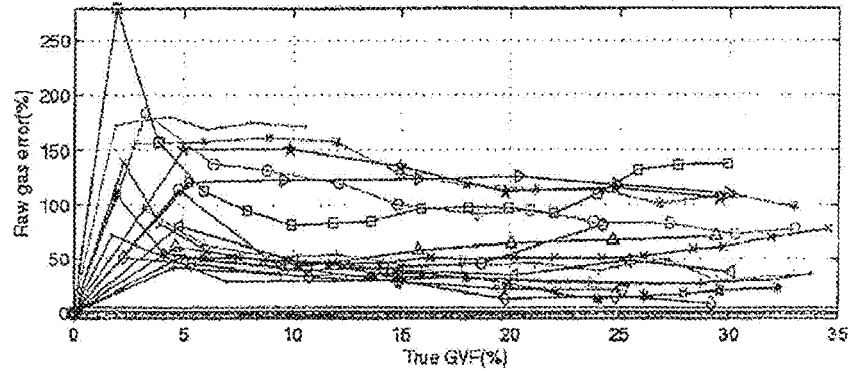

The data is based on the oil data discussed above, but with nominal water-cut values of 0, 5.5, 13.1, 24.8, 35.6 and 49%. The distribution of flowlines per nominal water-cut is as follows:

0%: 4000 and 6000 bpd
5.5%: 3000, 4000, 6000 and 8000 bpd
13.1%: 3000 and 6000 bpd
24.8%: 3000 and 7000 bpd
35.6%: 3000 and 7000 bpd
49%: 3000 5000, 7000 and 8000 bpd FIGS. 55A and 55B illustrate raw fluid mixture density and massflow errors, respectively. FIGS. 56-61 illustrate residual fluid mixture massflow errors after the previously used "6% water cut" model is applied. It is apparent that while some of the errors (especially for the 6% water cut data itself, FIG. 57) are small, at higher water cuts the residual errors grow. Similar trends are shown for residual density errors using the 6% water cut data as the model.

Improved models for mixture density and massflow errors were trained using the true water-cut value as an extra input. The accuracy of the resulting corrections on the training data is given in FIGS. 62 and 63. The residual errors are greater than for a model based only on a single water cut (mass flow within 5% instead of 2%, density within 2% instead of 1%). However, the model covers a good range of water cut readings instead of only a single value, and there represent a potential improvement over the worst errors in FIGS. 56-61.

The described errors may be reduced by having more data points. For example, for most of the water cuts there were only two flow lines. The number of data points in the set may be insufficient to be able to identify outliers. With more and better data quality, perhaps smaller mass flow and density errors may be possible, even allowing for a range of water cut values.

FIGS. 64-68 are graphs illustrating results from embedding the three-dimensional liquid massflow and density correction of FIGS. 55-63 into the process described above with respect to FIGS. 50 and 54 and FIG. 27. By successive generations of the water-cut, density and massflow corrections, volumetric errors resulting in the use of this model and the water cut error model may be shown.

Thus, FIGS. 64-68 illustrate results of successive corrections of water-cut, liquid(s), and gas massflow correction using the density and massflow corrections that take into account the variations due to water-cut. The end results are calculations of volumetric flows for oil, water and gas, as may be used by, for example, the oil and gas industry.

These illustrated calculations represent a "complete" set, suitable for oil continuous applications. The data is based on the oil data as described above, with nominal water-cut values of 0, 5.5, 13.1, 24.8, 35.6 and 49%. The water-cut, massflow and density corrections used are based on the whole data set for the range of water-cut from 0 to 50%.

The water cut correction model used is the same as is discussed above with respect to FIGS. 42-49. As already stated, the procedure employed is as described with respect to FIGS. 27 and 50-54, but the density and massflow corrections used take into account the water-cut variations. The density and massflow correction models used are the ones discussed above with respect to FIGS. 55-63.

Figure 66A:
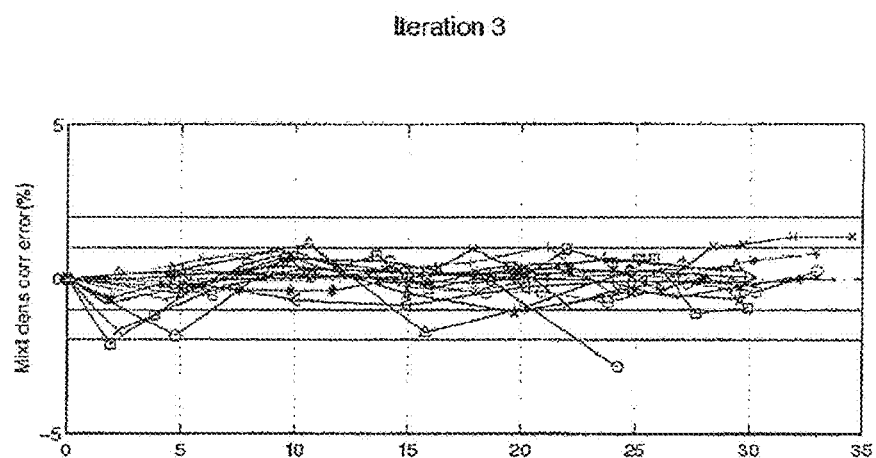
Figure 66B:
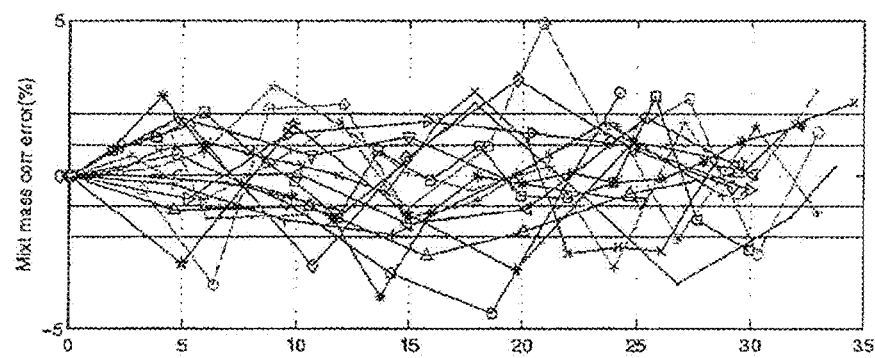
Figure 66C:
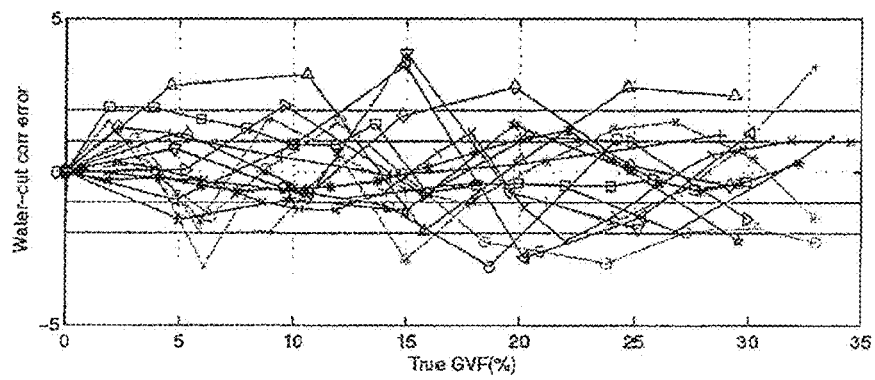

FIG. 39, above, illustrates the raw gas-induced water-cut meter errors. FIGS. 64A, 64B, 65A, 65B, and 65C give the raw mixture density and massflow gas-induced error, and raw water, oil and gas error, respectively. With the available data it is possible to converge in successive calculations, with the water-cut measurement corrected within 5%, the mixture density mainly within 2% and massflow mainly within 5%, as shown in FIG. 66A-66C.

Figure 67A:
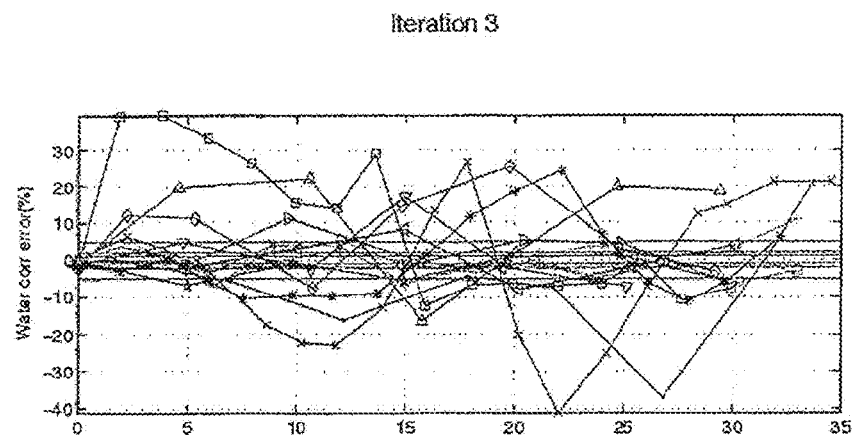
Figure 67B:
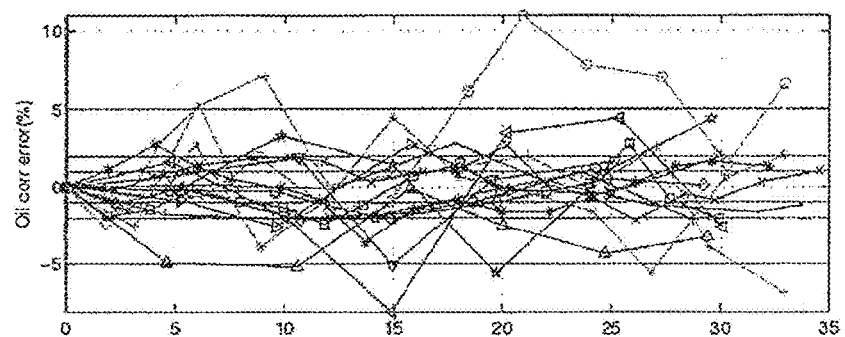
Figure 67C:
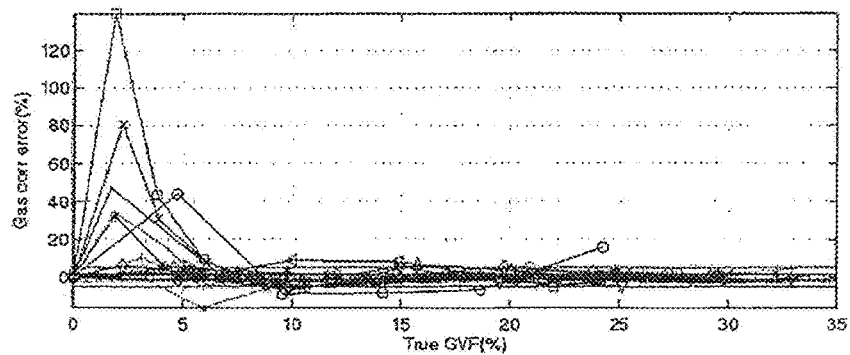

The water, oil and gas correction accuracies achieved after successive calculations are shown in FIG. 67A-67C. The oil massflow is corrected mainly within 5%. The water volumetric flow is most affected, with 2-3% error in water-cut yielding +/−40% error in water volumetric flow. The gas error is high at low GVF, as expected, dropping to mainly within 5% for GVFs over 15%.

Figure 68:
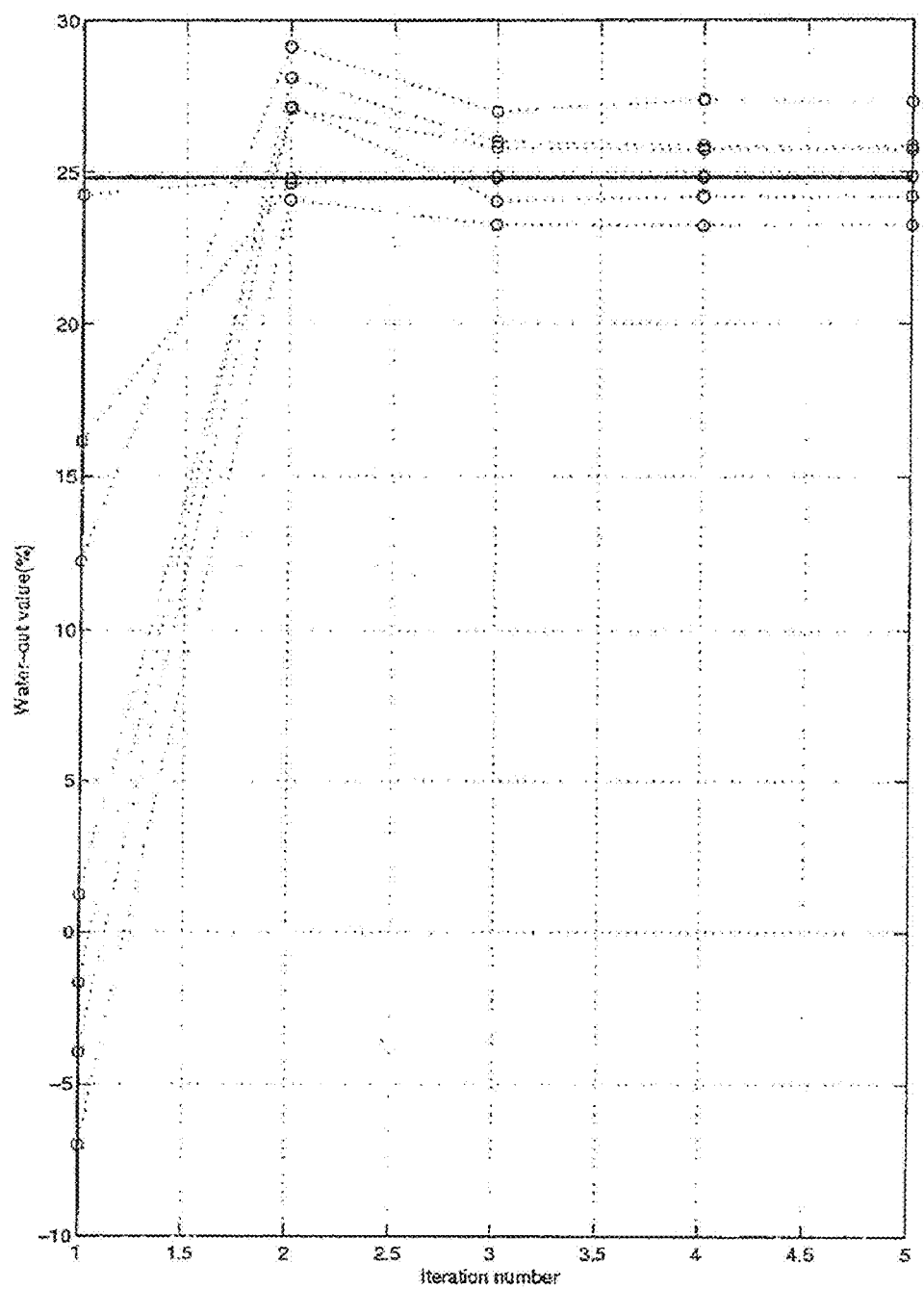

FIG. 68 illustrates an example of the corrected water-cut behavior during the process(es). As with the density and mass flow errors, higher data density (i.e. more experimental points) may allow improvement in the quality of the fit, and may also allow a better assessment of the level of experimental noise.

A set of analysis tools and correction algorithms have been illustrated that, given appropriate data for the oil, water, and gas used in a specific application, may compensate for gas-induced errors in Coriolis and water cut readings, thereby to deliver volumetric gas, water and oil flow rates.

As described above, a massflow meter may be capable of maintaining operation in the presence of a high percentage of gas in a measured flow, both with a single or a mixed liquid (i.e., in two-phase or three-phase flow). Estimates and/or apparent measurements of the liquid-gas mixture density and massflow may thus be obtained. However, these estimates have errors that depend on various factors, including, for example, the gas void fraction and/or the true liquid massflow, which may be so large as to render the raw measurements useless.

By using an additional measurement parameter, such as, for example, a water cut or gas void fraction measurement, along with the apparent mass flow rate and density measurements, corrected values for all of these parameters, and others, may be obtained. Moreover, by cycling through these measurements and calculations with ever-improved corrections, successively improved values may be obtained, as, for example, the corrections converge to specific values.

As described above, techniques for performing these corrections may be based on data-fitting techniques that seek to determine, for example, existing error rates in a particular setting or configuration, so that these errors may be accounted for in future measurements and corrections. As such, these techniques may be dependent on an extent of a correlation between the settings/configurations in which the data was obtained, and the settings/configurations in which they are ultimately applied.

Related or other correction techniques may be used that seek to characterize fluid flow(s) in a more general sense, i.e., using fluid flow equations that seek to describe a behavior of the flow as a physical matter. For example, the well-known Navier-Stokes equations may be used in this sense.

Specifically, the three-dimensional unsteady form of the Navier-Stokes equations describe how the velocity, pressure, temperature, and density of a moving fluid are related. The equations are a set of coupled differential equations and may, in theory, be solved for a given flow problem by using methods from calculus, or may be solved analytically, perhaps using certain simplifications or adjustments that may be determined to be helpful and applicable in a given circumstance.

These or related equations may consider, for example, convection (a physical process that occurs in a flow of gas in which some property is transported by the ordered motion of the flow), and/or diffusion (a physical process that occurs in a flow of gas in which some property is transported by the random motion of the molecules of the gas, and which may be related to the viscosity of the gas). Turbulence, and the generation of boundary layers, are the result of diffusion in the flow.

By using such fluid flow equations and characteristics, correction techniques may be obtained for many or all of the parameters and techniques discussed above. For example, such fluid flow equations may be used in defining a general correction model, which may be supplemented by data-fitting techniques such as those described above, or vice-versa.

A number of implementations have been described. Nevertheless, it will be understood that various modifications may be made. Accordingly, other implementations are within the scope of the following claims.

What is claimed is:

1. A system comprising:
    a liquid fraction probe configured to measure a liquid fraction of a flow of fluid that includes a first liquid, a second liquid, and a gas;
    a vibratable flowtube configured to receive the flow of fluid;
    a driver connected to the flowtube and operable to impart motion to the flowtube;
    a sensor connected to the flowtube and operable to sense the motion of the flowtube and generate a sensor signal; and
    one or more processing devices connected to access the sensor signal and to access the measured liquid fraction, the one or more processing devices being configured to determine a corrected liquid fraction based on the sensor signal and the measured liquid fraction.

2. The system of claim 1 wherein the one or more processing devices are configured to determine, based on the sensor signal, a mass flow rate of the flow of fluid and a density of the fluid.

3. The system of claim 2 wherein the one or more processing devices are configured to determine the corrected liquid fraction based on the mass flow rate and the density.

4. The system of claim 3 wherein the mass flow rate is an apparent mass flow rate and the density is an apparent density, the one or more processing devices being configured to determine a corrected mass flow rate and a corrected density based on the corrected liquid fraction, the apparent density, and the apparent mass flow rate.

5. The system of claim 4 wherein the one or more processing devices are configured to determine a gas void fraction of the flow of fluid based on the apparent density, the apparent mass flow rate, and the measured liquid fraction;
    wherein the one or more processing devices are configured to determine the corrected liquid fraction based on the gas void fraction.

6. The system of claim 1 wherein the liquid fraction probe is a water cut probe and the measured liquid fraction is a measured water cut, and
    wherein the one or more processing devices are configured to determine a corrected water cut.

7. The system of claim 1 wherein the first liquid is water and the second liquid is oil.

8. The system of claim 1 wherein the one or more processing devices are configured to estimate the corrected liquid fraction based on known configurations and flow parameters.

9. The system of claim 1 wherein the one or more processing devices are configured to determine the corrected liquid fraction using a neural net correction model.

10. The system of claim 1 further comprising a sensor configured to measure a temperature of the flow of fluid or a pressure of the flow of fluid;
    wherein the one or more processing devices are configured to determine the corrected liquid fraction based on the measured temperature or the measured pressure.

11. A method comprising:
    measuring a liquid fraction of a flow of fluid that includes a first liquid, a second liquid, and a gas;
    passing the flow of fluid through a vibratable flowtube;
    imparting motion to the flowtube;
    generating a signal based on motion of the flowtube; and
    determining a corrected liquid fraction of the flow of fluid based on the measured liquid fraction and the signal.

12. The method of claim 11 further comprising determining, based on the signal, a mass flow rate of the flow of fluid and a density of the fluid.

13. The method of claim 12 wherein determining a corrected liquid fraction of the flow of fluid comprises determining the corrected liquid fraction of the flow of fluid based on the mass flow rate and the density.

14. The method of claim 13 wherein the mass flow rate is an apparent mass flow rate and the density is an apparent density,
    wherein the method further comprises determining a corrected mass flow rate and a corrected density based on the corrected liquid fraction, the apparent density, and the apparent mass flow rate.

15. The method of claim 14 further comprising determining a gas void fraction of the flow of fluid based on the apparent density, the apparent mass flow rate, and the measured liquid fraction;
    wherein determining a corrected liquid fraction of the flow of fluid comprises determining a corrected liquid fraction of the flow of fluid based on the gas void fraction.

16. The method of claim 11 wherein measuring a liquid fraction comprises measuring an apparent water cut of the flow of fluid using a water cut probe, and wherein determining a corrected liquid fraction of the flow of fluid comprises determining a corrected water cut of the flow of fluid.

17. The method of claim 11 wherein the first liquid is water and the second liquid is oil.

18. The method of claim 11 wherein determining a corrected liquid fraction of the flow of fluid comprises estimating the corrected liquid fraction based on known configurations and flow parameters.

19. The method of claim 11 wherein determining a corrected liquid fraction of the flow of fluid comprises determining the corrected liquid fraction using a neural net correction model.

20. The method of claim 11 further comprising measuring a temperature of the flow of fluid or a pressure of the flow of fluid;
    wherein determining a corrected liquid fraction of the flow of fluid comprises determining the corrected liquid fraction based on the measured temperature or the measured pressure.

* * * * *